United States Patent
Nixon et al.

(10) Patent No.: US 11,960,473 B2
(45) Date of Patent: *Apr. 16, 2024

(54) DISTRIBUTED LEDGERS IN PROCESS CONTROL SYSTEMS

(71) Applicant: FISHER-ROSEMOUNT SYSTEMS, INC., Round Rock, TX (US)

(72) Inventors: Mark J. Nixon, Round Rock, TX (US); Gary K. Law, Georgetown, TX (US); William McCormick, Round Rock, TX (US); Claudio Fayad, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/248,323

(22) Filed: Jan. 15, 2019

(65) Prior Publication Data

US 2020/0226123 A1   Jul. 16, 2020

(51) Int. Cl.
*G06F 16/23* (2019.01)
*G05B 19/418* (2006.01)
(Continued)

(52) U.S. Cl.
CPC ... *G06F 16/2379* (2019.01); *G05B 19/41855* (2013.01); *G06F 16/27* (2019.01);
(Continued)

(58) Field of Classification Search
None
See application file for complete search history.

(56) References Cited

U.S. PATENT DOCUMENTS 9,946,904 B2 * 4/2018 Burchell ............... G01K 1/024
10,872,381 B1 * 12/2020 Leise ............... G06F 16/90335
(Continued)

FOREIGN PATENT DOCUMENTS

CN   109164780 A    1/2019
CN   111883140 A   11/2020
(Continued)

OTHER PUBLICATIONS

Federico Matteo Bencic et al, "Distributed Ledger Technology: Blockchain Compared to Directed Acyclic Graph", 2018 IEEE 38th International Conference on Distributed Computing Systems, 2018, 2 pages.*

(Continued)

*Primary Examiner* — Uyen T Le
(74) *Attorney, Agent, or Firm* — MARSHALL, GERSTEIN & BORUN LLP

(57) ABSTRACT

To provide a trusted, secure, and immutable record of transactions within a process plant, techniques are described for utilizing a distributed ledger in process control systems. The distributed ledger may be maintained by nodes which receive transactions broadcasted from field devices, controllers, operator workstations, or other devices operating within the process plant. The transactions may include process plant data, such as process parameter data, product parameter data, configuration data, user interaction data, maintenance data, commissioning data, plant network data, and product tracking data. The distributed ledgers may also be utilized to execute smart contracts to allow machines such as field devices to transact by themselves without human intervention. In this manner, recorded process parameter values and product parameter values may be retrieved to verify the quality of products. Moreover, regulatory data (Continued)

may be recorded in response to triggering events so that regulatory agencies can review the data.

27 Claims, 18 Drawing Sheets

(51) Int. Cl.
    *G06F 16/27*     (2019.01)
    *H04L 9/00*     (2022.01)
    *H04L 9/06*     (2006.01)
    *H04L 9/32*     (2006.01)

(52) U.S. Cl.
    CPC .......... *H04L 9/0637* (2013.01); *H04L 9/0643* (2013.01); *H04L 9/3247* (2013.01); *G05B 2219/31151* (2013.01); *H04L 9/50* (2022.05)

(56) References Cited

U.S. PATENT DOCUMENTS

| | | | |
|---|---|---|---|
| 10,958,434 B1 | 3/2021 | Marquardt et al. | |
| 11,074,353 B2* | 7/2021 | Wojcik | G06K 7/10297 |
| 11,790,317 B2* | 10/2023 | Javaheri | G06Q 10/0838 |
| | | | 705/29 |
| 2007/0005613 A1 | 1/2007 | Singh et al. | |
| 2007/0165625 A1 | 7/2007 | Eisner et al. | |
| 2016/0098037 A1* | 4/2016 | Zornio | G05B 19/4185 |
| | | | 700/20 |
| 2017/0046694 A1 | 2/2017 | Chow et al. | |
| 2017/0048216 A1 | 2/2017 | Chow et al. | |
| 2017/0243222 A1* | 8/2017 | Balasubramanian | |
| | | | G06Q 20/4014 |
| 2017/0279774 A1 | 9/2017 | Booz et al. | |
| 2017/0364552 A1 | 12/2017 | Pattanaik et al. | |
| 2018/0094953 A1 | 4/2018 | Colson et al. | |
| 2018/0096175 A1* | 4/2018 | Schmeling | G06Q 10/08 |
| 2018/0130130 A1 | 5/2018 | Dechu et al. | |
| 2018/0253702 A1 | 9/2018 | Dowding | |
| 2018/0270138 A1 | 9/2018 | Le Merrer et al. | |
| 2018/0285810 A1 | 10/2018 | Ramachandran et al. | |
| 2018/0336515 A1* | 11/2018 | Mehring | H04L 9/0637 |
| 2018/0349879 A1* | 12/2018 | High | G06Q 20/389 |
| 2018/0357603 A1 | 12/2018 | Wilkinson et al. | |
| 2018/0375750 A1 | 12/2018 | Moeller | |
| 2019/0012637 A1 | 1/2019 | Gillen | |
| 2019/0035018 A1 | 1/2019 | Nolan et al. | |
| 2019/0080118 A1 | 3/2019 | Brady et al. | |
| 2019/0081796 A1 | 3/2019 | Chow et al. | |
| 2019/0109877 A1 | 4/2019 | Samuel et al. | |
| 2019/0114706 A1* | 4/2019 | Bell | H04L 9/0825 |
| 2019/0147396 A1* | 5/2019 | Bohling | G06N 5/04 |
| | | | 705/28 |
| 2019/0158594 A1 | 5/2019 | Shadmon et al. | |
| 2019/0227515 A1 | 7/2019 | Fink et al. | |
| 2019/0229892 A1* | 7/2019 | Jevans | H04L 9/3271 |
| 2019/0238486 A1 | 8/2019 | Zizka | |
| 2019/0287200 A1 | 9/2019 | Schuler et al. | |
| 2019/0295081 A1* | 9/2019 | Simon | G06Q 20/405 |
| 2019/0303623 A1 | 10/2019 | Reddy et al. | |
| 2019/0303951 A1* | 10/2019 | Bakalis | H04L 9/0861 |
| 2019/0339668 A1 | 11/2019 | Biernat et al. | |
| 2019/0340269 A1 | 11/2019 | Biernat et al. | |
| 2019/0342077 A1 | 11/2019 | McMurdie et al. | |
| 2019/0354723 A1 | 11/2019 | Dassenno | |
| 2019/0356470 A1 | 11/2019 | Deshpande et al. | |
| 2020/0005404 A1 | 1/2020 | Patterson et al. | |
| 2020/0021444 A1* | 1/2020 | Young | G16H 10/40 |
| 2020/0034457 A1 | 1/2020 | Brody et al. | |
| 2020/0044833 A1 | 2/2020 | Shpurov et al. | |
| 2020/0052903 A1 | 2/2020 | Lam et al. | |
| 2020/0065761 A1 | 2/2020 | Tatchell | |
| 2020/0111066 A1 | 4/2020 | Anstey et al. | |
| 2020/0112434 A1 | 4/2020 | Goodson | |
| 2020/0133658 A1 | 4/2020 | Agrawal et al. | |
| 2020/0134061 A1 | 4/2020 | Gaber et al. | |
| 2020/0143300 A1* | 5/2020 | Weldemariam | H04L 9/3239 |
| 2020/0184416 A1* | 6/2020 | Javaheri | G06K 7/1417 |
| 2020/0211003 A1 | 7/2020 | Fletcher | |
| 2020/0219053 A1* | 7/2020 | Subramaniam | G06Q 10/0833 |
| 2020/0225643 A1 | 7/2020 | Tugbo et al. | |
| 2020/0226123 A1 | 7/2020 | Nixon et al. | |
| 2020/0228316 A1 | 7/2020 | Cahill | |
| 2020/0228342 A1 | 7/2020 | Nixon et al. | |
| 2020/0232194 A1 | 7/2020 | Periaswamy et al. | |
| 2020/0265037 A1 | 8/2020 | Bartolucci et al. | |

FOREIGN PATENT DOCUMENTS

| | | | |
|---|---|---|---|
| EP | 3 193 299 A1 | 7/2017 | |
| EP | 3 365 633 A1 | 8/2018 | |
| EP | 3 422 267 A1 | 1/2019 | |
| EP | 3561746 A1 * | 10/2019 | ............. G06Q 10/06 |
| FR | 3 075 424 A1 | 6/2019 | |
| GB | 2 420 431 A | 5/2006 | |
| GB | 2 452 850 A | 3/2009 | |
| WO | WO-2017/067587 A1 | 4/2017 | |
| WO | WO-2018/058850 A1 | 4/2018 | |
| WO | WO-2018/059850 A1 | 4/2018 | |
| WO | WO-2018/059854 A1 | 4/2018 | |
| WO | WO-2018/059855 A1 | 4/2018 | |
| WO | WO-2018/126059 A1 | 7/2018 | |
| WO | WO-2018/222066 A1 | 12/2018 | |
| WO | WO-2019/007396 A1 | 1/2019 | |
| WO | WO-2020/146036 A1 | 7/2020 | |

OTHER PUBLICATIONS

Son et al, "Product data quality validation system for product development processes in high-tech industry", International Journal of Production Research vol. 49, No. 12, Jun. 15, 2011, 3751-3766.*
Rejeb, "Blockchain Framework for Textile Supply chain management", © Springer International Publishing AG, part of Springer Nature 2018 S. Chen et al. (Eds.): ICBC 2018, LNCS 10974, pp. 213-227, 2018. https://doi.org/10.1007/978-3-319-94478-4_15.*
Yu, Jianbo, Lifeng Xi, and Xiaojun Zhou. "Intelligent monitoring and diagnosis of manufacturing processes using an integrated approach of KBANN and GA." Computers in Industry 59.5 (2008): 489-501. (Year: 2008).*
Zhou, Wei, and Selwyn Piramuthu. "Manufacturing with item-level RFID information: From macro to micro quality control." International Journal of Production Economics 135.2 (2012): 929-938. (Year: 2012).*
Holland, Martin, Christopher Nigischer, and Josip Stjepandić. "Copyright protection in additive manufacturing with blockchain approach." Transdisciplinary Engineering: A Paradigm Shift. IOS Press, 2017. 914-921. (Year: 2017).*
Chaudhuri, Atanu, et al. "Decision-making in cold chain logistics using data analytics: a literature review." The International Journal of Logistics Management (2018).34 pages (Year: 2018).*
Bano S, Sonnino A, Al-Bassam M, Azouvi S, McCorry P, Meiklejohn S, Danezis G. Consensus in the age of blockchains. arXiv preprint arXiv: 1711.03936. Nov. 10, 2017 17 pages. (Year: 2017).*
Government Office for Science, "Distributed Ledger Technology: Beyond Block Chain," (2016).
Search Report for Application No. GB2000415.6, dated Jun. 26, 2020.
Search Report for Application No. GB2000417.2, dated Jun. 29, 2020.
Search Report for Application No. GB2000418.0, dated Jun. 26, 2020.
Search Report for Application No. GB2000573.2, dated Jul. 10, 2020.
U.S. Appl. No. 16/248,367, filed Jan. 15, 2019.
U.S. Appl. No. 16/248,355, filed Jan. 15, 2019.
U.S. Appl. No. 16/248,377, filed Jan. 15, 2019.
U.S. Appl. No. 16/248,388, filed Jan. 15, 2019.
"Blockchain for Business" (Sep. 1, 2016) <https://www.ibm.com/blockchain/for-business>.

(56) References Cited

OTHER PUBLICATIONS

"Can Blockchain be Used to Create Secure Industrial IoT Networks?" (May 8, 2017) <https://www.bayshorenetworks.com/blog/can-blockchain-be-used-to-create-secure-industrial-iot-networks>.

Gudymenko et al., "Blockchain-Based Smart Industry Integration: Demystiphying Blockchain," (Dec. 18, 2017) <http://st.inf.tu-dresden.de/files/teaching/ws17/ring/Demystiphying%20blockchain-TU%20Dresden%20Ringvorlesung_T-Systems%20MMS.pdf>.

Search Report for Application No. GB2005105.8, dated Oct. 27, 2020.

Dhakal et al., "Private Blockchain Network for IoT Device Firmware Integrity Verification and Update," IEEE 19th International Symposium on High Assurance Systems Engineering, pp. 164-170 (2019).

Nguyen et al., "Leveraging Blockchain to Enhance Data Privacy in IoT-Based Applications," Springer International Publishing, pp. 211-221 (2018).

Search Report for Application No. GB2000416.4, dated Aug. 28, 2020.

Chen et al., "A Blockchain-based Supply Chain Quality Management Framework", 2017, IEEE, pp. 5 (Year: 2017).

Combined Search and Examination Report for Application No. GB2116591.5, dated Dec. 6, 2021.

Examination Report for Great Britain Application No. GB1710029.8 dated Jul. 5, 2021.

Isaja et al., "Distributed Ledger Architecture for Automation, Analytics and Simulation in Industrial Environments", 2018, IFAC, pp. 6 (Year: 2018).

Written Opinion for Application No. GB202000416, dated Feb. 4, 2022.

Examination Report for Application No. GB2000417.2, dated Jul. 20, 2022.

Examination Report for Application No. GB2000573.2, dated Jul. 5, 2022.

Search Report for Application No. GB2000415.6, dated Jul. 20, 2022.

Search Report for Application No. GB2000418.0, dated Jul. 25, 2022.

Combined Search and Examination Report for Application No. GB2214395.2, dated Dec. 16, 2022.

Examination Report for Application No. GB2000417.2, dated Nov. 2, 2022.

Combined Search and Examination Report for Application No. GB2300233.0, dated Mar. 9, 2023.

Combined Search and Examination Report for Application No. GB2305842.3, dated May 23, 2023.

Combined Search and Examination Report for Application No. GB2306318.3, dated May 31, 2023.

Examination Report for Application No. GB2000417.2, dated Mar. 15, 2023.

Examination Report for Application No. GB2306318.3, dated Aug. 31, 2023.

\* cited by examiner

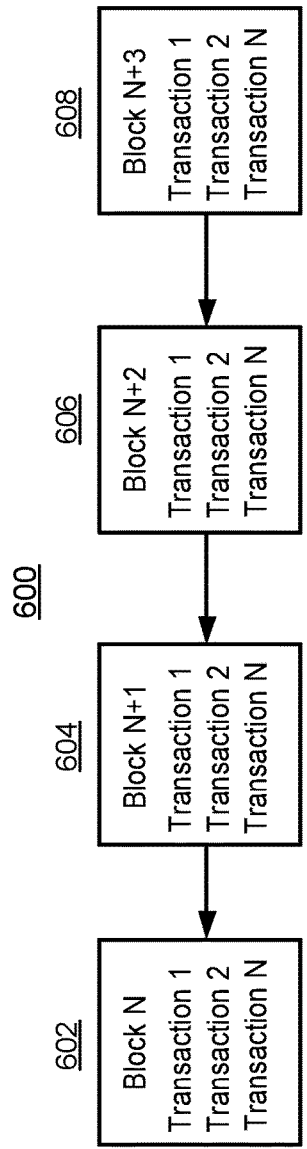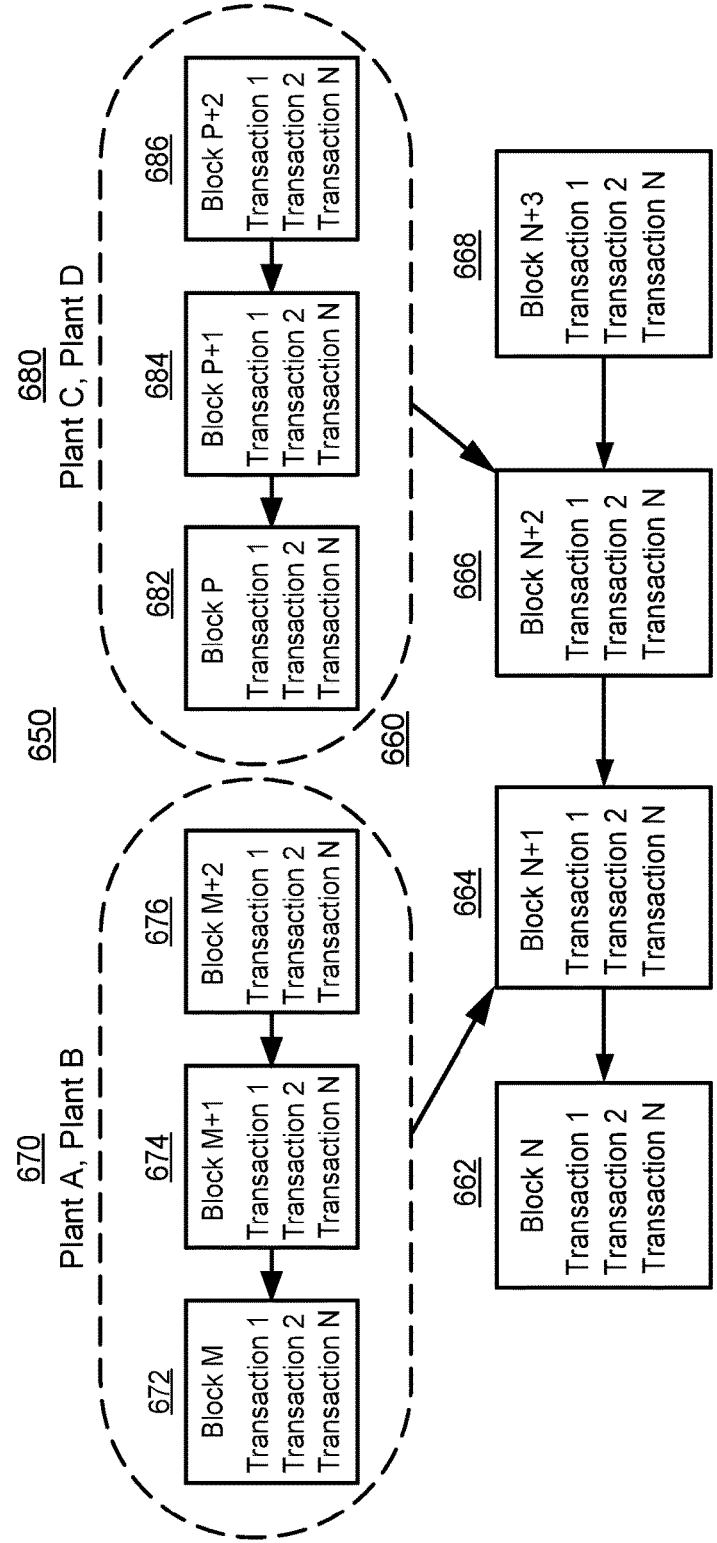

DISTRIBUTED LEDGERS IN PROCESS CONTROL SYSTEMS

TECHNICAL FIELD

The present disclosure relates generally to process plants and to process control systems, and more particularly, to the use of distributed ledgers in process control systems to record data and events.

BACKGROUND

Distributed process control systems, like those used in chemical, petroleum or other process plants, typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process parameters such as pressure, temperature, etc., and the like to control one or more process executing within the process plant or system. Smart field devices, such as the field devices conforming to the well-known Fieldbus protocol, may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system. As utilized herein, field devices and controllers are generally referred to as "process control devices."

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Generally speaking, a process control system of a process plant includes field devices, controllers, workstations, and other devices that are interconnected by a set of layered networks and buses. The process control system may, in turn, be connected with various business and external networks, e.g., to reduce manufacturing and operational costs, enhance productivity and efficiencies, provide timely access to process control and/or process plant information, etc. On the other hand, the interconnection of process plants and/or process control systems to enterprise and/or external networks and systems increases the risk of cyber intrusions and/or malicious cyber attacks that may arise from expected vulnerabilities in commercial systems and applications, such as those used in enterprise and/or external networks. Cyber intrusions and malicious cyber attacks of process plants, networks, and/or control systems may negatively affect the confidentiality, integrity, and/or availability of information assets, which, generally speaking, are vulnerabilities similar to those of general purpose computing networks. However, unlike general purpose computer networks, cyber intrusions of process plants, networks, and/or control systems may also lead to damage, destruction, and/or loss of not only plant equipment, product, and other physical assets, but also to the loss of human life. For example, a cyber intrusion may cause a process to become uncontrolled, and thereby produce explosions, fires, floods, exposure to hazardous materials, etc. Thus, securing communications related to process control plants and systems is of paramount importance.

SUMMARY

Techniques, systems, apparatuses, components, devices, and methods are disclosed for utilizing a distributed ledger, or blockchain, in process control systems. Said techniques, systems, apparatuses, components, devices, and methods may apply to industrial process control systems, environments, and/or plants, which are interchangeably referred to herein as "industrial control," "process control," or "process" systems, environments, and/or plants. Typically, such systems and plants provide control, in a distributed manner, of one or more processes that operate to manufacture, refine, transform, generate, or produce physical materials or products.

For example, in a process control system a distributed ledger may be maintained by nodes referred to herein as "edge gateways." The nodes receive transactions broadcasted to a distributed ledger network from field devices, controllers, operator workstations, or other devices operating within the process plant. In some scenarios, the transactions include process parameter values for process parameters corresponding to a process plant entity. A process plant entity may include devices within a process plant for use in a portion of the process which contain, transform, generate, or transfer physical materials, such as a valve, a tank, a mixer, a pump, a heat exchanger, etc. The transactions may also include product parameter values such as properties of a physical material or product produced by the process plant, including a temperature of the product, a volume of the product, a mass of the product, a density of the product, a pressure of the product, etc.

The recorded process parameter values and product parameter values may then be retrieved to verify the quality of a product. For example, a first process plant may manufacture, refine, transform, generate, or produce a product which is then shipped to a second process plant. The second process plant may determine that the product meets certain quality standards by retrieving the recorded process parameter values and product parameter values from the distributed ledger. Additionally, regulatory data may be recorded in the distributed ledger. For example, in response to a triggering event such as an alarm, an error, a leak, a repair event, a process milestone, a corrective action, etc., process control elements such as field devices or controllers may generate transactions including data from the triggering event, such as the time in which the event occurred, the duration of the event, process parameter values for process plant entities involved in the event, product parameter values for products involved in the event, etc. The regulatory data is then recorded in the distributed ledger, so that regulatory agencies can review the data.

Still further, distributed ledgers may be utilized to execute smart contracts, described in more detail below. Process control systems can deploy smart contracts to the distributed ledger to exchange value, for example upon receiving a product in good condition. Smart contracts may also be deployed to the distributed ledger to allow machines such as field devices to transact by themselves without human intervention. For example, according to the terms of a smart contract, a computing device in a first process plant may automatically provide a predetermined token amount to a computing device in a second process plant upon receiving indications from one or more field devices in the first process plant that a product has been delivered from the second process plant and the product meets certain quality standards. Smart contracts may also be utilized in process plants for a multitude of other applications, described in more detail below.

By utilizing distributed ledgers and in some scenarios, smart contracts in process plants, each process plant or a network of process plants may provide a trusted, secure, and immutable record of transactions within the process plant. The secure, immutable, and trustless nature of distributed ledgers is particularly important in process control systems where cyber intrusions may lead to damage, destruction, and/or loss of not only plant equipment, product, and other physical assets, but also to the loss of human life. Additionally, distributed ledgers allow process plants to track product lineage from raw materials to finished products and to further track the products after they have been manufactured. Moreover, when competing entities utilize or transfer a common resource, distributed ledgers can be used to determine the amount of the resource utilized by one of the entities and fair compensation to the competing entity for the use of the resource. For example, an oil refinery may produce oil that is provided via an oil pipeline to several entities or process plants. Each process plant is responsible for compensating the oil refinery for the amount of oil in which the process plant received from the oil pipeline. Distributed ledgers can be used to record the amount of oil each process plant received from devices measuring the amount of oil at the time the oil is provided. Due to the difficulty of changing the recorded data in the distributed ledgers, competing entities do not have to trust that the data is reliable.

BRIEF DESCRIPTION OF THE DRAWINGS

FIG. 6A illustrates an example distributed ledger including a blockchain having blocks of transactions in a process control system;

FIG. 6B illustrates another example distributed ledger including multiple side blockchains or side chains maintained by different process plants and a main blockchain maintained by several process plants that incorporates transaction data from the side chains;

DETAILED DESCRIPTION

Figure 1:
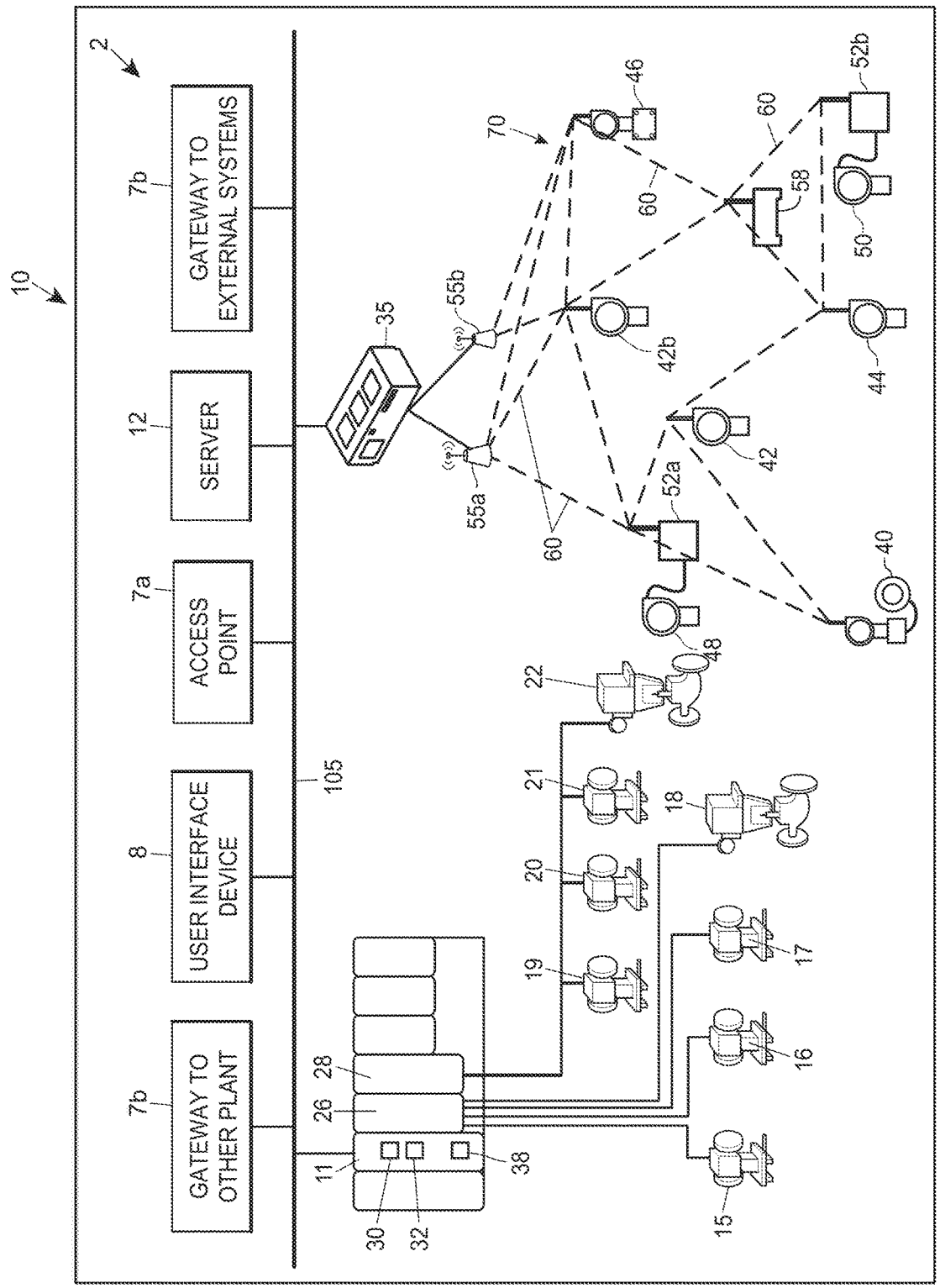
FIG. 1 is a block diagram of an example process plant or process control system, that illustrates, inter alia, interconnections between various example components of the process control system, the process control system itself, and other example systems and/or networks.

A distributed ledger is a storage mechanism for data, events, transactions, etc. that is maintained by several participants. More specifically, a distributed ledger is a way of achieving a distributed consensus on the validity or invalidity of information recorded in the distributed ledger. In other words, the distributed ledger provides a decentralized trust to participants and observers. As opposed to relying on a central authority, a distributed ledger is a decentralized database in which a transactional record of changes to the ledger is maintained and validated by each node of a peer-to-peer network. One type of distributed ledger, a blockchain, is comprised of groupings of transactions organized together into a "block," and ordered sequentially (thus the term "blockchain"). While the distributed ledgers discussed herein are referred to in the context of a blockchain, this is merely one example of a distributed ledger. Distributed ledgers may also include a tangle, a block lattice, or other directed acyclic graph (DAG). In any event, nodes may join and leave the blockchain network over time and may obtain blocks from peer nodes that were propagated while the node was gone. Nodes may maintain addresses of other nodes and exchange addresses of known nodes with one another to facilitate the propagation of new information across the network in a decentralized, peer-to-peer manner.

The nodes that share the ledger form what is referred to herein as the distributed ledger network. The nodes in the distributed ledger network validate changes to the blockchain (e.g., when a new transaction and/or block is created) according to a set of consensus rules. The consensus rules depend on the information being tracked by the blockchain and may include rules regarding the chain itself. For example, a consensus rule may include that the originator of a change supply a proof-of-identity such that only approved entities may originate changes to the chain. A consensus rule may require that blocks and transactions adhere to format requirements and supply certain meta information regarding the change (e.g., blocks must be below a size limit, transactions must include a number of fields, etc.). Consensus rules may include a mechanism to determine the order in which new blocks are added to the chain (e.g., through a proof-of-work system, proof-of-stake, etc.).

Additions to the blockchain that satisfy the consensus rules are propagated from nodes that have validated the addition to other nodes that the validating node is aware of. If all of the nodes that receive a change to the blockchain validate the new block, then the distributed ledger reflects the new change as stored on all nodes, and it may be said that distributed consensus has been reached with respect to the new block and the information contained therein. Any change that does not satisfy the consensus rule is disregarded by validating nodes that receive the change and the change is not propagated to other nodes. Accordingly, unlike a traditional system which uses a central authority, a single party cannot unilaterally alter the distributed ledger unless the single party can do so in a way that satisfies the consensus rules. The inability to modify past transactions leads to blockchains being generally described as trusted, secure, and immutable.

The validation activities of nodes applying consensus rules on a blockchain network may take various forms. In one implementation, the blockchain may be viewed as a shared spreadsheet that tracks data such as the ownership of assets. In another implementation, the validating nodes execute code contained in "smart contracts" and distributed consensus is expressed as the network nodes agreeing on the output of the executed code.

A smart contract is a computer protocol that enables the automatic execution and/or enforcement of an agreement between different parties. In particular, the smart contract may be computer code that is located at a particular address on the blockchain. In some cases the smart contract may run automatically in response to a participant in the blockchain sending funds (e.g., a cryptocurrency such as bitcoin, ether, or other digital/virtual currency) to the address where the smart contract is stored. Additionally, smart contracts may maintain a balance of the amount of funds that are stored at their address. In some scenarios when this balance reaches zero the smart contract may no longer be operational.

The smart contract may include one or more trigger conditions, that, when satisfied, correspond to one or more actions. For some smart contracts, the action(s) performed may be determined based upon one or more decision conditions. In some instances, data streams may be routed to the smart contract so that the smart contract may detect that a trigger condition has occurred and/or analyze a decision condition.

Blockchains may be deployed in a public, decentralized, and permissionless manner meaning that any party may view the distributed ledger, submit new information to be added to the ledger, or join the network as a validating node. Other blockchains are private (e.g., permissioned ledgers)

that keep chain data private among a group of entities authorized to participate in the blockchain network. Other blockchain implementations may be both permissioned and permissionless whereby participants may need to be validated, but only the information that participants in the network wish to be public is made public.

In some implementations, a distributed ledger includes multiple blockchains such as a main blockchain and several side chains operating independently of the main blockchain. The side chains then interact with the main blockchain to provide some of the transaction data from the side chains to the main blockchain. In this manner, the side chains can be private while the main blockchain is public or available to a larger number of entities than the side chains. Non-sensitive information from the side chains may be shared on the main blockchain. Also in some implementations, a distributed ledger includes multiple layers or separate blockchains executing in parallel that are maintained by the same validating nodes. Some of the transaction data from the blockchain for the first layer may be provided to the blockchain for the second layer or vice versa.

In one example, a distributed ledger in a process control system may be maintained by validating nodes referred to herein as "edge gateways" which transmit data to remote systems such as other process plants using one or more public and/or private networks, such as a private enterprise network, the Internet, a cellular router, a backhaul Internet or other type backhaul connection. The edge gateways receive transactions broadcasted to the distributed ledger network by for example, process control devices such as field devices or controllers operating in the process plant. Other computing devices such as operator workstations, server devices, or other user interface devices in the process plant may also broadcast transactions to the distributed ledger network. The edge gateways then validate the broadcasted transactions.

In another example, the edge gateways execute code contained in "smart contracts" and field devices act as "evidence oracles" which provide evidence related to quality control, compliance with regulations, delivery or receipt of a product and the quantity delivered/received, etc. to the blockchain.

FIG. 1 is a block diagram of an example process plant 10 which may be utilize any one or more of the novel distributed ledger techniques described herein. The process plant 10 (which is also interchangeably referred to herein as a process control system 10 or process control environment 10) includes one or more process controllers that receive signals indicative of process measurements made by field devices, process this information to implement a control routine, and generate control signals that are sent over wired or wireless process control communication links or networks to other field devices to control the operation of a process in the plant 10. Typically, at least one field device performs a physical function (e.g., opening or closing a valve, increasing or decreasing a temperature, taking a measurement, sensing a condition, etc.) to control the operation of a process. Some types of field devices communicate with controllers by using I/O devices. Process controllers, field devices, and I/O devices may be wired or wireless, and any number and combination of wired and wireless process controllers, field devices and I/O devices may be included in the process plant environment or system 10.

For example, FIG. 1 illustrates a process controller 11 that is communicatively connected to wired field devices 15-22 via input/output (I/O) cards 26 and 28, and that is communicatively connected to wireless field devices 40-46 via a wireless gateway 35 and a process control data highway or backbone 105. The process control data highway 105 may include one or more wired and/or wireless communication links, and may be implemented using any desired or suitable or communication protocol such as, for example, an Ethernet protocol. In some configurations (not shown), the controller 11 may be communicatively connected to the wireless gateway 35 using one or more communications networks other than the backbone 105, such as by using any number of other wired or wireless communication links that support one or more communication protocols, e.g., Wi-Fi or other IEEE 802.11 compliant wireless local area network protocol, mobile communication protocol (e.g., WiMAX, LTE, or other ITU-R compatible protocol), Bluetooth®, HART®, WirelessHART®, Profibus, FOUNDATION® Fieldbus, etc.

The controller 11, which may be, by way of example, the DeltaV controller sold by Emerson Process Management, may operate to implement a batch process or a continuous process using at least some of the field devices 15-22 and 40-46. In an embodiment, in addition to being communicatively connected to the process control data highway 105, the controller 11 is also communicatively connected to at least some of the field devices 15-22 and 40-46 using any desired hardware and software associated with, for example, standard 4-20 mA devices, I/O cards 26, 28, and/or any smart communication protocol such as the FOUNDATION® Fieldbus protocol, the HART® protocol, the WirelessHART® protocol, etc. In FIG. 1, the controller 11, the field devices 15-22 and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols, including any standards or protocols developed in the future.

The process controller 11 of FIG. 1 includes a processor 30 that implements or oversees one or more process control routines 38 (e.g., that are stored in a memory 32). The processor 30 is configured to communicate with the field devices 15-22 and 40-46 and with other nodes communicatively connected to the controller 11. It should be noted that any control routines or modules described herein may have parts thereof implemented or executed by different controllers or other devices if so desired. Likewise, the control routines or modules 38 described herein which are to be implemented within the process control system 10 may take any form, including software, firmware, hardware, etc. Control routines may be implemented in any desired software format, such as using object oriented programming, ladder logic, sequential function charts, function block diagrams, or using any other software programming language or design paradigm. The control routines 38 may be stored in any desired type of memory 32, such as random access memory (RAM), or read only memory (ROM). Likewise, the control routines 38 may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

The controller 11 implements a control strategy using what are commonly referred to as function blocks, where each function block is an object or other part (e.g., a subroutine) of an overall control routine and operates in conjunction with other function blocks (via communications called links) to implement process control loops within the process control system 10. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course, hybrid and other types of function blocks exist. Function blocks may be stored in and executed by the controller 11, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. The controller 11 may include one or more control routines 38 that may implement one or more control loops which are performed by executing one or more of the function blocks.

The wired field devices 15-22 may be any types of devices, such as sensors, valves, transmitters, positioners, etc., while the I/O cards 26 and 28 may be any types of I/O devices conforming to any desired communication or controller protocol. In FIG. 1, the field devices 15-® are standard 4-20 mA devices or HART® devices that communicate over analog lines or combined analog and digital lines to the I/O card 26, while the field devices 19-22 are smart devices, such as FOUNDATION® Fieldbus field devices, that communicate over a digital bus to the I/O card 28 using a FOUNDATION® Fieldbus communications protocol. In some embodiments, though, at least some of the wired field devices 15, 16 and 18-21 and/or at least some of the I/O cards 26, 28 additionally or alternatively communicate with the controller 11 using the process control data highway 105 and/or by using other suitable control system protocols (e.g., Profibus, DeviceNet, Foundation Fieldbus, ControlNet, Modbus, HART, etc.).

In FIG. 1, the wireless field devices 40-46 communicate via a wireless process control communication network 70 using a wireless protocol, such as the WirelessHART® protocol. Such wireless field devices 40-46 may directly communicate with one or more other devices or nodes of the wireless network 70 that are also configured to communicate wirelessly (using the wireless protocol or another wireless protocol, for example). To communicate with one or more other nodes that are not configured to communicate wirelessly, the wireless field devices 40-46 may utilize a wireless gateway 35 connected to the process control data highway 105 or to another process control communications network. The wireless gateway 35 provides access to various wireless devices 40-58 of the wireless communications network 70. In particular, the wireless gateway 35 provides communicative coupling between the wireless devices 40-58, the wired devices 15-28, and/or other nodes or devices of the process control plant 10. For example, the wireless gateway 35 may provide communicative coupling by using the process control data highway 105 and/or by using one or more other communications networks of the process plant 10.

Similar to the wired field devices 15-22, the wireless field devices 40-16 of the wireless network 70 perform physical control functions within the process plant 10, e.g., opening or closing valves, or taking measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some configurations of the process plant 10, the wireless network 70 includes non-wireless devices. For example, in FIG. 1, a field device 48 of FIG. 1 is a legacy 4-20 mA device and a field device 50 is a wired HART® device. To communicate within the network 70, the field devices 48 and 50 are connected to the wireless communications network 70 via a wireless adaptor 52A, 52B. The wireless adaptors 52A, 52B support a wireless protocol, such as WirelessHART, and may also support one or more other communication protocols such as Foundation® Fieldbus, PROFIBUS, DeviceNet, etc. Additionally, in some configurations, the wireless network 70 includes one or more network access points 55A, 55B, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communications network 70. In FIG. 1, the wireless devices 40-46 and 52-58 communicate with each other and with the wireless gateway 35 over wireless links 60 of the wireless communications network 70, and/or via the process control data highway 105.

In FIG. 1, the process control system 10 includes one or more operator workstations or user interface devices 8 that are communicatively connected to the data highway 105. Via the operator workstations 8, operators may view and monitor run-time operations of the process plant 10, as well as take any diagnostic, corrective, maintenance, and/or other actions that may be required. At least some of the operator workstations 8 may be located at various, protected areas in or near the plant 10, and in some situations, at least some of the operator workstations 8 may be remotely located, but nonetheless in communicative connection with the plant 10. Operator workstations 8 may be wired or wireless computing devices.

The example process control system 10 may further include a configuration application (not shown) and configuration database (not shown), each of which is also communicatively connected to the data highway 105. As discussed above, various instances of the configuration application (not shown) may execute on one or more user interface devices 8 to enable users to create or change process control modules and download these modules via the data highway 105 to the controllers 11, as well as enable users to create or change operator interfaces via which an operator is able to view data and change data settings within process control routines. The configuration database (not shown) stores the created (e.g., configured) modules and/or operator interfaces.

In some configurations, the process control system 10 includes one or more other wireless access points 7a that communicate with other devices using other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 7a allow handheld or other portable computing devices to communicate over a respective wireless process control communication network that is different from the wireless network 70 and that supports a different wireless protocol than the wireless network 70. For example, a wireless or portable user interface device 8 may be a mobile workstation or diagnostic test equipment that is utilized by an operator within the process plant 10. In some scenarios, in addition to portable computing devices, one or more process control devices (e.g., controller 11, field devices 15-22, or wireless devices 35, 40-58) also communicate using the wireless protocol supported by the access points 7a.

In some configurations, the process control system 10 includes one or more gateways 7b, 7c to systems that are external to the immediate process control system 10 (also referred to herein as "edge gateway" and described in more detail below). Typically, such systems are customers or suppliers of information generated or operated on by the process control system 10. For example, the process control plant 10 may include a gateway node 7b to communicatively connect the immediate process plant 10 with another process plant. Additionally or alternatively, the process control plant 10 may include a gateway node 7c to communicatively connect the immediate process plant 10 with an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

It is noted that although FIG. 1 only illustrates a single controller 11 with a finite number of field devices 15-22 and 40-46, wireless gateways 35, wireless adaptors 52, access points 55, routers 58, and wireless process control communications networks 70 included in the example process plant 10, this is only an illustrative and non-limiting embodiment. Any number of controllers 11 may be included in the process control plant or system 10, and any of the controllers 11 may communicate with any number of wired or wireless devices and networks 15-22, 40-46, 35, 52, 55, 58 and 70 to control a process in the plant 10.

Further, it is noted that the process plant or control system 10 of FIG. 1 includes a field environment (e.g., "the process plant floor") and a back-end environment (e.g., servers 12) which are communicatively connected by the data highway 105. As shown in FIG. 1, the field environment includes physical components (e.g., process control devices, networks, network elements, etc.) that are disposed, installed, and interconnected therein to operate to control the process during run-time. For example, the controller 11, the I/O cards 26, 28, the field devices 15-22, and other devices and network components 40-46, 35, 52, 55, 58 and 70 are located, disposed, or otherwise included in the field environment of the process plant 10. Generally speaking, in the field environment of the process plant 10, raw materials are received and processed using the physical components disposed therein to generate one or more products.

The back-end environment of the process plant 10 includes various components such as server computing devices 12, operator workstations 8, databases or databanks, etc. that are shielded and/or protected from the harsh conditions and materials of the field environment. Referring to FIG. 1, the back-end environment includes, for example, the operator workstations 8, server computing devices 12, and/or functionality that support the run-time operations of the process plant 10. In some configurations, various computing devices, databases, and other components and equipment included in the back-end environment of the process plant 10 may be physically located at different physical locations, some of which may be local to the process plant 10, and some of which may be remote.

Figure 2:
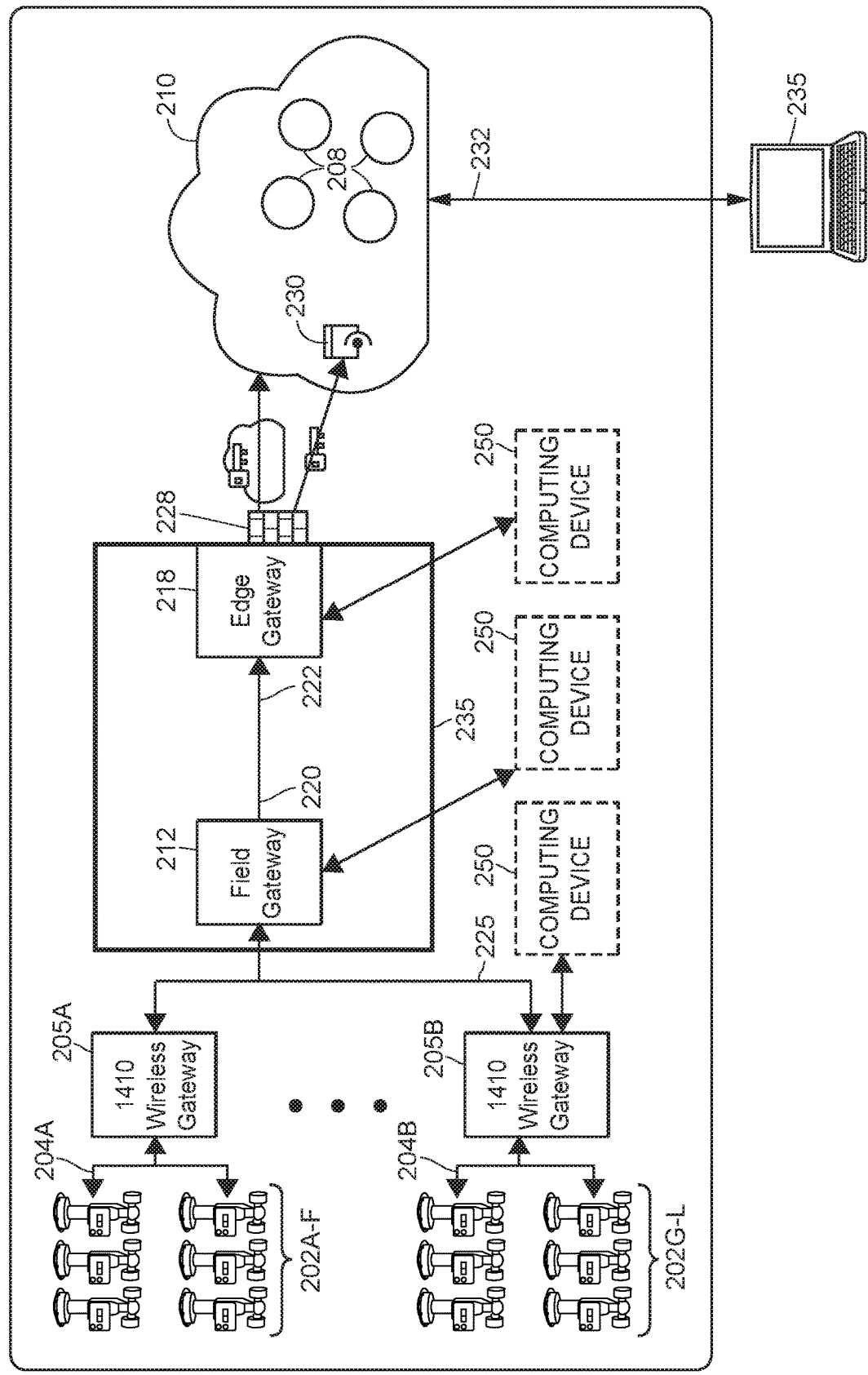
FIG. 2 is a block diagram of an example security architecture for a process plant or process control system.

FIG. 2 includes a block diagram of an example security architecture 200 for the process plant 10. As shown in FIG. 2, one or more devices 202 are communicatively connected to one or more wireless gateways 205A, 205B which, for example, may be instances of the wireless gateway 35 of FIG. 1. The communicative connections between the gateways 205A, 205B and the devices 202 are denoted by the references 204A, 204B.

The set of devices 202 is depicted as comprising a finite number of wireless field devices. However, it is understood that the concepts and features described herein with respect to the devices 202 may be easily applied to any number of field devices of the process plant 10, as well as to any types of field devices. For example, the field devices 202 may include one or more wired field devices 15-22 that are communicatively connected to the wireless gateways 205A, 205B via one or more wired communication networks of the process plant 10, and/or the field devices 202 may include wired field devices 48, 50 that are coupled to wireless adaptors 52A, 52B.

Further, it is understood that the set of devices 202 is not limited to only field devices, but may additionally or alternatively include any device or component within the process plant 10 that generates data as a result of the process plant 10 controlling the on-line process. For example, the set of devices 202 may include a diagnostic device or component that generates diagnostic data, a network routing device or component that transmits information between various components of the process plant 10, and the like. Indeed, any of the components shown in FIG. 1 (e.g., components 7a-7c, 8, 11, 12, 15-22, 26, 28, 35, 40-46, 52, 55, 58, 60, and 70) and other components that are not shown may be a device that generates data for delivery to the remote system 210. As such, the set of devices 202 is referred to interchangeably herein as "data sources 202" or "data source devices 202."

FIG. 2 further illustrates a set of remote applications or services 208 that may be utilized for the process plant 10 and/or that the process plant 10 utilizes. The set of remote applications or services 208 may execute or be hosted at one or more remote systems 210. At least some of the applications or services 208 operate in real-time on real-time data as the real-time data is generated by the process plant 10 and received by the applications or services 208. Other applications or services 208 may operate or execute on process plant-generated data with less stringent timing requirements. Examples of applications/services 208 that may execute or be hosted at the remote system 210 and that are consumers of data generated by the process plant 10 include applications that monitor and/or sense conditions and/or events occurring at the process plant 10, and applications or services that monitor at least a portion of the on-line process itself as it is executing at the process plant 10. Other examples of applications/services 208 include descriptive and/or prescriptive analytics, which may operate on data generated by the process plant 10 and, in some cases, may operate on knowledge gleaned or discovered from analyzing the process plant-generated data, as well as on data generated by and received from other process plants. Still other examples of applications/services 208 include one or more routines that implement prescriptive functions and/or changes that are to be implemented back into the process plant 10, e.g., as a result of another service or application. Other examples of applications and services 208 operate on knowledge gleaned from analyzing historical data generated by the process plant and/or other process plants or from comparing data for a process plant entity to data process plant entities of a same or similar type.

The one or more remote systems 210 may be implemented in any desired manner, such as by a remote bank of networked servers, one or more cloud computing systems, one or more networks, etc. For ease of discussion, the one or more remote systems 210 are referred to herein using the singular tense, i.e., "remote system 210," although it is understood that said term may refer to one system, more than one system, or any number of systems. In some scenarios, the computing device 250 which analyzes process plant data may be included within the remote system 210.

Generally speaking, the security architecture 200 provides end-to-end security from the field environment of the process plant 10 in which devices 202 are installed and operate, to the remote system 210 providing applications and/or services 208 that consume and operate on the data generated by the process plant 10. As such, data that is generated by the devices 202 and other components of the process plant 10 is able to be securely transported to the remote system 210 for use by the remote applications/services 208 while protecting the plant 10 from cyber attacks, intrusions, and/or other malicious events. In particular, the security architecture 200 includes a field gateway 212, and an edge gateway 218 disposed between the process plant 10 (e.g., between the wireless gateways 205A, 205B of the process plant 10) and the remote system 210.

Data that is egressed from the process plant 10 and transmitted from the input port 220 to the output port 222 may be further secured by encryption. In an example, the field gateway 212 encrypts data and delivers encrypted data to the input port 220. The data traffic that is encrypted and transported may be UDP (User Datagram Protocol) data traffic, in an example, and may be JSON data traffic or some other general purpose communication format, in another example.

The field gateway 212 communicatively connects to the process control plant 10. As shown in FIG. 2, the field gateway 212 is communicatively connected to the wireless gateways 205A, 205B that are disposed within the field environment of the process plant 10, and that are communicatively connected to one or more devices or data sources 202. As previously discussed, the devices or data sources 202 and the wireless gateways 205A, 205B may communicate using the WirelessHART industrial protocol or other suitable wireless protocol that is structured to provide secured communications via one or more security mechanisms. For instance, the WirelessHART industrial protocol provides 128-bit AES encryption, and the communication paths 204A, 204B may be secured accordingly.

Additionally, the communicative connection 225 between the wireless gateways 205A, 205B and the field gateway 212 is respectively secured using the same or a different security mechanism as utilized for the communicative connections 204A, 204B. In an example, the communicative connection 225 is secured by a TLS (Transport Layer Security) wrapper. For instance, the wireless gateways 205A, 205B generate packets in the HART-IP format which are secured by a TLS wrapper for transit to the field gateway 212.

Thus, as described above, in an embodiment, data or packets generated by the devices 202 may be secured for transit 204A, 204B to the wireless gateways 205A, 205B using a first security mechanism, and subsequently secured for transit 225 from the wireless gateways 205A, 205B to the field gateway 212 using a second security mechanism, and still subsequently secured for transit to the edge gateway 218 using a third security mechanism. Additionally or alternatively, and as depicted in FIG. 2, the edge gateway 218 may be protected by a firewall 228.

Data transiting from the edge gateway 218 to the remote system 210 may be delivered using one or more public and/or private networks, such as a private enterprise network, the Internet, a cellular router, a backhaul Internet or other type backhaul connection. Significantly, the data transiting from the edge gateway 218 to the remote system 210 is secured by using a fourth security mechanism or by using one of security mechanisms previously discussed above. FIG. 2 depicts the data traffic delivered from the edge gateway 218 to the remote system 210 as being secured via an SAS (Shared Access Signature) Token, which may be managed through a token service 230 provided at the remote system 210. The edge gateway 218 authenticates to the token service 230 and requests an SAS token, which may be valid for only a finite period of time, e.g., two minutes, five minutes, thirty minutes, no more than an hour, etc. The edge gateway 218 receives and uses the SAS token to secure and authenticate an AMQP (Advanced Message Queuing Protocol) connection to the remote system 210 via which content data is transmitted from the edge gateway 218 to the remote system 210.

At the remote system 210, security is provided via a domain authentication service 232. As such, only user interface devices 235 that are authenticated and authorized via the domain authentication service 232 are able gain access to at least some of the data that is available at the remote system 210, which includes, inter alia, the data generated by the devices 202.

Thus, as described above, the security architecture 200 provides end-to-end security for data generated by devices or data sources 202 while operating in the process plant 10 to control a process, e.g., from the data's inception by the data sources 202 through its transmission to the remote system 210 to be operated on by one or more remote applications or services 208. Importantly, the security architecture 200 provides this end-to-end security while preventing malicious attacks from being incurred on the process plant 10.

It is noted that although FIG. 2 depicts wireless gateways 205A, 205B as communicatively connecting the devices or data sources 202 to the field gateway 212, in some arrangements one or more of the wireless gateways 205A, 205B are omitted and source data is transmitted from the data sources 202 directly to the field gateway 212. For example, the data sources 202 may transmit source data directly to the field gateway 212 via a big data network of the process plant 10. Generally speaking, a big data network of the process plant 10 is not the backbone plant network 105, nor is the big data network an industrial protocol network used to transmit control signals between devices using an industrial communication protocol (e.g., Profibus, DeviceNet, Foundation Fieldbus, ControlNet, Modbus, HART, etc.). Rather, a big data network of the process plant 10 may be an overlay network implemented for the process plant 10 that streams data between nodes for data processing and analytics purposes, for example. The nodes of a big data network may include, for example, the data sources 202, the wireless gateways 205A, 205B, and the field gateway 212, as well as any one or more of the components 7a-7c, 8, 11, 12, 15-22, 26, 28, 35, 40-46, 52, 55, 58, 60, and 70 shown in FIG. 1 and other components. Accordingly, for many nodes of a process plant data network include, respectively, a designated interface for process plant operations that typically utilizes an industrial communication protocol, and another designated interface for data processing/analytics operations that may utilize a streaming protocol, for instance.

It is further noted with respect to FIG. 2 that in some embodiments, a wired gateway (not shown) may be utilized in lieu of one of the wireless gateways 205A, 205B. Still further, the field gateway 212 and the edge gateway 218 may be physically co-located, such as indicated by the box 235 shown in FIG. 2, or the components 212 and 218 may be physically located across multiple locations. For example, one or more of the field gateway 212 or the edge gateway 218 may be disposed at the process plant 10. Additionally or alternatively, one or more of the field gateway 212 or the edge gateway 218 may be disposed remotely from the process plant 10.

The process plant 10 may be serviced by more than one field gateway 212, if desired, and any number of field gateways 210 may be serviced by a single edge gateway 218. In some embodiments, the remote system 210 is serviced by more than one edge gateway 218, if desired.

While the example above refers to the computing device 250 for analyzing process plant data as a component of the remote system 210, the computing device 250 may receive process plant data by communicating with any suitable communication component in a secure manner. For example, the computing device 250 may be communicatively connected to the wireless gateways 205A, 205B, the field gateway 212, or the edge gateway 218. The communication paths may be secured from the devices 202 to the computing device 250 via encryption techniques, firewalls, a data diode, or with any other suitable security mechanism.

Once the process plant data is received at the computing device 250, the computing device analyzes the process plant data to identify conditions in corresponding process plant entities. Indications of the conditions are then transmitted to the user interface device 235 via a domain authentication service, for example. In this manner, an operator may view the conditions occurring at various process plant entities within the process plant. The operator may then take the appropriate actions to resolve issues created by these conditions.

Distributed Ledger Architecture in a Process Control System

Figure 3:
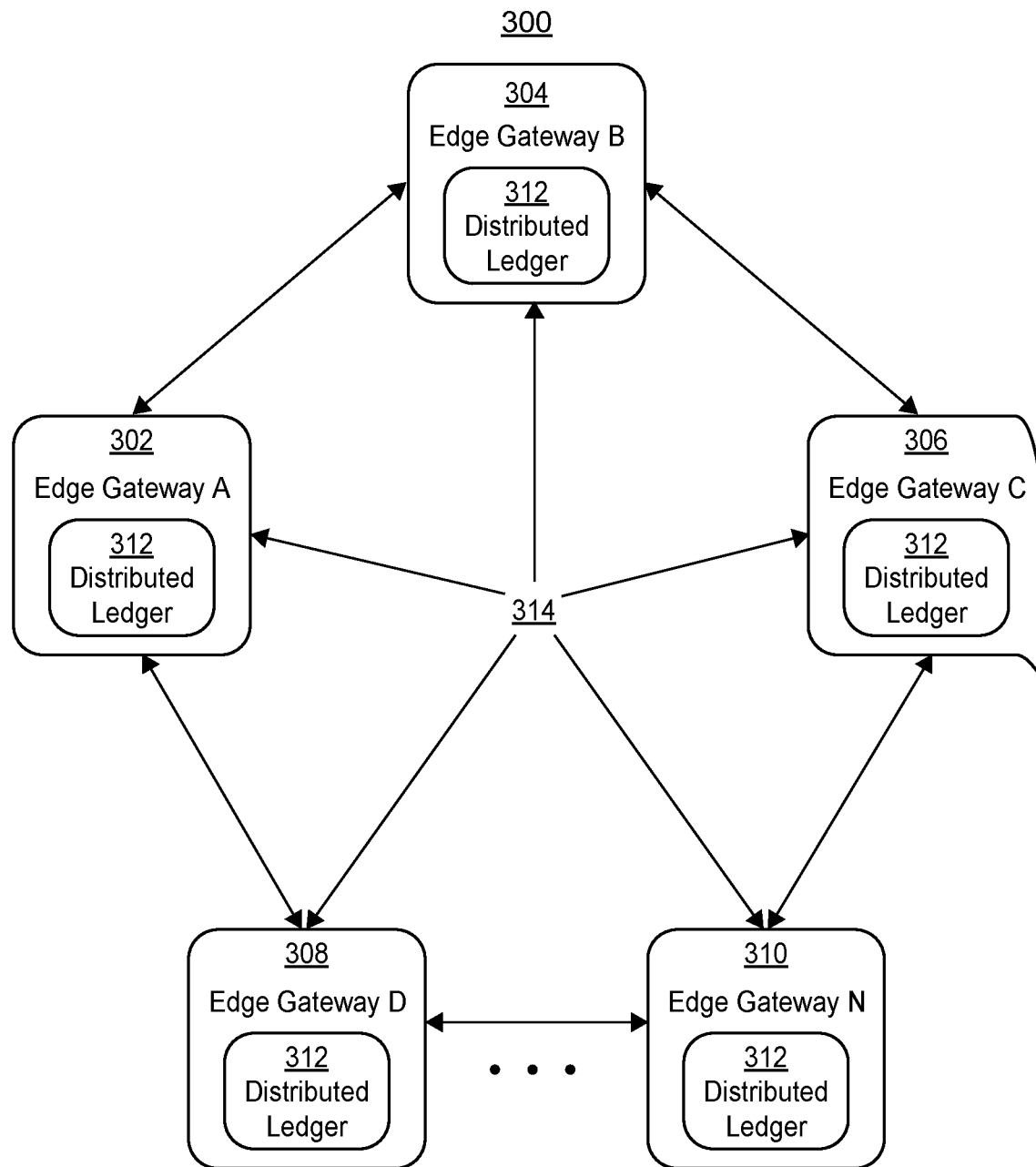
FIG. 3 is an exemplary distributed ledger system for recording transactions and executing smart contracts in a process control system.

While the process plant 10 is illustrated in FIG. 2 as including a single edge gateway 218, the process plant 10 may include several edge gateways each acting as a validating node in a distributed ledger network. FIG. 3 depicts an exemplary distributed ledger system 300 for recording process plant data. Process plant data may include process parameter data, product parameter data, configuration data, user interaction data, maintenance data, commissioning data, plant network data, product tracking data, event data related to events in the process plant 10 such as alarms, leaks, failures, errors, etc., or any other suitable data generated in or related to one or several process plants.

The system 300 includes a distributed ledger 312 and plurality of nodes 302, 304, 306, 308, and 310, which may be edge gateways in the process plant 10, such as the edge gateway 218, may be field devices, or may be any suitable computing devices operating in the process plant 10 or other process plants. Each node maintains a copy of the distributed ledger 312. As changes are made to the distributed ledger 312, each node receives the change via the network 314 and updates its respective copy of the distributed ledger 312. A consensus mechanism may be used by the nodes 302-310 in the distributed ledger system 300 to decide whether it is appropriate to make received changes to the distributed ledger 312.

Each node in the system therefore has its own copy of the distributed ledger 312, which is identical to every other copy of the distributed ledger 312 stored by the other nodes. The distributed ledger system 300 may be more robust than a central authority database system because of the distributed ledger's decentralized nature. As such, there is no single point of failure on the distributed ledger system 300 as there would be in a centralized system.

Figure 4:
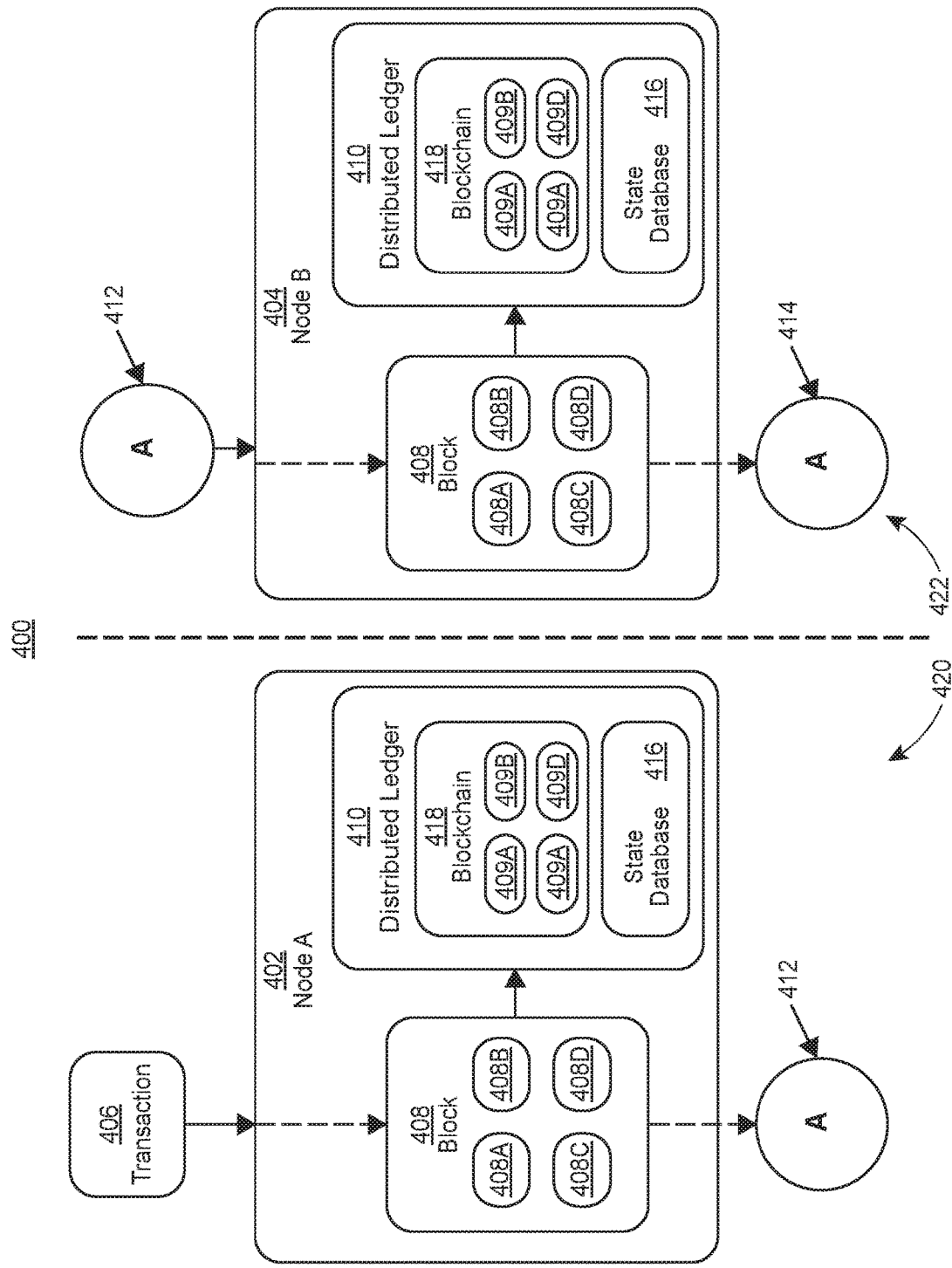
FIG. 4 illustrates exemplary validating network nodes and an exemplary transaction flow on a distributed ledger network in a process control system.

FIG. 4 depicts exemplary validating network nodes and an exemplary transaction flow 400 on a distributed ledger network for resolving transactions. FIG. 4 includes two time frames 420 and 422 represented by the left and right sides of the dotted line, respectively, Node A 402 and Node B 404 (which may be two edge gateways in a process plant 10, may be two edge gateways in two different process plants, may be two field devices in the same or different process plants, etc.), a set of transactions 408A-408D, a set of blocks of transactions 409A-409D, a distributed ledger 410, and a blockchain 418.

The block propagation flow 400 may begin with Node A 402 receiving transaction 406 at time 420. When Node A 402 confirms that transaction 406 is valid, Node A 402 may add the transaction to a newly generated block 408. As part of adding the transaction 406 to block 408, Node A 402 may solve a cryptographic puzzle and include the solution in the newly generated block 408 as proof of the work done to generate the block 408. Alternatively, a proof of stake algorithm may be used to generate the block 408, whereby Node A 402 "stakes" an amount of a digital token used on the network, however, the network itself determines the node that will mint the new block. In other embodiments, the transaction 406 may be added to a pool of transactions until a sufficient number of transactions in the pool exist to form a block. Node A 402 may transmit the newly created block 408 to the network at time 412. Before or after propagating the block 408, Node A 402 may add the block 408 to its copy of the blockchain 418.

While proof of work and proof of stake are described herein as consensus algorithms for selecting a node to mint a new block, these are merely a few example consensus algorithms and are not intended to be limiting. Additional consensus algorithms may be utilized, such as delegated proof of stake where nodes elect a subset of nodes referred to as delegates to perform validation, and the delegates take turns minting new blocks. Consensus algorithms may also include proof of authority, proof of weight, Byzantine fault tolerance, tangle consensus algorithms, block lattice consensus algorithms, etc.

In any event, the transactions 409A-409D may include updates to a state database 416. The state database 416 may contain current values of variables created by smart contracts deployed on the blockchain 418. Validated blocks, such as block 408, may include transactions effecting state variables in state database 416. At time 422, Node B 404 may receive the newly created block 408 via the network at 412. Node B 404 may verify that the block of transactions 408 is valid by checking the solution to the cryptographic puzzle provided in the block 408. If the solution is accurate, then Node B 404 may add the block 408 to its blockchain 418 and make any updates to the state database 416 as rejected by the transactions in block 408. Node B 404 may then transmit the block 408 to the rest of the network at time 314.

Figure 5:
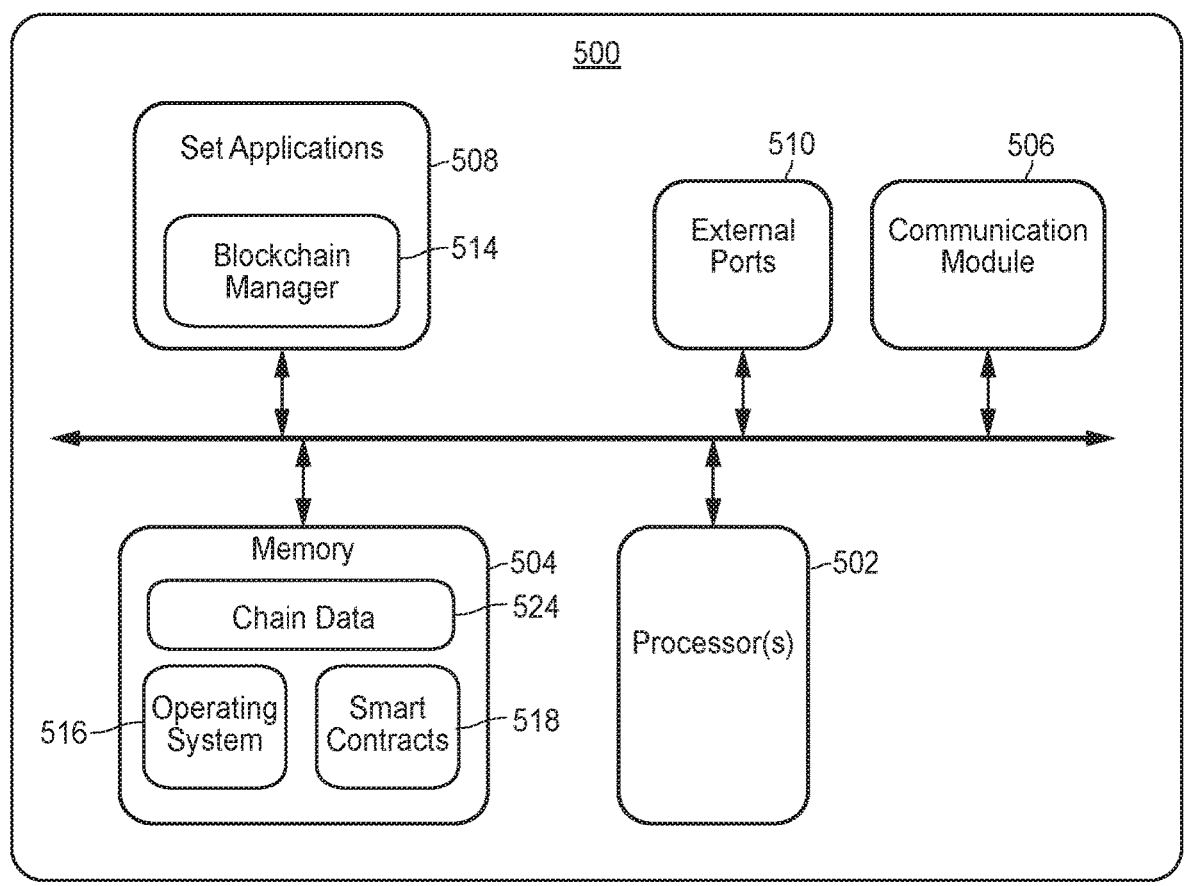
FIG. 5 illustrates exemplary components of a network node on a distributed ledger network in a process control system.

FIG. 5 depicts exemplary components of a validating network node 500 on a distributed ledger network for recording process plant data. Node 500 may include at least one processor 502, memory 504, a communication module 506, a set of applications 508, external ports 510, a blockchain manager 514, smart contracts 516, and an operating system 518. In some embodiments, the node 500 may generate a new block of transactions, or may broadcast transactions to other network nodes by using the blockchain manager 514. Similarly, the node 500 may use the blockchain manager 514 in conjunction with the smart contracts 516 stored in the memory 504 to execute the functionality disclosed herein. The memory 504 may further include chain data 524 including, for example, a state database of the blockchain for storing states of smart contracts deployed thereon.

In other embodiments, the smart contracts 516 operate independent of the blockchain manager 514 or other applications. In some embodiments, the node 500 does not have a blockchain manager 514, or smart contracts 516 stored at the node. In some embodiments, the node 500 may have additional or fewer components than described. The components of the node 500 are described in more detail below.

The node 500, as part of a decentralized ledger system 300, or another decentralized or centralized network, may be used as part of systems that interact with and/or manipulate transactions associated with data or events occurring in one or several process plants.

FIG. 6A depicts an exemplary distributed ledger 600 including a blockchain having blocks 602-608 of transactions in a process control system. In some embodiments, the blockchain 600 includes several blocks 602-608 connected together to form a chain of blocks 602-608 of transactions. To cryptographically link blocks and transactions together, each block in the blockchain 600 organizes its transactions into a Merkle Tree. In a Merkle Tree each transaction is hashed according to a cryptographic hashing algorithm (e.g., SHA-256) and the resulting output hash is then combined with the hash of another transaction. Then the combined result is also hashed according to the cryptographic hashing algorithm. This output is then combined with the hash of two other transactions and this process is repeated until all of the transactions in the block are combined and hashed to generate a Merkle root that is used in the header for a block 602-608. If any single transaction in the block is tampered with, a different Merkle root would be generated since the Merkle root is a combination of the hashes of all of the transactions in the block.

In other words, the transactions may be hashed using a cryptographic hash algorithm, such as the algorithms discussed above, and the hash of each transaction may be stored in the tree. As the tree is constructed the hash of each adjacent node at the same level may be hashed together to create a new node that exists at a higher level in the tree. Therefore, the node at the top of the tree or Merkle root, is dependent upon the hash of each transaction stored below in the tree. Each transaction may include a set of data. The set of data may include identifying data for the transaction, and transaction data identifying the nature of the transaction and what the transaction entails (e.g., input and output addresses, a transaction value, a document hash value, a timestamp, a transaction fee value, etc.).

To verify that a block is valid, a node may compare the Merkle root of the block to the Merkle root for the same block included in other nodes' copies of the blockchain. Thus, the Merkle root can be used as proof of the transactions included in the block and as proof that the contents of the block have not been tampered with if the Merkle root is the same in each node's copy of the block.

In one implementation, documents stored "on" a blockchain are documents that have been hashed according to a cryptographic hashing algorithm (e.g., SHA-256) and the resulting output hash has been included in a transaction in a block that has been accepted by the network nodes as satisfying the consensus rules of the blockchain. As such, the documents may be later verified or validated by comparing the hash of the documents to the hash stored on the blockchain. For example, if a set of documents results in a SHA-256 hash that was recorded on a blockchain on a certain date, then the blockchain provides cryptographic proof that the documents existed as of that date.

One way of storing a document on a blockchain is to broadcast a transaction including a hash of the document to the network, which will be included in a block if the transaction satisfies all of the consensus rules of the network. In some implementations, the blockchain is a permissioned ledger, meaning only authorized network participants may broadcast transactions. In other implementations, only some authorized network participants may make certain transactions. For example, product parameter data indicating properties of a product generated in a process plant 10 may be uploaded by a field device to the blockchain 600 as the field device determines the product's properties (e.g., a temperature of the product, a volume of the product, a mass of the product, a density of the product, a pressure of the product, etc.). Only a cryptographic hash of the data may be included in the blockchain 600, such that the data may be verified using the blockchain even if it is obtained by a party off-chain.

Validating network nodes may verify that the signed transaction or signed message was signed by the private cryptographic key corresponding to the published public cryptographic key owned by the field device collecting the measurements. In at least one implementation, a valid proof-of-identity may be applied as a consensus rule by the blockchain network. As such, any transaction attempting to add new product parameter data without a cryptographic proof-of-identity matching an identity authorized to add new product parameter data is rejected by the network as non-compliant with the consensus rule. Each field device in a process plant 10 may be assigned a public key/private key pair which is identified in the blockchain network as corresponding to the field device. Additionally, each field device may be authorized to collect certain types of measurements. For example, a first field device may be authorized to collect temperature measurements for a product while a second field device may be authorized to collect volume measurements indicating the volume of the product manufactured. If the validating network nodes receive a transaction regarding product parameter data that is not from an authorized field device or includes a type of measurement that the field device is not authorized to collect, the validating network nodes reject the transaction.

FIG. 6B depicts another exemplary distributed ledger 650 including a different architecture from the architecture described in FIG. 6A. The distributed ledger 650 in FIG. 6B includes a blockchain 660 having blocks 662-668 of transactions in a process control system, similar to the distributed ledger 600 in FIG. 6A. The blockchain 660 may be referred as the main blockchain in the distributed ledger 650. In addition to the main blockchain 660, the distributed ledger 650 includes multiple side blockchains 670, 680 or side chains maintained by different process plants having blocks 672-676, 682-686 of transactions. For example, the side chain 670 may be maintained by two process plants: Plant A and Plant B to record transactions related to events occurring within or between the two process plants. These transactions may include Plant B sending payment in the form of a token value to Plant A when Plant A ships a product to Plant B. The side chain 680 may also be maintained by two process plants: Plant C and Plant D to record transactions related to events occurring within or between the Plant C and Plant D. These transactions may include Plant D recording the amount of oil received from Plant C within a particular time period.

In some embodiments, the main blockchain 660 is maintained by several process plants including Plants A-D along with several other process plants. Also in some embodiments, the side chains 670, 680 interact with the main blockchain 660 to provide at least some of the transactions in their respective blocks 672-676, 682-686 to the main blockchain 660. In this manner, the side chains 670, 680 may include data from transactions related to the process plants maintaining them. The main blockchain 660 may include data from transactions related to each of the process plants. Additionally, the side chains 670, 680 may include private or sensitive data that is not meant to be shared outside of the process plants maintaining a particular side chain. Data from the side chain 670 which is not private or sensitive may be provided to the main blockchain 660, while the private or sensitive data is not provided to the main blockchain 660. For example, side chain 670 may execute a smart contract between Plant A and Plant B that transfers a token value from Plant A to Plant B when Plant A receives a product from Plant B that meets certain quality standards. Plants A and B may not want to disclose all of the terms of the smart contract to the public or to a large group of process plants by deploying the smart contract on the main blockchain 660, or may not want each measurement of the product's properties to be provided to the public or a large group of process plants. Additionally, the memory storage requirements for the main blockchain 660 increase as more transactions are added to the main blockchain 660. Accordingly, it may reduce memory requirements for validating nodes in the distributed ledger network to store some transactions off the main blockchain 660. In any event, when the smart contract determines that Plant A has received a product from Plant B that meets the requisite quality standards, the transaction transferring the token value from Plant A to Plant B may be provided to the main blockchain 660.

In some embodiments, the main blockchain 660 is a public blockchain meaning that any party may view the distributed ledger, submit new information to be added to the ledger, or join the network as a validating node. The side chains 670, 680 are private or permissioned blockchains that keep chain data private among a group of entities authorized to participate in the side blockchain network (e.g., the side chain 670 may be private between Plant A and Plant B). In other embodiments, the main blockchain 660 is also a permissioned blockchain but the main blockchain has a larger number of entities authorized to participate in the blockchain network than the side chains 670, 680. For example, the main blockchain 660 may be private between a large number of process plants including Plants A-D and several other process plants, whereas the side chain 670 is private between Plant A and Plant B.

In addition or as an alternative to side chains, the distributed ledger 650 may include other forms of transactions which occur off-chain that are not a part of the main blockchain 660. For example, two parties such as Plant A and Plant B may open up a payment channel, where an initial transaction exchanging a threshold amount of a token between Plant A and Plant B is provided to the main blockchain 660. Then Plant A and Plant B may transact with each other without recording anything on the main blockchain 660 as long as they are sending portions of the threshold amount back and forth to each other, and none of the transactions result in one of the process plants having more than the threshold amount. When the two process plants are done transacting with each other, they may close the payment channel and provide the final token amounts for each process plant in the main blockchain 660. For example, Plant A and Plant B may open up a payment channel when Plant A sends two tokens to Plant B. Plant B can then send one token back to Plant A so that each process plant has one token, Plant B can send 0.5 tokens back to Plant A and so forth, so long as neither process plant has more than two tokens. In other embodiments, the distributed ledger 650 may include multiple blockchain layers including separate blockchains operating independently of each other. For example, a first blockchain layer may record transactions related to the supply chain, while a second blockchain layer may record transactions related to the exchange of tokens. The first blockchain layer may be public while the second blockchain layer is private or vice versa.

In addition to protecting privacy via side chains or off-chain transactions, in some embodiments, privacy may be preserved on a public blockchain, such as the blockchain 600 as shown in FIG. 6A. For example, the transactions in the blockchain 600 may obfuscate the identities of the parties to the transaction and the transaction amounts through various encryption techniques.

Figure 7A:
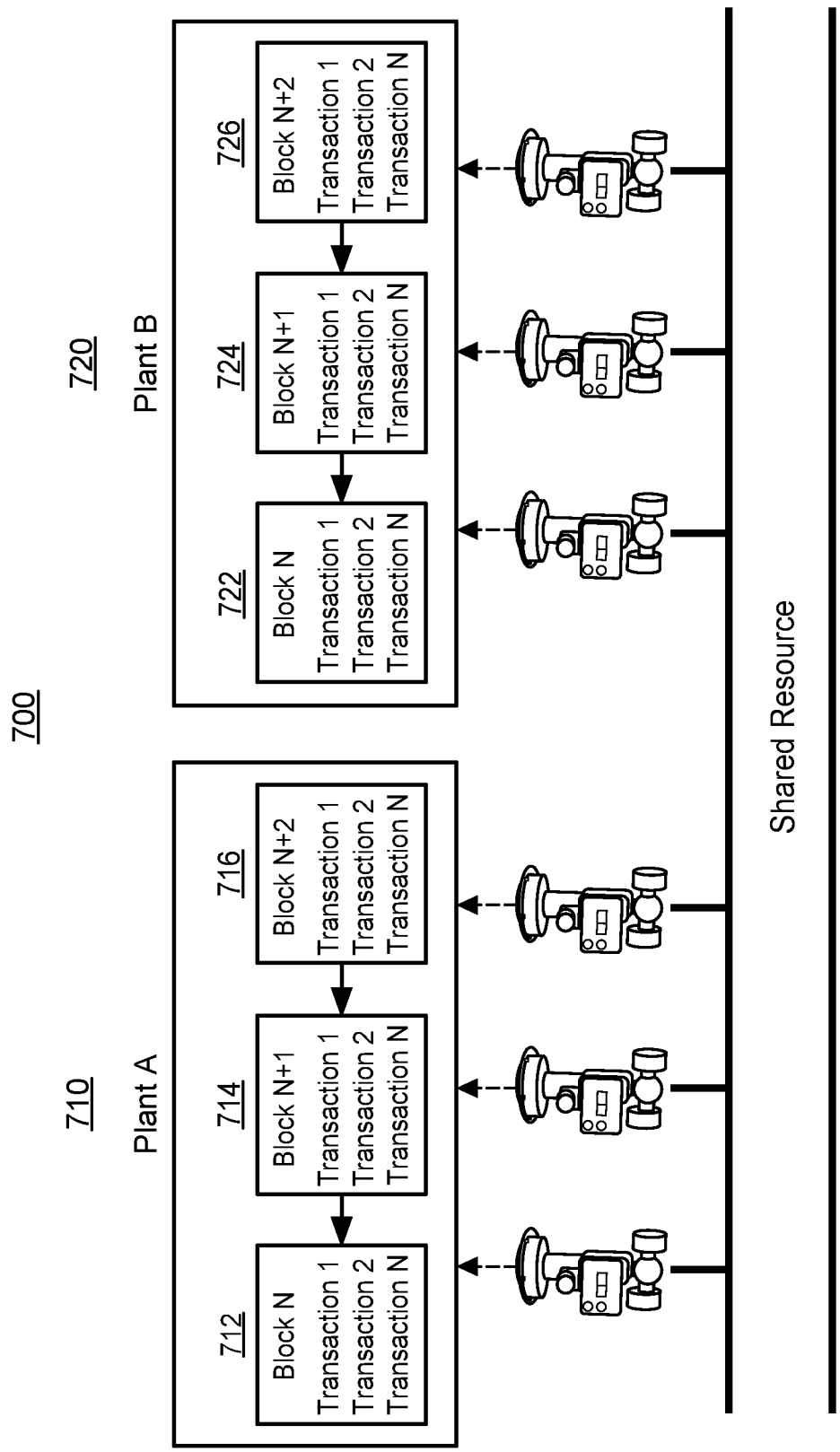
FIG. 7A illustrates yet another example distributed ledger including multiple local blockchains each maintained by a different process plant.
Figure 7B:
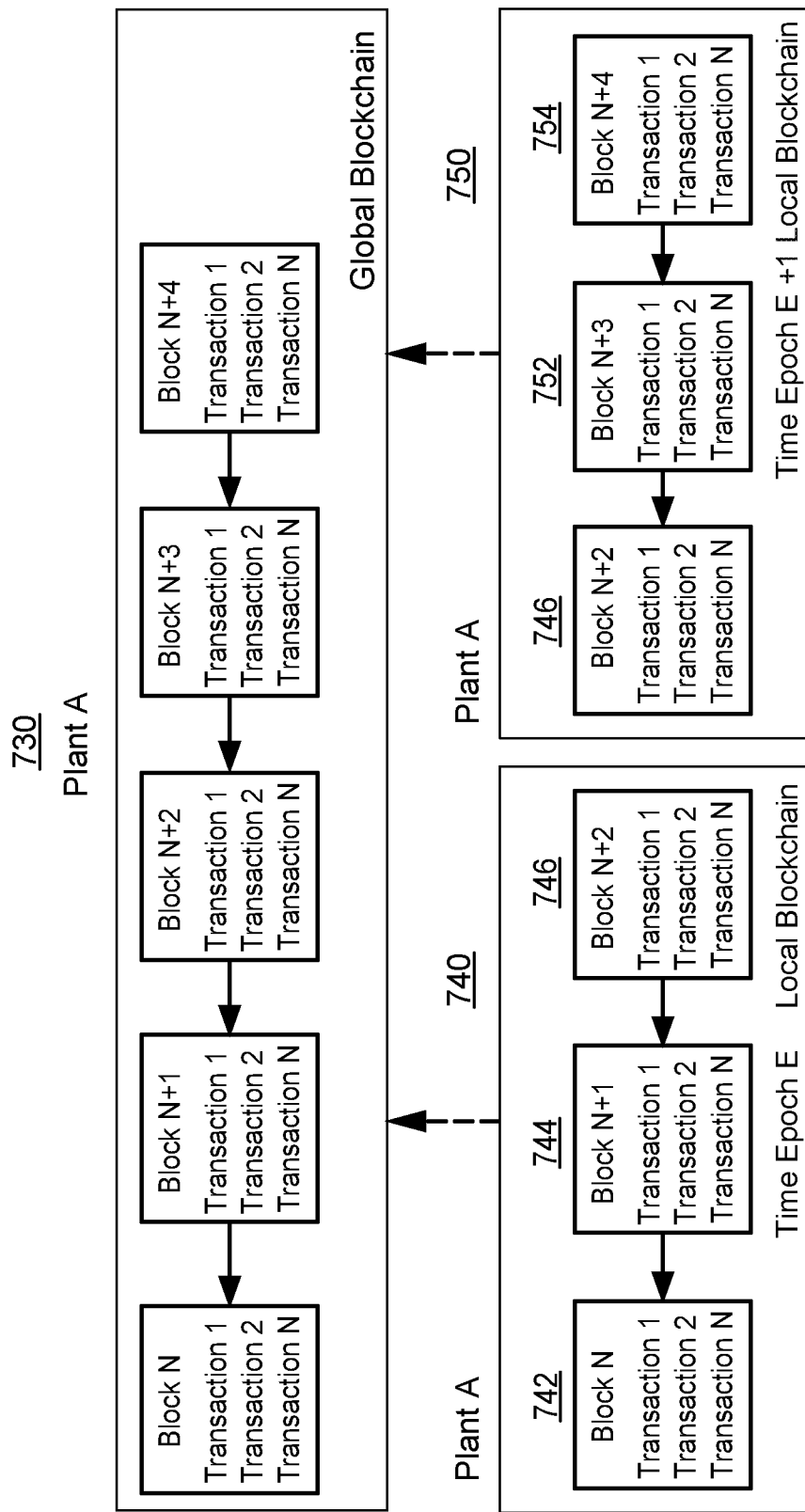
FIG. 7B illustrates a global blockchain for a process plant that is maintained by several process plants and that incorporates blocks from the local blockchain.
Figure 7C:
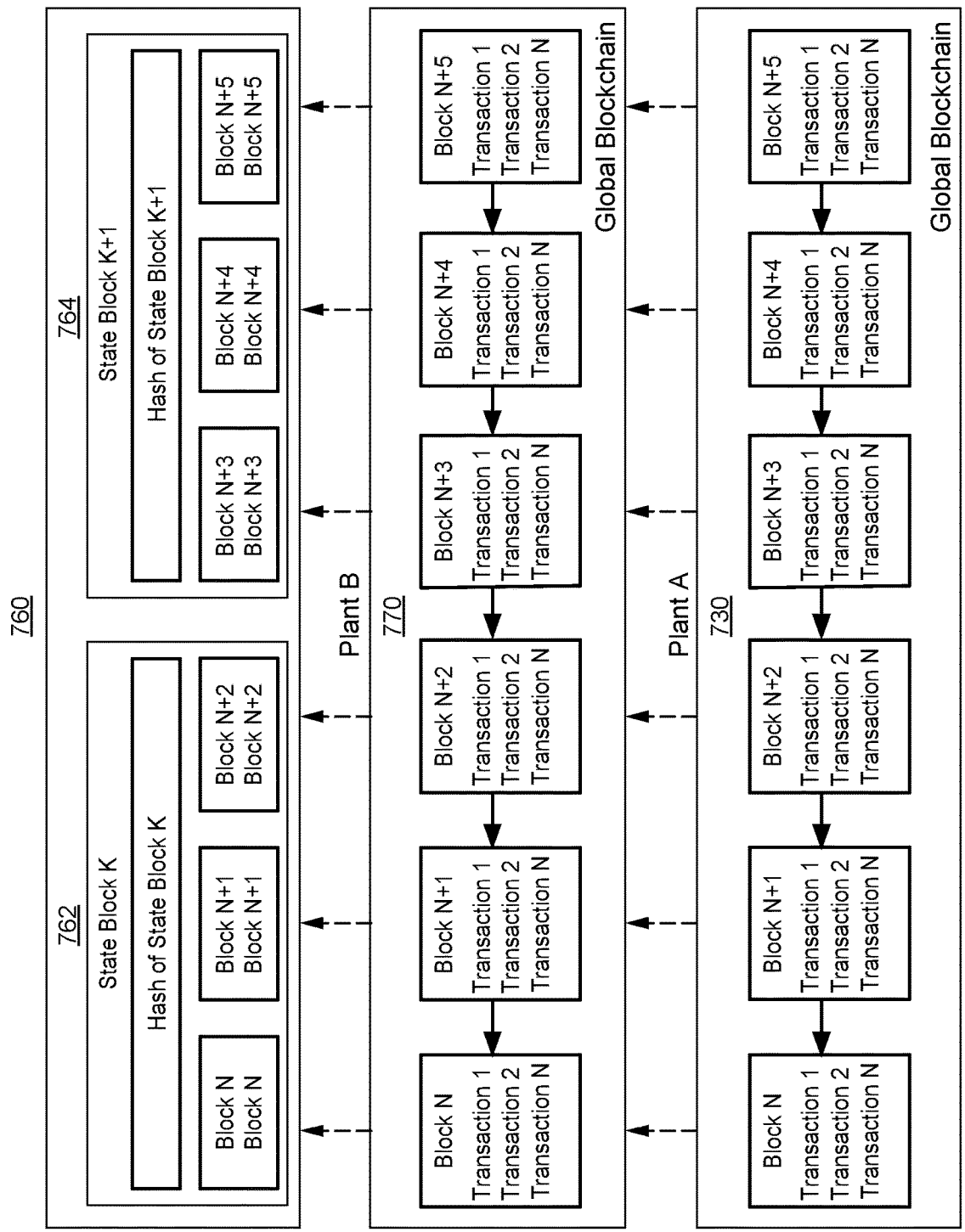
FIG. 7C illustrates a super blockchain maintained by several process plants that incorporates blocks from each of the global blockchains for each process plant.

FIGS. 7A-7C depict another exemplary distributed ledger 700 including a different architecture from the architecture described in FIG. 6A. The distributed ledger 700 in FIGS. 7A-7C includes multiple local blockchains 710, 720, where each local blockchain 710, 720 is maintained by a different party or process plant. Each local blockchain 710, 720 includes a block of transactions 712-716, 722-726 in a process control system. For example, multiple process plants may share a resource, such as oil from an oil pipeline, electricity from an electric power generation system, a product over rail, automotive, marine, or airborne transportation, a product through a liquid, gas, steam, fuel, or materials pipeline, or water from a water distribution system. Field devices in Plant A may collect measurements regarding the shared resource such as an amount of oil obtained from the pipeline, and broadcast the measurement data in transactions to the local blockchain for Plant A. Similarly, field devices in Plant B may collect measurements regarding the shared resource, and broadcast the measurement data in transactions to the local blockchain for Plant B.

As shown in FIG. 7B, transactions from each local blockchain 710, 720 are provided to a global blockchain 730 for the respective party or process plant, where the global blockchain 730 is maintained by several process plants and/or via cloud services having several cloud computing systems. For example, blocks from the local blockchain 710 for Plant A are provided to the global blockchain 730 for Plant A, blocks from the local blockchain 720 for Plant B are provided to the global blockchain for Plant B, etc. The blocks of transactions may be provided from local blockchains to corresponding global blockchains after a threshold time period or epoch. In this manner, validating nodes within a particular process plant maintaining each local blockchain may remove or prune blocks from the local blockchain that have been provided to the global blockchain other than the most recent block to reduce storage requirements.

As shown in FIG. 7B, block N (ref. no. 742), block N+1 (ref. no. 746), and block N+2 (ref. no. 748) are added to the local blockchain 710 for Plant A during time epoch E (ref. no. 740). After the threshold time period for time epoch E has expired, the validating nodes maintaining the local blockchain 710 for Plant A provide blocks N-N+2 (ref. no. 742-746) to the global blockchain 730 for Plant A. Then the validating nodes maintaining the local blockchain 710 for Plant A remove or prune block N (ref. no. 742) and block N+1 (ref. no. 744) from the local blockchain 710 to reduce storage requirements. The local blockchain 710 at this time only includes the most recent block, block N+2 (ref. no. 746). Then during time epoch E+1 (ref. no. 750), block N+3 (ref. no. 752) and block N+4 (ref. no. 754) are added to the local blockchain 710. After the threshold time period for time epoch E+1 has expired, the validating nodes maintaining the local blockchain 710 for Plant A provide blocks N+3-N+4 (ref. nos. 752-754) to the global blockchain 730 for Plant A. Then the validating nodes maintaining the local blockchain 710 for Plant A remove or prune blocks N+2-N+3 (ref. nos. 746, 752) from the local blockchain 710. The local blockchain 710 at this time only includes the most recent block, block N+4 (ref. no. 754).

As shown in FIG. 7C, the validating nodes maintaining the global blockchains, such as the global blockchain for Plant A 730 and the global blockchain for Plant B 770, combine the global blockchains 730, 770 to create a super blockchain 760 having state blocks 762, 764. Each state block 762, 764 includes each of the blocks from the global blockchains 730, 770 for a particular time period. For example, state block K (ref. no. 762) includes the respective block N, block N+1, and block N+2 from each global blockchain 730, 770. State block K+1 (ref. no. 764) includes the respective block N+3, block N+4, and block N+5 from each global blockchain 730, 770.

To cryptographically link blocks and transactions together, each state block 762, 764 in the super blockchain 760 organizes its transactions into a Merkle Tree. If any single transaction in the state block is tampered with, a different Merkle root would be generated since the Merkle root is a combination of the hashes of all of the transactions in the block. The Merkle root for each state block 762, 764 is included in the header for the state block 762, 764.

The distributed ledger architecture 700 described in FIGS. 7A-7C having local blockchains, global blockchains, and a super blockchain allows for competing entities to verify the accuracy of measurement data. For example, if Plant A reports to Plant B that Plant A retrieved 30,000 gallons of oil from an oil pipeline shared between the two entities, Plant B may retrieve measurement data from the super blockchain to verify the accuracy of this measurement. The measurement data may also be cryptographically verified within the super blockchain 760 by calculating an expected Merkle root for the header of the state block that includes the measurement data and comparing the actual Merkle root in the header of the state block to the expected Merkle root. This allows competing entities analyzing the super blockchain 760 to validate that the state blocks 762, 764 in the super blockchain 760 have not been tampered with.

Smart Contracts in a Process Control System

As described above, process control systems can deploy smart contracts to the distributed ledger to exchange value, for example upon receiving a product in good condition. Smart contracts may also be deployed to the distributed ledger to allow machines such as field devices to transact by themselves without human intervention.

Figure 8:
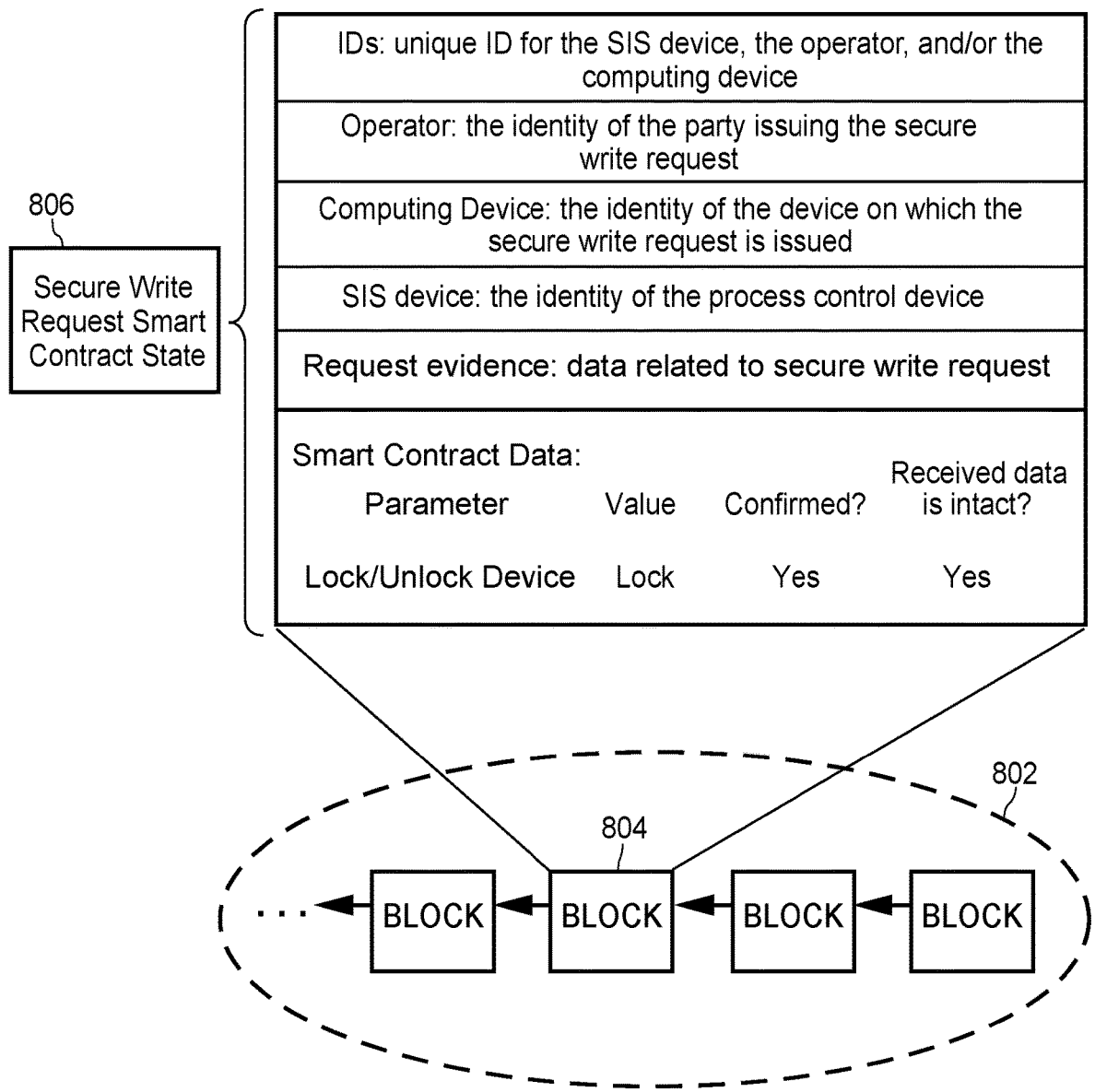
FIG. 8 illustrates an exemplary smart contract state in a distributed ledger network for performing secure write operations in a process plant to write a process parameter to a safety instrumented system (SIS) device.

FIG. 8 depicts an exemplary smart contract state 806 in a distributed ledger network within a process control system. FIG. 8 includes a blockchain 802, a block of transactions 804, and a secure write request smart contract state 806. A smart contract may be deployed by any participant in the distributed ledger network or blockchain network (e.g., plant operators, configuration engineers, process control system designers, etc.) to establish a contract state 806 for a secure write request, for example. The deployed smart contract may expose methods and data to other participants in the blockchain network. Some of the data in the smart contract state may be private data that may only be altered by calling a method of the smart contract, or only altered by authorized blockchain participants. One way of altering the smart contract state is to broadcast a transaction to the distributed ledger network. If the broadcasted transaction satisfies consensus rules, network validators may include the transaction in a block. Inclusion in the blockchain of a transaction sending data to the smart contract may cause validating nodes to update a state database for the smart contract, thus allowing network participants access to a rich state mechanism to manage the secure write request, and ultimately to write parameter data to a safety instrumented system (SIS) device.

The secure write request smart contract state 806 may include pieces of data to identify the operator submitting the secure write request, the computing device that the operator uses to submit the secure write request, and/or the SIS device that is the target of the secure write request. In some embodiments, the operator may be identified by cryptographic public keys assigned to the operator's electronic wallet. The operator's computing device may be identified by the same cryptographic public keys as the operator if the operator's electronic wallet operates on the operator's computing device. In other embodiments, the operator's computing device may be identified by other cryptographic public keys known to belong to the operator's computing device by the other network participants.

In some embodiments, a contract owner may select a unique ID for the SIS device such that subsequent transactions and data sent to the smart contract can identify the SIS device by ID number. For example, each SIS device may have a different unique identifier in the smart contract. The contract owner may also specify identifiers of operators and/or computing devices authorized to perform secure writes. Subsequent data sent to the smart contract may include a message signed by private keys corresponding to the public keys identifying the operator and/or computing device in the smart contract, thus providing cryptographic proof that the transaction was originated by an authorized operator and/or an authorized computing device. The private and public keys may be managed solely by the operators/computing devices to minimize the attack surface for any attackers that might attempt to forge a transaction (e.g., the operators/computing devices generate public/private cryptographic key pairs offline, and only provide the public key to other network participants). An operator's and/or computing device's private keys may be generated according to a securely stored seed value (e.g., on a piece of physical paper or multiple copies of a piece of paper) such that the private keys may be recovered in the case of a data loss.

To write parameter data to an SIS device, the secure write request smart contract state 806 may obtain evidence of the secure write request. The evidence for the secure write request may include the name of the parameter to be changed in the SIS device and/or path information for the parameter. The evidence may also include a new parameter value, and in some embodiments, the evidence may include a cyclical redundancy check (CRC) value or other error checking value along with the new parameter value to ensure the parameter information is intact has not been corrupted. In some embodiments, in response to receiving the parameter information, the smart contract may provide a confirmation dialog to the operator's computing device that includes the name of the SIS device, the name and/or path for the parameter to be changed in the SIS device, the new parameter value, and a confirmation button for the operator to confirm the secure write request. In this scenario, the evidence may include an indication of whether the operator selected the confirmation button.

The operator and/or the operator's computing device may broadcast transactions to the blockchain 802 that includes the evidence. The evidence may be cryptographically signed to provide cryptographic proof-of-identity that the evidence came from an operator and/or operator's computing device authorized to perform a secure write request. Accordingly, the smart contract may compare the provided identity to a list of operators and/or computing devices authorized to perform secure write requests. In some embodiments, the smart contract may compare the provided identity to a list of operators and/or computing devices authorized to perform secure write requests for the particular SIS device that is the target of the secure write request.

Another aspect of the secure write request smart contract state 806 is the smart contract data. Smart contract data may be thought of like the private and public data in an object created according to an object-oriented programming paradigm in that the smart contract data may be directly updated from outside the object, or the smart contract data may be updated only in limited ways, such as by calling a method of the smart contract. The smart contract data may include the name and/or path for the parameter to be changed in the SIS device, and the new parameter value. In some embodiments, the smart contract data may include an indication of whether the parameter information has been received intact. For example, the transaction including the parameter to be changed and parameter information may also include a CRC value or other error checking value. The smart contract may generate an expected CRC value based on the parameter to be changed and parameter information and compare the expected CRC value to the received CRC value. If the expected CRC value matches the received CRC value, the smart contract may determine that the parameter information has been received intact. Also in some embodiments, the smart contract data may include an indication of whether the secure write request was confirmed. For example, if the smart contract receives a transaction by the operator and/or operator's computing device indicating that the operator selected the confirmation button, the smart contract may determine that the secure write request was confirmed.

For example, as illustrated in FIG. 8, the smart contract data may include a parameter of lock/unlock the SIS device, a parameter value of '1' or 'lock' indicating to set the parameter to lock the SIS device, a confirmed value of '1,' 'yes,' or 'true' indicating that the secure write request was confirmed, and a received data intact value of '1,' 'yes,' or 'true' indicating that the parameter information has not been corrupted. Accordingly, the smart contract may determine that the new parameter value should be provided to the SIS device. Then the smart contract may provide the parameter information to the SIS device or to a controller communicatively coupled to the SIS device to perform the secure data write.

In some embodiments, the secure write request smart contract may provide parameter information to a target SIS device or to a controller communicatively coupled to the target SIS device when the operator and/or computing device sending the secure write request is authorized to perform secure data writes for the target SIS device, the parameter information has not been corrupted, and the secure write request is confirmed. In other embodiments, the secure write request smart contract does not determine whether the parameter information is received intact. Instead, the secure write request smart contract provides a first instance of the parameter information including the parameter name and/or parameter path, the new parameter value, and the CRC value to the target SIS device or controller in response to receiving the secure write request. The secure write request smart contract also provides a second instance of the parameter information to the target SIS device or controller in response to receiving confirmation of the secure write request. The controller or target SIS device then determines whether the parameter information in both instances is the same and whether the parameter information has been received intact. When the parameter information in both instances is the same and the parameter information has been received intact, the controller or the target SIS device writes the new parameter value for the parameter to the target SIS device.

While FIG. 8 illustrates a smart contract state 806 for a secure write request, this is merely one example smart contract for ease of illustration only. Participants in the distributed ledger network (e.g., plant operators, configuration engineers, process control system designers, etc.) may deploy any suitable smart contracts related to process control.

In another example, a smart contract may be deployed that obtains device information for a device within the process plant 10 that experiences a failure, and provides the device information to a device supplier in response to receiving a request to share the device information. More specifically, when a device within the process plant 10 experiences a failure, such as a process plant entity, the device may transmit a transaction to an address for the smart contract stored on the distributed ledger. The transaction may be cryptographically signed to provide cryptographic proof-of-identity that the transaction came from the device. In other embodiments, the process plant entity may transmit an indication of the failure to a controller, field device, or other process control device which acts as an evidence oracle and generates the transaction. In any event, the transaction may include device information for the device, such as identification information for the device, the make, model, and year of the device, maintenance history for the device, the type of failure, damaged parts within the device, etc.

In some embodiments, the smart contract transmits the device information to a computing device of maintenance personnel within the process plant 10 for the maintenance personnel to review the device information. Upon reviewing the device information, the maintenance personnel may determine that the device information needs to be reviewed by the device supplier for further investigation into the failure and/or for providing a replacement device or replacement parts. Accordingly, the maintenance personnel's computing device may generate a transaction requesting the smart contract provide the device information to the device supplier. The transaction may be cryptographically signed to provide cryptographic proof-of-identity that the transaction came from the maintenance personnel. In response to determining that the request to provide the device information to the device supplier came from authorized maintenance personnel, the smart contract may provide the device information to a computing device of the device supplier.

Another example smart contract is a smart contract that obtains a token value from a first process plant, determines that a product meeting certain quality standards transferred from a second process plant to the first process plant, and provides the token value to the second process plant. In some embodiments, the smart contract may receive an indication that the product has been received at the first process plant from an evidence oracle such as a field device in the first process plant. The field device may also provide parameter data related to the product which the smart contract compares to a set of quality metrics to determine whether the products meets the quality standards. If the product meets the quality standards, the smart contracts provides the token value to the second process plant. Otherwise, the smart contract may return the token value to the first process plant.

Types of Transactions Recorded in Distributed Ledgers in a Process Control System The process control system distributed ledgers may include many different types of transactions related to process control. These transactions may include 1) transactions related to delivery or receipt of a product at a process plant 10 and the quantity delivered/received; 2) transactions related to software or firmware upgrades at devices within the process plant 10, such as operator workstations, server devices, controllers, I/O devices, network devices, field devices, etc.; 3) transactions related to quality control, production, or regulatory reporting in the process plant 10; 4) transactions recording process plant data; and 5) transactions recording chain of custody via product tracking data.

In some scenarios, the transactions are provided to smart contracts to alter a smart contract state, for example. In other scenarios, the transactions are not provided to smart contracts and are merely recorded in the distributed ledger as a secure, immutable, and trustless record of information related to one or several process plants.

Figure 9:
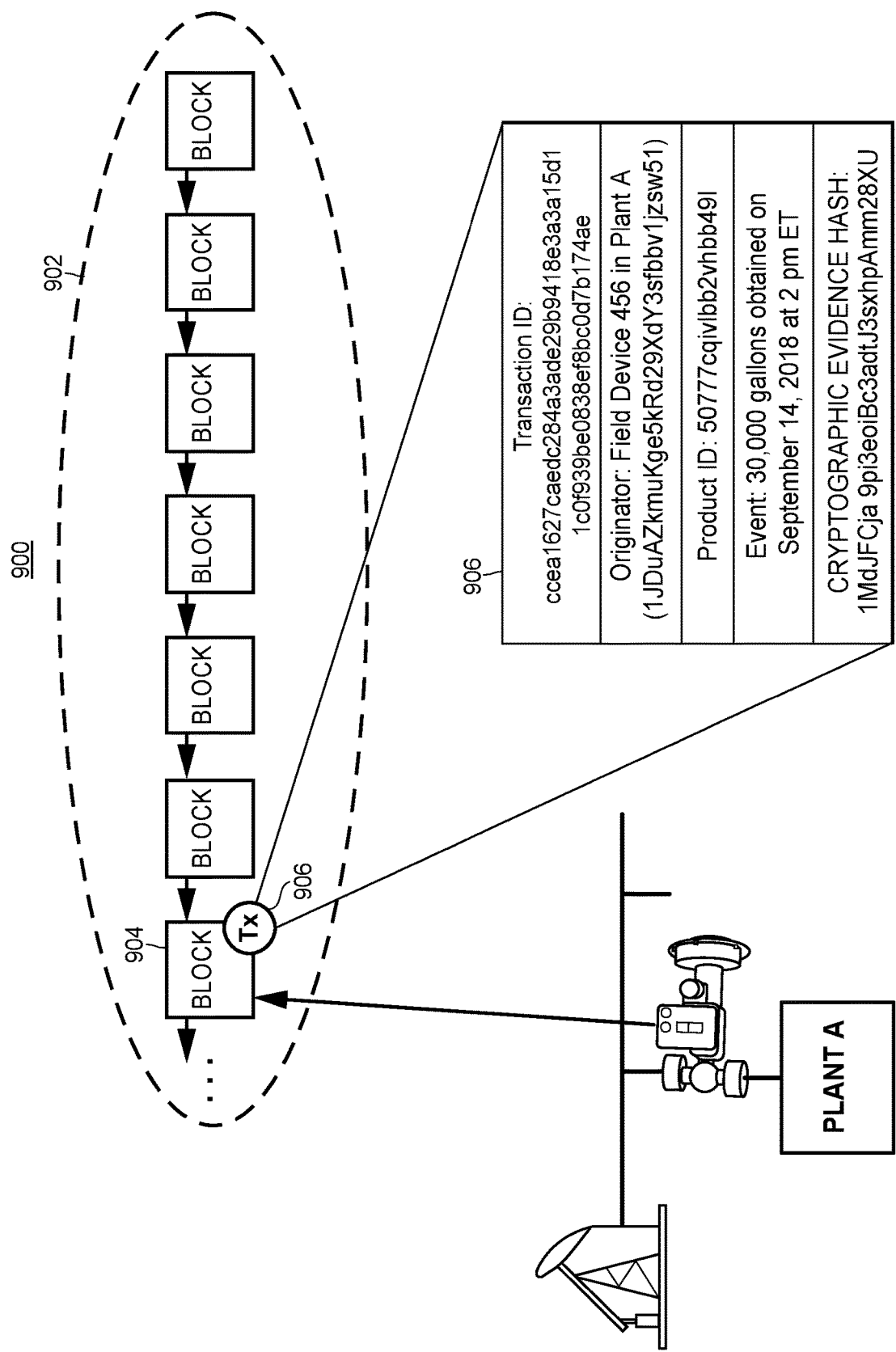
FIG. 9 illustrates an exemplary transaction representing an evidence transaction generated by an evidence oracle which is a field device reporting the amount of oil received from an oil pipeline.

Transactions Related to Delivery or Receipt of a Product and the Quantity Delivered/Received FIG. 9 depicts an exemplary transaction 906 representing an evidence transaction reporting the amount of oil received at a process plant 10 from an oil pipeline. While the exemplary transaction 906 in FIG. 9 reports the amount of oil from an oil pipeline, this is merely one example for ease of illustration only. Other materials or products from other sources may also be reported such as electricity from an electric power generation system, a product over rail, automotive, marine, or airborne transportation, a product through a liquid, gas, steam, fuel, or materials pipeline, or water from a water distribution system. In any event, the transaction 906 may be generated by a field device acting as an evidence oracle. When the field device detects oil flowing through a valve, the field device broadcasts a transaction 906 to blockchain 902 to be included in a block, such as block 904.

The transaction 906 may include a transaction ID and an originator such as field device 456 in Plant A (identified by a cryptographic proof-of-identity). The transaction 906 may also include identification information related to the product, the provider of the product (e.g., an oil producer) and information regarding the quantity of the product received. For example, the field device may be a flow rate sensor that determines the volume of oil obtained at Plant A over a particular time period (e.g., an hour, a day, etc.) and includes the volume in the transaction. In other embodiments, the field device may include several flow rates at various time periods in a series of transactions, and the flow rates as a function of time may be used to determine the amount of oil received at Plant A. Furthermore, the transaction 906 may include a cryptographic hash of the information regarding the event, the product identifier, and the product provider identifier. In another implementation, the information regarding the event, the product identifier, and the product provider identifier is not stored as a cryptographic hash, but is directly accessible in block 904 by an observer or other network participant.

While in this example, the field device for the process plant 10 that receives the product generates a transaction, a field device for a process plant 10 or other entity that provides the product may generate a transaction. This transaction may be generated in addition or as an alternative to the transaction by the field device for the process plant 10 that receives the product.

Transactions Related to Software or Firmware Upgrades at Devices within the Process Plant To prevent unauthorized software or firmware from being introduced into a process plant 10, software and firmware upgrades to devices within the process plant 10 may be digitally recorded in a distributed ledger, such as the distributed ledgers described above. The distributed ledger may maintain a record of each software and firmware upgrade to a device within the process plant 10 including the time and date of the upgrade, the identity of the user performing the upgrade (via a cryptographic proof-of-identity), changes to the previous version of the software, and/or the new version of the software. A server device 12 or other computing device within the process plant 10 may continuously or periodically (e.g., once per second, once per minute, once per hour, once per day, etc.) obtain current versions of software and firmware running in devices in the process plant 10. The server device 12 may also retrieve the transactions from the distributed ledger and compare the current software or firmware in a device to the latest version of the software or firmware recorded in the distributed ledger. In some embodiments, the distributed ledger stores a cryptographic hash of the new version of the software or firmware, and compares the current software or firmware executing in the device to the cryptographic hash value to verify the software or firmware has not been tampered with.

If the current software or firmware in the device does not match with the latest version of the software or firmware recorded in the distributed ledger, the server device 12 may prevent the device from executing the current software or firmware. In some embodiments, the server device 12 may cause the software or firmware in the device to revert back to a previous version, for example by downloading the previous version to the device. In this manner, unauthorized users are unable to tamper with the software or firmware executing in the process plant 10.

Figure 10:
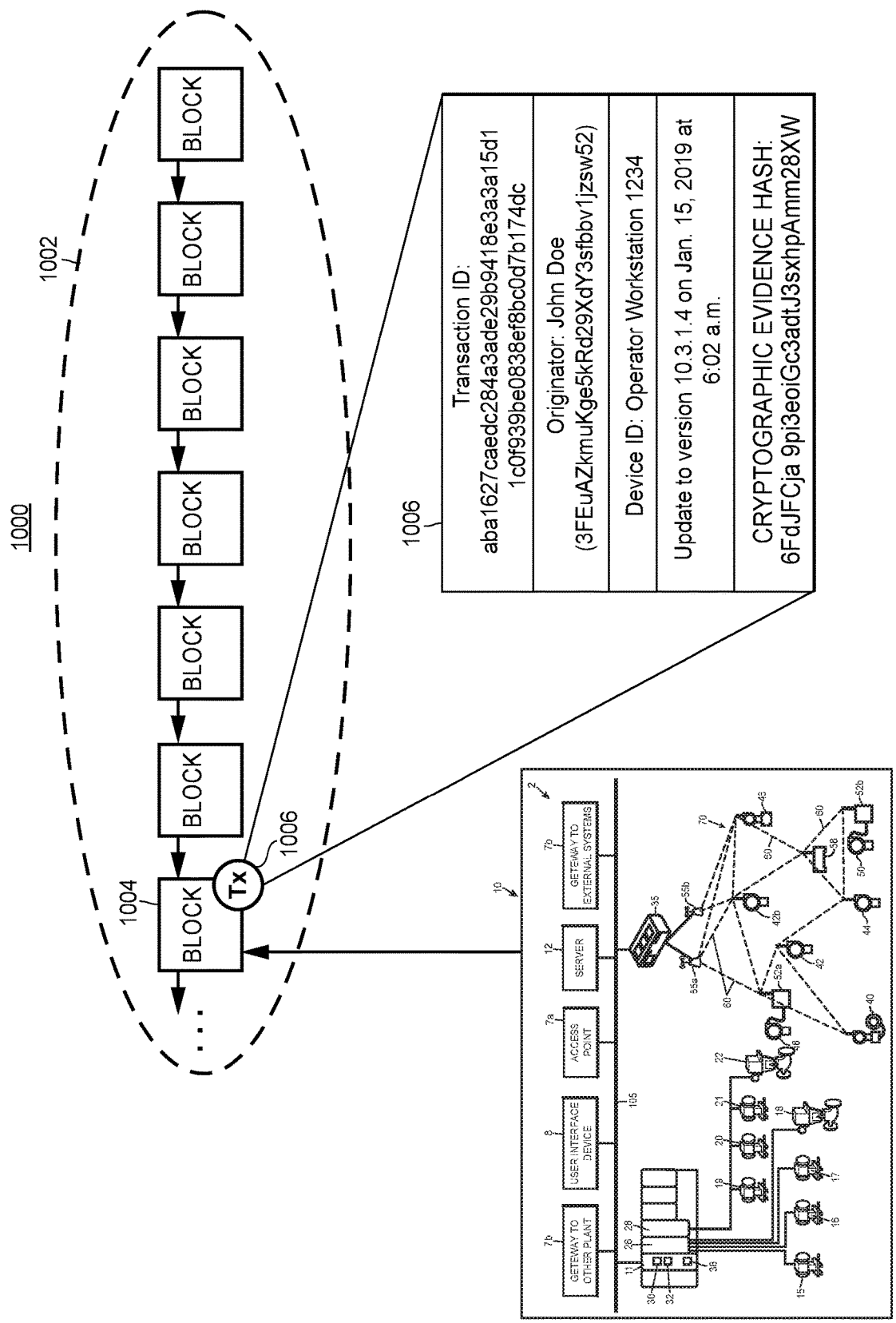
FIG. 10 illustrates an exemplary transaction representing an evidence transaction generated by an evidence oracle which is a computing device reporting a software or firmware update.

FIG. 10 depicts an exemplary transaction 1006 representing an evidence transaction reporting a software or firmware update in a device within a process plant 10. The transaction 1006 may be generated by the device receiving the upgrades, such as an operator workstation, another user interface device 8, a server device 12, a controller 11, an I/O device 26, 28, a network device, a field device 15-22, 40-46, etc. A network device in the process plant 10 may include for example, a wireless gateway 35, a router 58, a wireless access point 7a, 55, an edge gateway, a wireless adaptor 52, etc.

The transaction 1006 may include a transaction ID and an originator modifying the software or firmware such as John Doe (identified by a cryptographic proof-of-identity). The transaction 1006 may also include identification information (Operator Workstation 1234) for the device executing the software or firmware (identified by a cryptographic proof-of-identity), a description including a version number and time and date of the upgrade ("Update to version 10.3.1.4 on Jan. 15, 2019 at 6:02 a.m."). Furthermore, the transaction 1006 may include a cryptographic hash of the software instructions for the new version of the software. In another implementation, the new version of the software is not stored as a cryptographic hash, but is directly accessible in block 1004 by an observer or other network participant. In some embodiments, the consensus rules indicate that only authorized users may record software or firmware updates on the distributed ledger. Accordingly, when the transaction 1006 is broadcasted to the distributed ledger, the validating nodes validate the transaction 1006 if the originator is an authorized user. If the originator is not an authorized user, the transaction 1006 is not included in the distributed ledger and the update to the software will not match with the latest version of the software recorded in the distributed ledger.

In an exemplary scenario, at 6:03 a.m. on Jan. 15, 2019, a server device 12 in the process plant 10 obtains the state of the software executing in Operator Workstation 1234 and compares the software to the cryptographic hash of the software instructions for the new version of the software in the distributed ledger by for example, performing a cryptographic hash of the software instructions executing in Operator Workstation 1234. If the cryptographic hashes are the same, the server device 12 determines the software has not been tampered with. If, on the other hand, the cryptographic hashes differ, the server device determines the software has been tampered with and prevents Operator Workstation 1234 from executing the software in its current state. The server device 12 then downloads the previous state of the software to the Operator Workstation 1234, and the Operator Workstation 1234 resumes executing the software in its previous state.

Transactions Related to Quality Control, Production, or Regulatory Reporting in the Process Plant Process plants have reporting and recordkeeping requirements to comply with regulatory agencies, such as the Environmental Protection Agency (EPA). For example, the EPA promulgated Leak Detection and Repair (LDAR) regulations to minimize the emission of fugitive volatile organic compounds and hazardous air pollutants from for example, leaking equipment such as valve, pumps, and connectors in process plants. To comply with the regulations and provide a secure, immutable, and trustless record, regulatory data may be recorded in a distributed ledger. For example, in response to a triggering event such as an alarm, an error, a leak, a repair event, a process milestone, a corrective action, etc., process control elements such as field devices, controllers, or process plant entities may generate transactions including data from the triggering event, such as the time in which the event occurred, the duration of the event, process parameter values for process plant entities involved in the event, product parameter values for products involved in the event, etc. The regulatory data is then recorded in the distributed ledger, so that regulatory agencies can review the data.

In some embodiments, when a triggering event occurs, the triggering event is detected by one of the process control elements. The process control element then notifies other process control elements of the triggering event and assigns a unique identifier to the triggering event. In this manner, each of the process control elements may collect measurements related to the triggering event and broadcast transactions to the distributed ledger, where each transaction includes the same unique identifier for the triggering event.

In some embodiments, regulatory data is recorded in a public blockchain so that anyone can view the regulatory data from a process plant 10. In other embodiments, the regulatory data is recorded in a private or permissioned blockchain accessible to the process plant 10 and the regulatory agency. In yet other embodiments, the regulatory data is recorded in a private or permissioned blockchain accessible to several process plants in a process plant network along with the regulatory agency.

Figure 11:
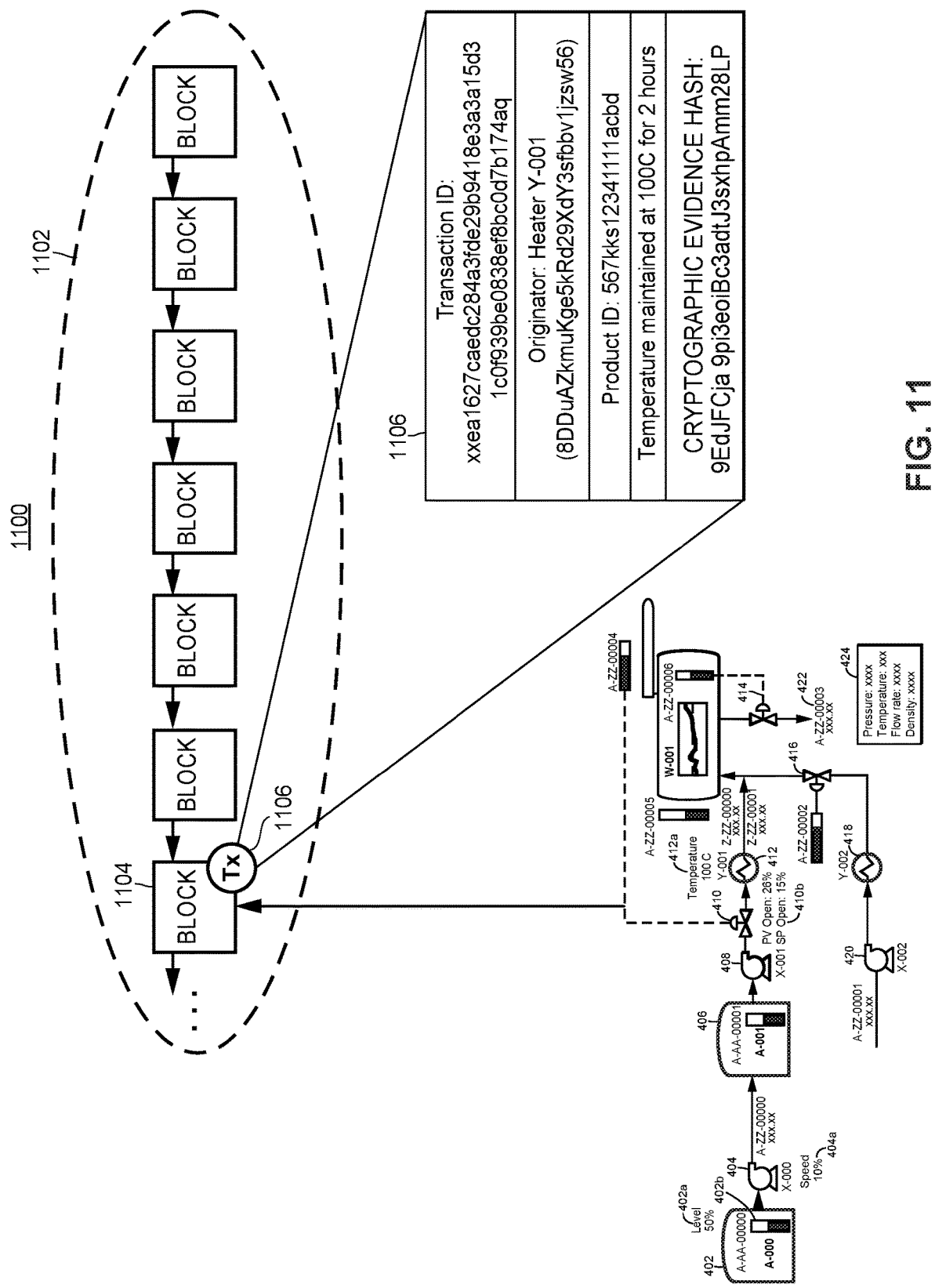
FIG. 11 illustrates an exemplary transaction representing an evidence transaction generated by an evidence oracle which is a process plant entity reporting process parameter or product parameter data.

FIG. 11 depicts an exemplary transaction 1106 representing an evidence transaction reporting process parameter or product parameter data. The transaction 1106 may be generated by a process plant entity which may be a device within a process plant 10 for use in a portion of the process which contains, transforms, generates, or transfers physical materials, such as a valve, a tank, a mixer, a pump, a heater, etc.

The transaction 1106 may include a transaction ID and an originator (Heater Y-001) collecting the product or process parameter measurement (identified by a cryptographic proof-of-identity). The transaction 1106 may also include identification information related to the product, product parameter data (e.g., the product's temperature has been maintained at 100° C. for 2 hours), and process parameter data (e.g., the temperature in Heater Y-001 is 120° C.). When the transaction 1106 is generated in response to a triggering event, the transaction 1106 may also include identification information for the triggering event and event data from the triggering event, such as a time of the triggering event, a duration of the triggering event, and/or a description of the triggering event. In some scenarios, multiple process plant entities generate transactions in response to the same triggering event and communicate with each other to assign a unique identifier to the triggering event. In this manner, a party such as a regulatory agency reviewing the distributed ledger may view each of the transactions associated with the same triggering event.

Furthermore, the transaction 1106 may include a cryptographic hash of the product and/or process parameter data along with data related to a triggering event. In another implementation, the product parameter data, process parameter data, and other data related to a triggering event is not stored as a cryptographic hash, but is directly accessible in block 1104 by an observer or other network participant.

As described above, triggering events may include alarms, errors, leaks, repair events, corrective actions, etc. In an example scenario, the triggering event may be a leak in the process plant 10 caused by the opening of a relief valve. The relief valve may open when the pressure in the process control system exceeds a threshold amount of pressure, or the relief valve may open in proportion to the amount of pressure detected at the valve. When the relief valve opens, the relief valve or one or several other field devices may detect the time of the opening, the duration of the opening, the size of the opening, the pressure in the relief valve when it opened, the flow rate of fluid leaking out of the relief valve, and/or properties of the fluid such as the temperature of the fluid, the type of fluid, etc. In some embodiments, the amount of fluid leaking out of the relief valve may also be determined based on the flow rate, the size of the opening, and the duration of the opening of the relief valve. Then the relief valve and/or one or several other field devices may generate transactions, similar to the transaction 1106 including the same unique identifier for the triggering event, and/or the same description for the triggering event of a leak caused by the opening of the relief valve. Each of the transactions may also include process parameter data, such as the time of the opening, the size of the opening, the pressure in the relief valve, the flow rate of the fluid leaking out of the relief valve, etc. The transactions may also include product parameter data, such as the properties of the fluid. The devices generating the transactions then broadcast the transactions to the distributed ledger network for validating nodes, such as edge gateways to confirm the transactions are valid and include the transactions in the distributed ledger.

A regulatory agency reviewing the incident may request and obtain event data from the distributed ledger that is included in transactions having the triggering event identifier. The regulatory agency's computing device, such as the computing device 235 as shown in FIG. 2, may then present the event data on a user interface. In other embodiments, the distributed ledger includes cryptographic hashes of the event data which are provided to the regulatory agency's computing device 235 in response to a request to authenticate the event data. The event data is obtained from other data sources such as a database communicatively coupled to a server device 12 in the process plant 10. The regulatory agency's computing device 235 then computes a cryptographic hash of the obtained event data and compares the cryptographic hash of the obtained event data to the cryptographic hash of the event data from the distributed ledger. If the cryptographic hashes are the same, the regulatory agency's computing device 235 determines that the event data from the database has not been tampered with. Otherwise, the regulatory agency's computing device 235 determines that the event data from the database is unreliable.

Transactions Recording Process Plant Data

In addition to recording process parameter data and product parameter data in transactions related to a triggering event, process and product parameter data may be included in transactions unrelated to a triggering event for example, for maintaining accurate records of the operations of a process plant 10. Other types of process plant data may also be included in transactions, such as configuration data, user interaction data, maintenance data, commissioning data, plant network data, product tracking data, or any other suitable data generated in or related to one or several process plants. User interaction data may include operations performed by an operator or a configuration engineer for example, at an operator workstation. The operator may adjust set points, respond to alarms, etc., via user controls at the operator workstation which may be included in transactions as user interaction data. In this manner, when a competing entity calls into question the quality of a product manufactured in the process plant 10, the process plant 10 may retrieve process plant data from the distributed ledger that is related to the product. The process plant 10 may then review records of each of the process plant entities involved in manufacturing the product, parameter values for the process plant entities as the product was manufactured, parameter values for the product at various stages in the manufacturing process, triggering events that occurred during the manufacturing of the product, etc. Accordingly, the process plant 10 may determine whether the product was manufactured properly to meet certain quality standards or whether an abnormality occurred during production causing the product to fail to meet the quality standards.

The process plant data may also be used to perform a root-cause analysis on products. For example, products may have predicted shelf-lives such as gasoline which has a half-life that may be less than a month. In some embodiments, a computing device may predict the shelf-life of a product based on the characteristics of the product including process parameter data and product parameter data recorded in the distributed ledger while the product was manufactured. The computing device may also predict the shelf-life of the product based on historical data for similar products having similar components and/or process parameter data and product parameter data during manufacturing. More specifically, the computing device may predict the shelf-life of a product based on the average shelf-life of the same type of product (e.g., gasoline).

The computing device may then increase or decrease the predicted shelf-life from the average shelf-life based on the quality of components in the product. For example, components may be categorized as above average, average, or below average. Indications of components may be stored in a database with associated rankings or quality scores. Components having a quality score below a first threshold score or a ranking below a first threshold ranking may be categorized as below average. Components having a quality score above a first threshold score and below a second threshold score or ranking above the first threshold ranking and below a second threshold ranking may be categorized as average. Components having a quality score above the second threshold score or ranking above the second threshold ranking may be categorized as above average.

The computing device may further increase or decrease the predicted shelf-life depending on the properties of the product, such as a temperature of the product, a volume of the product, a mass of the product, a density of the product, a pressure of the product, a viscosity of the product, a chemical composition of the product, etc. For example, the computing device may assign a quality score to each property and adjust the predicted shelf-life based on each of the quality scores.

In some embodiments, the computing device may generate a machine learning model to predict the shelf-life of a product based on the actual shelf-lives of previous products, the components in the previous products, and the properties of the previous products.

Furthermore, when the actual shelf-life of a product differs from the predicted shelf-life, the computing device may retrieve process plant data related to the product from the distributed ledger to identify the cause. For example, the actual shelf-life may be lower than the predicted shelf-life due to poor quality components in the product. In another example, the actual shelf-life may be lower than the predicted shelf-life due to a heater in the process plant 10 heating the product to an undesirable temperature.

Transactions Recording Chain of Custody Via Product Tracking Data

To provide accurate records of the chain of custody of products in a supply chain, transactions may be generated that include identification information for the source or supplier of a product, and the entities that handled the product, such as manufacturers, distributors, distribution facilities, retailers, and the customer who purchases the product. More specifically, the transactions may include product tracking data having identification information for the product, identification information for the supplier/manufacturer of the product, identification information for manufacturers/providers of each of the components of the product, identification information for entities in the supply chain which receive and handle the product, identification information for retailers that sell the product, and/or identification information for customers that purchase the product. When the product is delivered from one entity (e.g., a process plant) to another entity (e.g., a warehouse), the delivering entity may generate a transaction that includes identification information for the delivering entity, identification information for the receiving entity, and an indication that the product is being transferred to the receiving entity.

Accordingly, a user such as a customer, via a user interface device, may retrieve each of the transactions involving a particular product from the distributed ledger using the identification information for the product. The user interface device may then display, via a user interface, indications of the supplier or source of the product, and the entities that handled the product, such as manufacturers, distributors, distribution facilities, retailers, and the customer who purchases the product. The user interface device may also display indications of the components of the product via the user interface. The user may then retrieve each of the transactions involving a particular component of the product from the distributed ledger using identification information for the component. Then the user interface device may display, via the user interface, indications of the supplier or source of the component, and the entities that handled the component, such as manufacturers, distributors, distribution facilities, etc.

In some embodiments, the product packaging may include a product identifier, such as a barcode or radio frequency identification (RFID) tag that when scanned, provides data from the distributed ledger for the product. For example, a user may scan the barcode or RFID tag via a mobile device which then presents indications of the supplier or source of the product, and the entities that handled the product on the mobile device.

Figure 12:
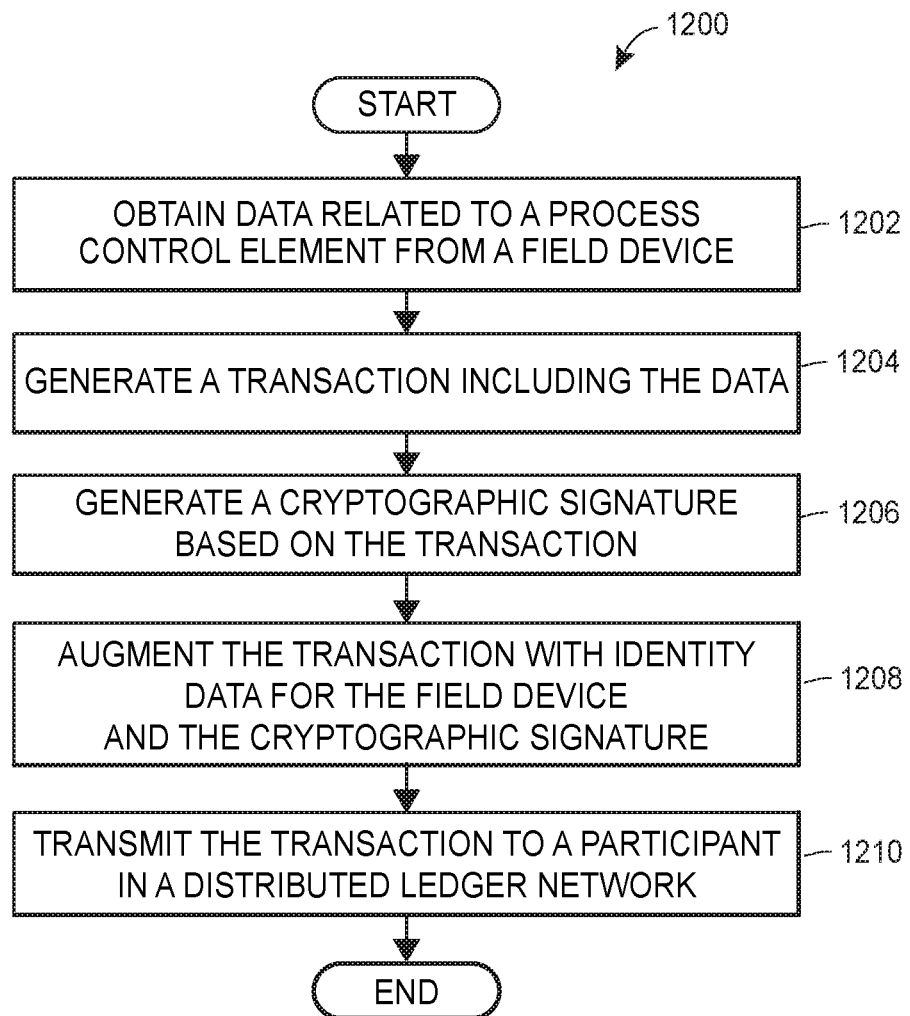
FIG. 12 illustrates a flow diagram representing an exemplary method for recording data in a process control system using a distributed ledger.

FIG. 12 illustrates a flow diagram representing an exemplary method 1200 for recording data in a process control system using a distributed ledger. The method 1200 may be executed by a field device 15-22, 40-46 within the process plant 10, a controller 11 in the process plant 10, or another computing device within the process plant 10 such an operator workstation, server device 12, user interface device 8, I/O device 26, 28, network device 35, etc.

At block 1202, data related to a process control element is obtained from a field device. The process control element may be a field device, a controller, or a process plant entity such as a valve, a tank, a mixer, a pump, a heat exchanger, etc. The data may include process plant data, such as process parameter data for parameters of the process control element (e.g., a tank fill level, a pump speed, the temperature in a heat exchanger), and product parameter data for a product entering, exiting, within, and/or controlled by the process control element (e.g., the temperature of a fluid in a tank, the flow rate of fluid exiting a valve). Then at block 1204, a transaction is generated that includes the process plant data related to the process control element. The entity generating the transaction (e.g., a field device) signs the transaction with a cryptographic signature unique to the entity (block 1206) and augments the transaction with identity data for the entity such as a public cryptographic key owned by the entity (block 1208). For example, the transaction may be signed by a private cryptographic key corresponding to the public cryptographic key owned by the entity.

At block 1210, the transaction is transmitted to a participant in the distributed ledger network. For example, a field device may broadcast the transaction to the distributed ledger network. A validating node such as an edge gateway may then confirm the transaction is valid, add the transaction to a block of transactions, solve a cryptographic puzzle, and include the solution in the newly generated block as proof of the work done to generate the block. The validating node may then provide the newly generated block to each of the other validating nodes in the distributed ledger network to include the newly generated block in their respective copies of the distributed ledger.

In some embodiments, the validating node confirms the transaction against a set of consensus rules and adds the transaction to a block when the transaction satisfies each of the consensus rules. For example, a consensus rule may include that the originator of a transaction supply a proof-of-identity such that only approved entities may originate transactions to the distributed ledger. A consensus rule may require that blocks and transactions adhere to format requirements and supply certain meta information regarding the transaction (e.g., blocks must be below a size limit, transactions must include a number of fields, etc.). Any transaction that does not satisfy the consensus rule is disregarded by validating nodes that receive the transaction and the transaction is not propagated to other nodes.

The validating node includes a transceiver to communicate with field devices, controllers, or other computing devices in the process plant 10 that broadcast transactions having distributed ledger data, such as process plant data. Additionally, the validating node may include a memory for storing a copy of the distributed ledger including a state database for storing states of smart contracts deployed on the distributed ledger. Furthermore, the validating node may include applications, such as a process data validator that applies a set of consensus rules to the distributed ledger data and appends the distributed ledger data to the validating node's copy of the distributed ledger if the distributed ledger data satisfies the consensus rules.

Figure 13:
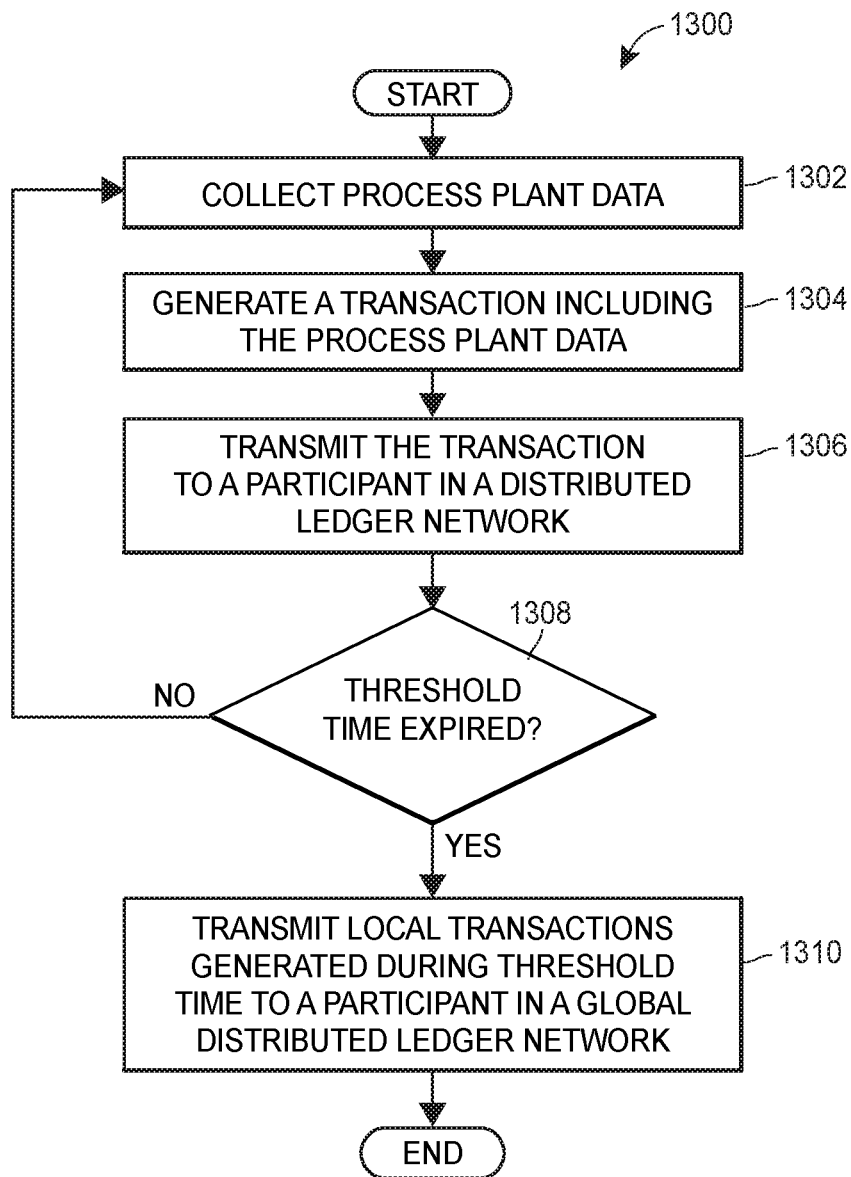
FIG. 13 illustrates a flow diagram representing an exemplary method for secure metering of untrusted data in process control systems using a distributed ledger.

FIG. 13 illustrates a flow diagram representing an exemplary method 1300 for secure metering of untrusted data in a process control system using a distributed ledger. The method 1300 may be executed by a field device 15-22, 40-46 within the process plant 10, a controller 11 in the process plant 10, or another computing device within the process plant 10 such an operator workstation, server device 12, user interface device 8, I/O device 26, 28, network device 35, etc. The method 1300 may also be executed by a validating node such as edge gateway or a combination of a field device and a validating node.

At block 1302, data related to a process control element is obtained from a field device. The process control element may be a field device, a controller, or a process plant entity such as a valve, a tank, a mixer, a pump, a heat exchanger, etc. The data may include process plant data, such as process parameter data for parameters of the process control element (e.g., a tank fill level, a pump speed, the temperature in a heat exchanger), and product parameter data for a product entering, exiting, within, and/or controlled by the process control element (e.g., the temperature of a fluid in a tank, the flow rate of fluid exiting a valve). Then at block 1304, a transaction is generated that includes the process plant data related to the process control element. The entity generating the transaction (e.g., a field device) signs the transaction with a cryptographic signature unique to the entity and augments the transaction with identity data for the entity such as a public cryptographic key owned by the entity. For example, the transaction may be signed by a private cryptographic key corresponding to the public cryptographic key owned by the entity.

At block 1306, the transaction is transmitted to a participant in a local distributed ledger network. There may be several local distributed ledgers, where each local distributed ledger is maintained by a different party or process plant. For example, a local distributed ledger network for Plant A may be made up of edge gateways within Plant A. The edge gateways may record transactions that include process plant data related to events and devices within Plant A. Transactions are then added to the local distributed ledger network for a threshold time period or epoch. After the threshold time period has expired (block 1308), the validating nodes maintaining the local distributed ledger provide the transactions or blocks of transactions generated during the threshold time period to a global distributed ledger network (block 1310). The global distributed ledger network may include validating nodes across multiple process plants, such as a cloud service having several cloud computing systems. The validating nodes may maintain a global distributed ledger (e.g., a global blockchain) for each process plant. Then the validating nodes in the local distributed ledger network may remove or prune blocks from the local distributed ledger that have been provided to the global distributed ledger other than the most recent block. The validating nodes for the local distributed ledger may continue to generate blocks, broadcast the blocks to the global distributed ledger network after each time epoch expires, and remove local copies of the blocks when the blocks have been added to the global blockchain.

Also in some embodiments, each of the global blockchains for the respective entities or process plants are combined to create a super blockchain having state blocks. Each state block includes each of the blocks from the global blockchains corresponding to a particular time period or epoch.

Figure 14:
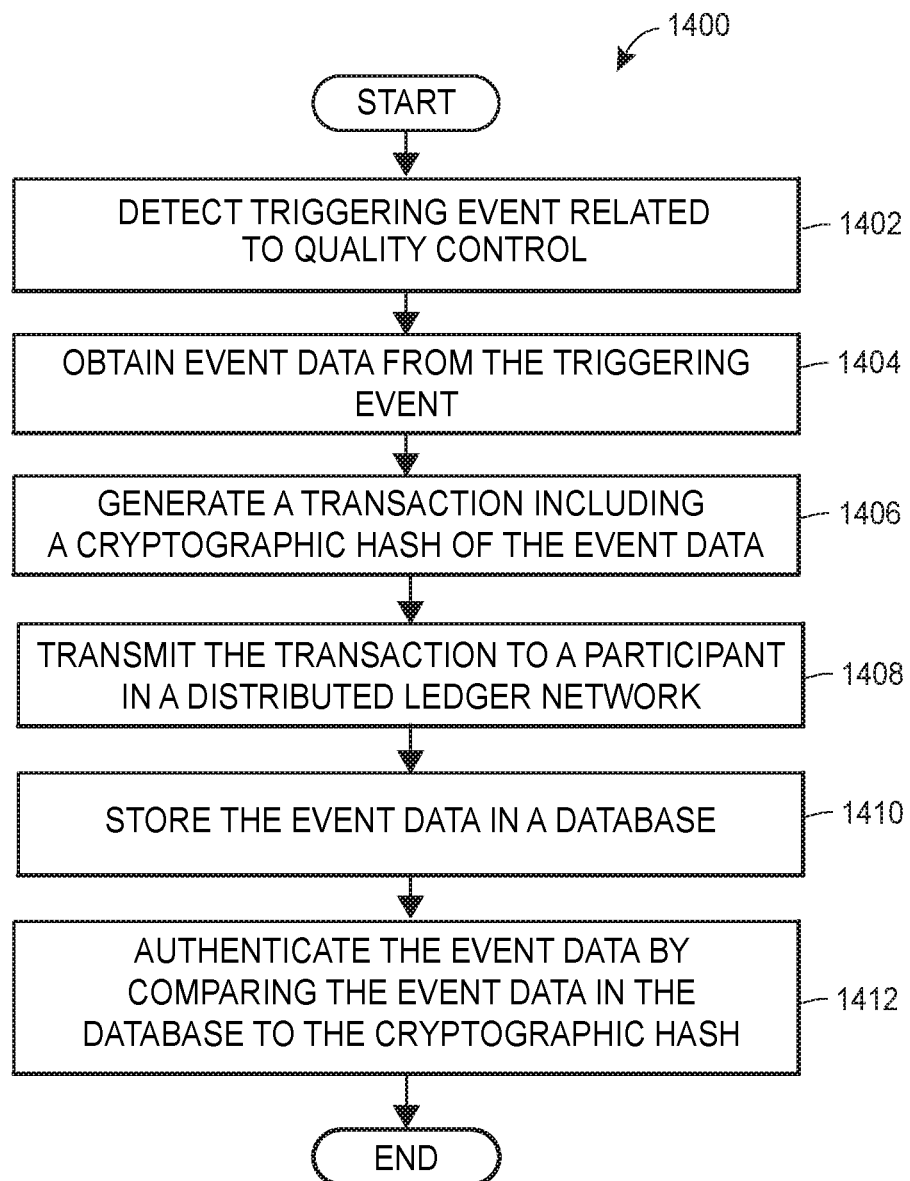
FIG. 14 illustrates a flow diagram representing an exemplary method for recording quality control, production, or regulatory data in a process control system using a distributed ledger.

FIG. 14 illustrates a flow diagram representing an exemplary method 1400 for recording quality control, production, or regulatory data in a process control system using a distributed ledger. The method 1400 may be executed by a field device 15-22, 40-46 within the process plant 10, a controller 11 in the process plant 10, or another computing device within the process plant 10 such an operator workstation, server device 12, user interface device 8, I/O device 26, 28, network device 35, etc.

At block 1402, a triggering event related to quality control is detected by a process control element. The triggering event may be an alarm, an error, a leak, a repair event, a process milestone, a corrective action, etc. In some embodiments, an indication of the triggering event is provided to a field device, controller, or other computing device within the process plant 10. In other embodiments, the field device, controller, or other computing device detects the triggering event.

In any event, at block 1404, event data is obtained for the triggering event. The event data may include a unique identifier for the triggering event, a time of the triggering event, a duration of the triggering event, a description of the triggering event, identification information for the process control elements involved in the triggering event, identification information for a product being manufactured by the process control elements during the triggered event, etc. Then at block 1406, a transaction is generated that includes the event data and/or a cryptographic hash of the event data for the triggering event. The transaction may also include identification information for the originator of the transaction, product parameter data for the product as the triggering event occurred, process parameter data for process control elements during the triggering event, or any other suitable information. In some embodiments, several field devices, controllers, or other computing devices within the process plant 10 may generate transactions related to the triggering event. For example, a first field device may generate a transaction that includes the temperature in a heater at the time of the triggering event, while a second field device may generate a transaction that includes the speed of a pump at the time of the triggering event.

At block 1408, the transaction is transmitted to a participant in the distributed ledger network. For example, a field device may broadcast the transaction to the distributed ledger network. A validating node such as an edge gateway may then confirm the transaction is valid, add the transaction to a block of transactions, solve a cryptographic puzzle, and include the solution in the newly generated block as proof of the work done to generate the block. The validating node may then provide the newly generated block to each of the other validating nodes in the distributed ledger network to include the newly generated block in their respective copies of the distributed ledger.

As described above, the transaction may include a cryptographic hash of the event data for the triggering event and/or a combination of the event data for the triggering event and other process plant data related to the triggering event. In addition to generating the transaction, the field device may provide the event data or other process plant data related to the triggering event to a server device 12 to be stored in a database, for example (block 1410).

Then to authenticate the event data, the event data stored in the database is compared to the cryptographic hash included in the distributed ledger (block 1412). If there is a match, the event data has not been tampered with. For example, a regulatory agency reviewing an incident may request and obtain cryptographic hashes of event data from the distributed ledger that is included in transactions having the triggering event identifier. The event data is obtained from other data sources such as a database communicatively coupled to a server device 12 in the process plant 10. The regulatory agency's computing device then computes a cryptographic hash of the obtained event data and compares the cryptographic hash of the obtained event data to the cryptographic hash of the event data from the distributed ledger. If the cryptographic hashes are the same, the regulatory agency's computing device determines that the event data from the database has not been tampered with. Otherwise, the regulatory agency's computing device determines that the event data from the database is unreliable. In other embodiments, a computing device within the process plant 10 retrieves the event data stored in the database and the cryptographic hash of the event data from the distributed ledger and compares the event data to the cryptographic hash to authenticate the event data.

Figure 15:
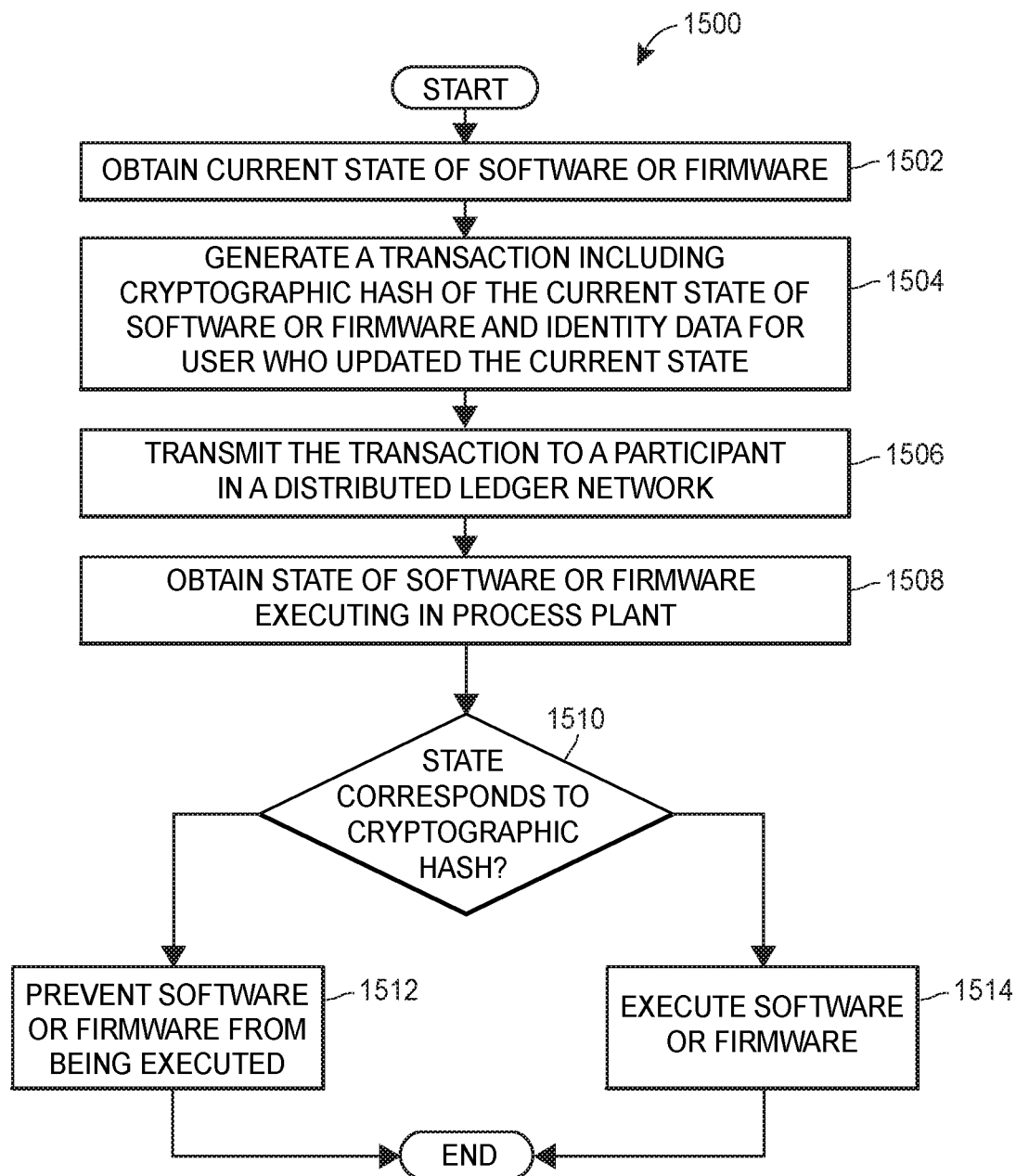
FIG. 15 illustrates a flow diagram representing an exemplary method for recording states of software or firmware in a process control system and connected instrumentation using a distributed ledger.

FIG. 15 illustrates a flow diagram representing an exemplary method 1500 for recording states of software or firmware in a process control system and connected instrumentation using a distributed ledger. The method 1500 may be executed by a field device 15-22, 40-46 within the process plant 10, a controller 11 in the process plant 10, or another computing device within the process plant 10 such an operator workstation, server device 12, user interface device 8, I/O device 26, 28, network device 35, etc.

At block 1502, a current state of software or firmware executing on a device in the process plant 10 is obtained. For example, a device within the process plant 10 that receives a software or firmware upgrade may obtain the new version of the software or firmware. The device may be an operator workstation, another user interface device 8, a server device 12, a controller 11, an I/O device 26, 28, a network device 35, a field device 15-22, 40-46, etc. Then at block 1504, the device may generate a transaction that includes an indication of the current state of the software or firmware. For example, the indication may be a cryptographic hash of the software instructions for the new version of the software. The transaction may also include an originator modifying the software or firmware identified by a cryptographic proof-ofidentity, identification information for the device executing the software or firmware, a description of the upgrade, a time and date of the upgrade, etc.

At block 1506, the transaction is transmitted to a participant in the distributed ledger network. For example, a computing device may broadcast the transaction to the distributed ledger network. A validating node such as an edge gateway may then confirm the transaction is valid, add the transaction to a block of transactions, solve a cryptographic puzzle, and include the solution in the newly generated block as proof of the work done to generate the block. The validating node may then provide the newly generated block to each of the other validating nodes in the distributed ledger network to include the newly generated block in their respective copies of the distributed ledger.

In some embodiments, the validating node confirms the transaction against a set of consensus rules and adds the transaction to a block when the transaction satisfies each of the consensus rules. Also in some embodiments, the consensus rules indicate that only authorized users may record software or firmware updates on the distributed ledger. Accordingly, when the transaction is broadcasted to the distributed ledger, the validating nodes validate the transaction if the originator is an authorized user. If the originator is not an authorized user, the transaction is not included in the distributed ledger and the update to the software will not match with the latest version of the software recorded in the distributed ledger.

In any event, at block 1508, a state of software or firmware executing on the device in the process plant 10 is obtained. For example, a server device 12 or other computing device within the process plant 10 may continuously or periodically (e.g., once per second, once per minute, once per hour, once per day, etc.) obtain current versions of software and firmware running in devices in the process plant 10. The state of the software or firmware obtained at the server device 12 is then compared to the cryptographic hash value for the software or firmware stored in the distributed ledger to verify the software or firmware has not been tampered with (block 1510). If the state of the software or firmware matches the cryptographic hash value for the software or firmware stored in the distributed ledger, the software or firmware continues executing on the device (block 1514). Otherwise, the server device 12 determines the software has been tampered with and prevents the device from executing the software in its current state (block 1512). In some embodiments, the server device 12 then downloads the previous state of the software to the device, and the device resumes executing the software in its previous state.

Figure 16:
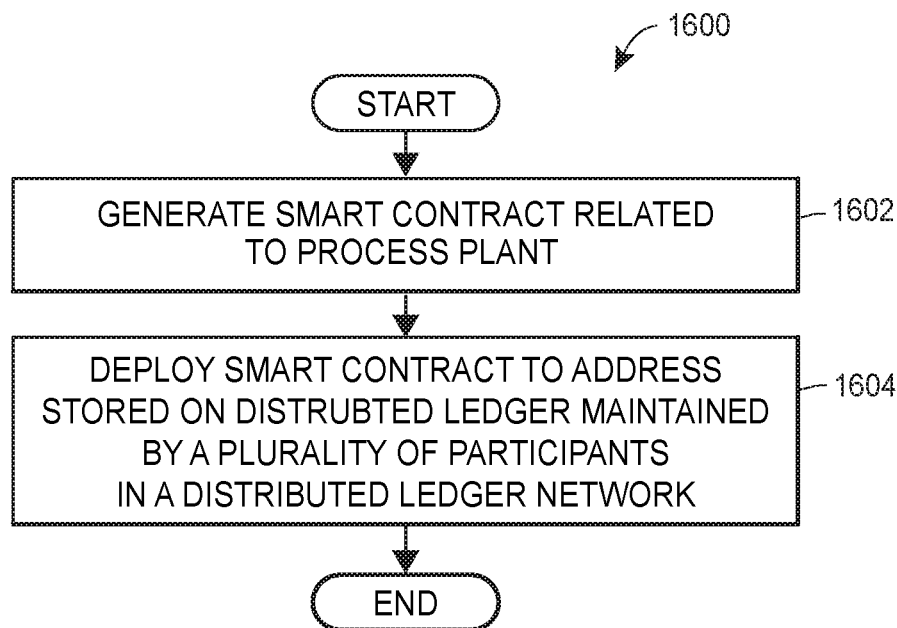
FIG. 16 illustrates a flow diagram representing an exemplary method for creating smart contracts in a process control system using a distributed ledger.

FIG. 16 illustrates a flow diagram representing an exemplary method 1600 for creating smart contracts in a process control system using a distributed ledger. The method 1600 may be executed by a field device 15-22, 40-46 within the process plant 10, a controller 11 in the process plant 10, or another computing device within the process plant 10 such an operator workstation, server device 12, user interface device 8, I/O device 26, 28, network device 35, etc.

At block 1602, a smart contract is generated that is related to one or several process plants. For example, the smart contract may transfer a token value from Plant A to Plant B when Plant A receives a product from Plant B that meets certain quality standards. Another example smart contract in a process control system may include a secure write request smart contract that allows plant personnel to write parameter data to an SIS device in the process plant 10. Yet another example smart contract in a process control system may include a device information smart contract that obtains device information from a device experiencing a failure, and provides the device information to a device supplier in response to receiving a request to share the device information.

At block 1604, the smart contract is deployed to an address stored on the distributed ledger. The deployed smart contract may expose methods and data to other participants in the distributed ledger network. Some of the data in the smart contract state may be private data that may only be altered by calling a method of the smart contract, or only altered by authorized distributed ledger participants. One way of altering the smart contract state is to broadcast a transaction to the distributed ledger network. If the broadcasted transaction satisfies consensus rules, network validators may include the transaction in the distributed ledger.

In some embodiments, validating nodes such as edge gateways execute the code contained in the smart contract and field devices act as evidence oracles and provide evidence transactions which alter the smart contract state.

Figure 17:
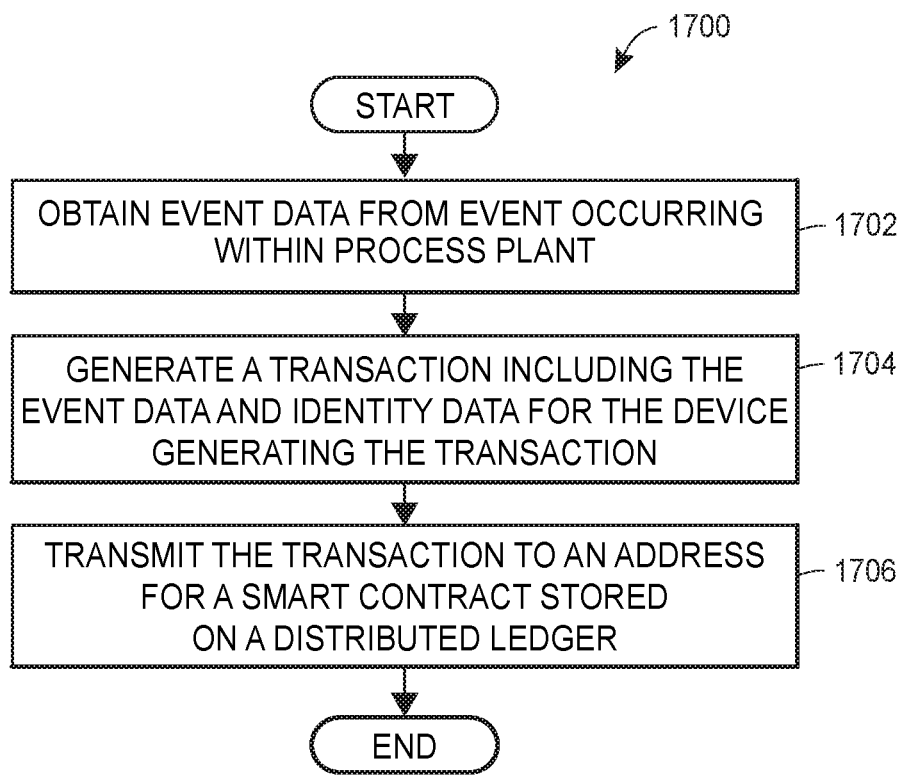
FIG. 17 illustrates a flow diagram representing an exemplary method for interacting with a smart contract in a process control system using a distributed ledger.

FIG. 17 illustrates a flow diagram representing an exemplary method 1700 for interacting with a smart contract in a process control system using a distributed ledger. The method 1700 may be executed by a field device 15-22, 40-46 within the process plant 10, a controller 11 in the process plant 10, or another computing device within the process plant 10 such an operator workstation, server device 12, user interface device 8, I/O device 26, 28, network device 35, etc.

At block 1702, event data is obtained from an event occurring within the process plant 10. An event may be a product being delivered by or received at a process plant 10, the completion of a product being manufactured at the process plant 10, a change in the properties of a product, a change in a process parameter value, a triggering event such as an alarm, an error, a leak, a repair event, a corrective action, a user interaction such as a request to write to an SIS device, a request to provide device information to a device supplier, or a request to transfer a token value when a particular product is received, or any other suitable event occurring within the process plant 10. The event data may include process parameter data, product parameter data, configuration data, user interaction data, maintenance data, commissioning data, plant network data, product tracking data, or any other suitable data related to the event, such as the date and time of the event, the duration of the event, a description of the event, etc.

Then at block 1704, a transaction is generated that includes the event data and identification information for the entity generating the transaction, such as a cryptographic public key assigned to the entity. The transaction may be cryptographically signed to provide cryptographic proof-of-identity of the entity generating the transaction. At block 1706, the transaction is transmitted to the address on the distributed ledger where the smart contract is deployed. In this manner, validating nodes such as edge gateways alter the smart contract state according to the event data included in the transaction.

For example, a smart contract may transfer a token value from Plant A to Plant B when Plant A receives a product from Plant B that meets certain quality standards. A field device in Plant A may generate a transaction including event data that is related to the quality of the product, such as an identification information for Plant A, identification information for the product, an indication that the product was received from Plant B, and product parameter data which describes properties of the product (e.g., the temperature of the product, the volume of the product, the density of the product, the viscosity of the product, or the chemical composition of the product). The field device may provide the transaction to the address for the smart contract, and the validating nodes may alter the smart contract state to include the product parameter data. In some embodiments, the smart contract compares the properties of the product included in the product parameter data to a set of minimum threshold requirements for the product to satisfy the appropriate quality standards. If the product satisfies the quality standards, the smart contract may transfer the token value to Plant B. In some embodiments, a field device in Plant B may generate a transaction including event data that is related to the quality of the product, such as process parameter data which describes parameter values for process plant entities in Plant B involved in manufacturing the product, where the parameter values are collected as the product is being manufactured.

Embodiments of the techniques described in the present disclosure may include any number of the following aspects, either alone or combination:

1. A validating network node in a process plant on a distributed ledger network comprising: a transceiver configured to communicate with one or more field devices each performing a physical function to control an industrial process in the process plant and to exchange distributed ledger data with peer network nodes, the distributed ledger data including transactions having process plant data; a storage media configured to store a copy of the distributed ledger; and a process data validator configured to apply a set of consensus rules to the distributed ledger data received from the peer network nodes, the process data validator being further configured to append the distributed ledger data received from the peer network nodes to the copy of the distributed ledger if the distributed ledger data satisfies the consensus rules.
2. The validating network node according to aspect 1, wherein the distributed ledger data received from the peer nodes includes a proof-of-identity of an entity generating a transaction having process plant data.
3. The validating network node according to any one of the preceding aspects, wherein to append distributed ledger data received from peer nodes, the transaction validator is configured to: solve a cryptographic puzzle based on a block of transactions; add the solution to the cryptographic puzzle to the block of transactions; append the block of transactions to the copy of the distributed ledger; and transmit the block of transactions to at least one of the peer network nodes in the distributed ledger network.
4. The validating network node according to any one of the preceding aspects, wherein the set of consensus rules include at least one of: formatting requirements for transactions or blocks of transactions; a mechanism to determine which of the peer network nodes will add a next transaction or block of transactions to the distributed ledger; or a cryptographic hashing algorithm for hashing the process plant data included in each of the transactions.
5. The validating network node according to any one of the preceding aspects, wherein the process data validator is further configured to execute code in smart contracts and update state databases for the smart contracts.
6. The validating network node according to any one of the preceding aspects, wherein the process data validator is further configured to disregard the distributed ledger data received from the peer network nodes if the distributed ledger data does not satisfy the consensus rules.
7. The validating network node according to any one of the preceding aspects, wherein the validating network node and the peer network nodes are devices within a same process plant.
8. The validating network node according to any one of the preceding aspects, wherein the validating network node and the peer network nodes are devices within a plurality of process plants.
9. A method for recording data in a process control system using a distributed ledger maintained by a plurality of participants, the method comprising: obtaining, by a computing device, process plant data related to a process control element within a process plant; generating a transaction including the process plant data, wherein the transaction is stored in the distributed ledger; and transmitting the transaction to at least one other participant in a distributed ledger network of participants maintaining the distributed ledger.
10. The method according to aspect 9, wherein generating the transaction includes: generating a cryptographic signature based on the transaction; and augmenting the transaction with the cryptographic signature.
11. The method according to either one of aspect 9 or aspect 10, wherein the data is obtained from a field device within the process plant, and generating the transaction further includes: obtaining identity data for the field device; and augmenting the transaction with the identity data.
12. The method according to any one of aspects 9-11, further comprising: adding the transaction to a block of transactions; solving a cryptographic puzzle based on the block of transactions; adding the solution to the cryptographic puzzle to the block of transactions; and transmitting the block of transactions to at least one other participant in the distributed ledger network.
13. The method according to any one of aspects 9-12, wherein the data is product tracking data and generating a transaction includes generating a transaction indicating a product has been transferred from a process plant to another entity.
14. The method according to any one of aspects 9-13, wherein the data is product parameter data including at least one of: a temperature of a product, a volume of the product, or a chemical composition of the product, and wherein the product parameter data is stored in the distributed ledger to verify authenticity of the parameter data for the product when the product is provided to another entity.
15. The method according to any one of aspects 9-14, wherein the distributed ledger network includes a plurality of layers, and further comprising: in a first instance, generating a transaction to be stored in a first layer of the distributed ledger; and in a second instance, generating a transaction to be stored in a second layer of the distributed ledger.
16. The method according to any one of aspects 9-15, wherein the first layer of the distributed ledger is public and the second layer of the distributed layer is private.
17. The method according to any one of aspects 9-16, wherein the distributed ledger is at least one of: a blockchain, a tangle, a block lattice, or other directed acyclic graph.
18. The method according to any one of aspects 9-17, wherein the process plant data includes at least one of:

product parameter data, configuration data, product tracking data, or process parameter data.

19. The method according to any one of aspects 9-18, wherein generating a transaction includes generating a transaction including a cryptographic hash value corresponding to the process plant data.

20. A system for recording data in a process control system using a distributed ledger maintained by a plurality of participants comprising: one or more devices disposed in a process plant each performing a physical function to control an industrial process; and a computing device executing in the process plant including: one or more processors; a communication unit; and a non-transitory computer-readable medium coupled to the one or more processors and the communication unit and storing instructions thereon, that when executed by the one or more processors, cause the computing device to: obtain process plant data related to the one or more devices within the process plant; generate a transaction including the process plant data; and transmit the transaction to at least one other participant in a distributed ledger network of participants maintaining the distributed ledger for validating and recording the transaction in the distributed ledger.

21. The system according to aspect 20, wherein to generate the transaction, the instructions cause the computing device to: generate a cryptographic signature based on the transaction; and augment the transaction with the cryptographic signature.

22. The system according to either one of aspect 20 or aspect 21, wherein the data is obtained from a field device within the process plant, and to generate the transaction, the instructions cause the computing device to: obtain identity data for the field device; and augment the transaction with the identity data.

23. The system according to any one of aspects 20-22, wherein the instructions further cause the computing device to: add the transaction to a block of transactions; solve a cryptographic puzzle based on the block of transactions; add the solution to the cryptographic puzzle to the block of transactions; and transmit the block of transactions to at least one other participant in the distributed ledger network.

24. The system according to any one of aspects 20-23, wherein the distributed ledger network includes a plurality of layers, and the instructions further cause the computing device to: in a first instance, generate a transaction to be stored in a first layer of the distributed ledger; and in a second instance, generate a transaction to be stored in a second layer of the distributed ledger.

25. The system according to any one of aspects 20-24, wherein the first layer of the distributed ledger is a public blockchain and the second layer of the distributed layer is a private blockchain.

26. The system according to any one of aspects 20-25, wherein the distributed ledger is at least one of: a blockchain, a tangle, a block lattice, or other directed acyclic graph.

27. The system according to any one of aspects 20-26, wherein the process plant data includes at least one of: product parameter data, configuration data, product tracking data, or process parameter data.

28. The system according to any one of aspects 20-27, wherein generating a transaction includes generating a transaction including a cryptographic hash value corresponding to the process plant data.

29. A non-transitory computer-readable memory coupled to one or more processors and storing instructions thereon that, when executed by the one or more processors, cause the one or more processors to: receive transactions that include process plant data generated by one or more field devices each performing a physical function to control an industrial process in a process plant; store a copy of a distributed ledger; apply a set of consensus rules to the received transactions; append one of the received transactions to the copy of the distributed ledger if the received transaction satisfies the consensus rules; and transmit the appended transaction to at least one peer network node that stores a copy of the distributed ledger.

30. The computer-readable memory according to aspect 29, wherein the received transaction includes a proof-of-identity of an entity generating the transaction.

31. The computer-readable memory according to either one of aspect 29 or aspect 30, wherein to append one of the received transactions, the instructions cause the one or more processors to: solve a cryptographic puzzle based on a block of transactions that includes the received transaction; add the solution to the cryptographic puzzle to the block of transactions; append the block of transactions to the copy of the distributed ledger; and transmit the block of transactions to the peer network node.

32. The computer-readable memory according to any one of aspects 29-31, wherein the set of consensus rules include at least one of: formatting requirements for transactions or blocks of transactions; a mechanism to determine which of the peer network nodes will add a next transaction or block of transactions to the distributed ledger; or a cryptographic hashing algorithm for hashing the process plant data included in each of the transactions.

33. The computer-readable memory according to any one of aspects 29-32, wherein the instructions further cause the one or more processors to disregard the distributed ledger data received from the peer network nodes if the distributed ledger data does not satisfy the consensus rules.

34. The computer-readable memory according to any one of aspects 29-33, wherein the peer network nodes are devices within a same process plant.

35. The computer-readable memory according to any one of aspects 29-34, wherein the peer network nodes are devices within a plurality of process plants.

36. A method for secure metering of untrusted data in process control systems using a distributed ledger maintained by a plurality of participants, the method comprising: collecting, by a field device performing a physical function to control an industrial process in a process plant, a measurement of a parameter within the process plant; obtaining, by a computing device, the measurement of the parameter; generating a transaction including the measurement; and transmitting the transaction to at least one other participant in a local distributed ledger network of participants maintaining a local distributed ledger; after a threshold time period, transmitting a plurality of transactions generated during the threshold time period to at least one participant in a global distributed ledger network of participants maintaining a global distributed ledger.

37. The method according to aspect 36, further comprising: adding the transaction to a local block of transactions; solving a cryptographic puzzle based on the local block of transactions; adding the solution to the cryptographic puzzle to the local block of transactions; and transmitting the local block of transactions to at least one other participant in the local distributed ledger network.

38. The method according to either one of aspect 36 or aspect 37, further comprising: after the threshold time period, transmitting one or more local blocks of transactions generated during the threshold time period to at least one participant in the global distributed ledger network.

39. The method according to any one of aspects 36-38, further comprising: after the threshold time period, pruning at least some of the plurality of transaction generated during the threshold time period from the local distributed ledger network.

40. The method according to any one of aspects 36-39, wherein the global distributed ledger is a permissioned blockchain viewable by a plurality of entities operating a plurality of process plants.

41. The method according to any one of aspects 36-40, wherein the parameter is related to a shared resource between the plurality of entities operating the plurality of process plants.

42. The method according to any one of aspects 36-41, wherein the global distributed ledger includes a plurality of global distributed ledgers corresponding to the plurality of entities, each global distributed ledger including transactions stored in the local distributed ledger for a same respective entity as the global distributed ledger.

43. The method according to any one of aspects 36-42, further comprising: for transactions generated during the threshold time period, adding the transaction from each of the plurality of global distributed ledgers to a state block of transactions; solving a cryptographic puzzle based on the state block of transactions; adding the solution to the cryptographic puzzle to the state block of transactions; and transmitting the state block of transactions to at least one other participant in a super blockchain network of participants maintaining a super blockchain.

44. The method according to any one of aspects 36-43, wherein the local distributed ledger is a private blockchain viewable by an entity operating the process plant.

45. The method according to any one of aspects 36-44, wherein generating a transaction including the measurement includes generating the transaction including a cryptographic hash value corresponding to the measurement.

46. The method according to any one of aspects 36-45, wherein the shared resource between the plurality of entities operating the plurality of process plants is a fluid in a fluid pipeline, and the parameter measurement is an amount of fluid obtained by one of the plurality of entities from the fluid pipeline.

47. A system for secure metering of untrusted data in process control systems using a distributed ledger maintained by a plurality of participants comprising: one or more field devices disposed in a process plant each performing a physical function to control an industrial process, the one or more field devices configured to collect measurements of parameters within the process plant and provide the parameter measurements to one or more edge gateway devices; and the one or more edge gateway devices executing in the process plant each including: one or more processors; a communication unit; and a non-transitory computer-readable medium coupled to the one or more processors and the communication unit and storing instructions thereon, that when executed by the one or more processors, causes the edge gateway device to: obtain at least one of the parameter measurements; generate a transaction including the measurement; and transmit the transaction to at least one other edge gateway in a local distributed ledger network of edge gateways maintaining a local distributed ledger; and after a threshold time period, transmit a plurality of transactions generated during the threshold time period to at least one participant in a global distributed ledger network of participants maintaining a global distributed ledger.

48. The system according to aspect 47, wherein the instructions further cause the edge gateway to: add the transaction to a local block of transactions; solve a cryptographic puzzle based on the local block of transactions; add the solution to the cryptographic puzzle to the local block of transactions; and transmit the local block of transactions to at least one other edge gateway in the local distributed ledger network.

49. The system according to either one of aspect 47 or aspect 48, wherein the instructions further cause the edge gateway to: after the threshold time period, transmit one or more local blocks of transactions generated during the threshold time period to at least one participant in the global distributed ledger network.

50. The system according to any one of aspects 47-49, wherein the instructions further cause the edge gateway to: after the threshold time period, prune at least some of the plurality of transactions generated during the threshold time period from the local distributed ledger network.

51. The system according to any one of aspects 47-50, wherein the global distributed ledger is a permissioned blockchain viewable by a plurality of entities operating a plurality of process plants.

52. The system according to any one of aspects 47-51, wherein the parameter is related to a shared resource between the plurality of entities operating the plurality of process plants.

53. The system according to any one of aspects 47-52, wherein the global distributed ledger includes a plurality of global distributed ledgers corresponding to the plurality of entities, each global distributed ledger including transactions stored in the local distributed ledger for a same respective entity as the global distributed ledger.

54. The system according to any one of aspects 47-53, further comprising: a computing device in a global distributed ledger network maintaining a global distributed ledger including: one or more processors; a communication unit; and a non-transitory computer-readable medium coupled to the one or more processors and the communication unit and storing instructions thereon, that when executed by the one or more processors, causes the computing device to: for transactions generated during the threshold time period, add the transaction from each of the plurality of global distributed ledgers to a state block of transactions; solve a cryptographic puzzle based on the state block of transactions; add the solution to the cryptographic puzzle to the state block of transactions; and transmit the state block of transactions to at least one other participant in a super blockchain network of participants maintaining a super blockchain.
55. The system according to any one of aspects 47-54, wherein the local distributed ledger is a private blockchain viewable by an entity operating the process plant.
56. The system according to any one of aspects 47-55, wherein the transaction includes a cryptographic hash value corresponding to the measurement.
57. The system according to any one of aspects 47-56, wherein the shared resource between the plurality of entities operating the plurality of process plants is a fluid in a fluid pipeline, and the parameter measurement is an amount of fluid obtained by one of the plurality of entities from the fluid pipeline.
58. A validating network node in a process plant on a local distributed ledger network comprising: a transceiver configured to (i) communicate with one or more field devices each performing a physical function to control an industrial process in the process plant and collecting measurements of parameters within the process plant, and to (ii) exchange local distributed ledger data with peer network nodes, the local distributed ledger data including transactions having parameter measurements; a storage media configured to store a copy of the local distributed ledger; and a process data validator configured to apply a set of consensus rules to the distributed ledger data received from the peer network nodes, the process data validator being further configured to append the distributed ledger data received from the peer network nodes to the copy of the distributed ledger if the distributed ledger data satisfies the consensus rules, wherein after a threshold time period, the transceiver is configured to transmit a plurality of transactions generated during the threshold time period to at least one participant in a global distributed ledger network of participants maintaining a global distributed ledger.
59. The validating network node according to aspect 58, wherein after the threshold time period, the validating network node is configured to prune at least some of the plurality of transactions generated during the threshold time period from the copy of the local distributed ledger.
60. The validating network node according to either one of aspect 58 or aspect 59, wherein the global distributed ledger is a permissioned blockchain viewable by a plurality of entities operating a plurality of process plants.
61. The validating network node according to any one of aspects 58-60, wherein at least one of the parameters is related to a shared resource between the plurality of entities operating the plurality of process plants.
62. The validating network node according to any one of aspects 58-61, wherein the global distributed ledger includes a plurality of global distributed ledgers corresponding to the plurality of entities, each global distributed ledger including transactions stored in the local distributed ledger for a same respective entity as the global distributed ledger.
63. The validating network node according to any one of aspects 58-62, wherein the local distributed ledger is a private blockchain viewable by an entity operating the process plant.
64. The validating network node according to any one of aspects 58-63, wherein a transaction includes a cryptographic hash value corresponding to a parameter measurement.
65. A method for recording quality control, production, or regulatory data in a process control system using a distributed ledger maintained by a plurality of participants, the method comprising: detecting, via one or more field devices each performing a physical function to control an industrial process, a triggering event related to quality control within a process plant; obtaining event data from the triggering event including at least one of: a time of the triggering event, a duration of the triggering event, product parameter data related to the triggering event, or process parameter data related to the triggering event; generating a transaction including the event data, wherein the transaction is stored in the distributed ledger; and transmitting the transaction to at least one other participant in a distributed ledger network of participants maintaining the distributed ledger.
66. The method according to aspect 65, wherein the triggering event is at least one of: an alarm, an error, a leak, a repair event, a process milestone, or a corrective action.
67. The method according to either one of aspect 65 or aspect 66, further comprising: receiving a request for event data from a particular triggering event; obtaining the event data from the distributed ledger; and presenting the event data from the particular triggering event on a user interface.
68. The method according to any one of aspects 65-67, wherein generating a transaction including the event data includes generating the transaction including a cryptographic hash value corresponding to at least some of the event data.
69. The method according to any one of aspects 65-68, further comprising: storing the event data in a database; and in response to a request to authenticate the event data, providing the cryptographic hash value corresponding to at least some of the event data from the distributed ledger along with the event data from the database to verify authenticity of the event data.
70. The method according to any one of aspects 65-69, wherein the triggering event is an opening in a relief valve, and the event data from the triggering event includes at least one of: a time at which the relief valve opened, a duration in which the relief valve opened, a pressure value when the relief valve opened, or an amount of fluid removed while the relief valve opened.
71. The method according to any one of aspects 65-70, wherein the distributed ledger is a private blockchain accessible by the process plant and a regulatory agency.
72. The method according to any one of aspects 65-71, wherein the distributed ledger is a public blockchain.
73. The method according to any one of aspects 65-72, wherein the transaction further includes a unique identifier for the triggering event.
74. The method according to any one of aspects 65-73, further comprising: transmitting an indication of the detected triggering event including the unique identifier for the triggering event to one or more other process control elements in the process plant for the other process control elements to generate transactions including additional event data related to the triggering event.
75. A system for recording quality control, production or regulatory data in a process control system using a distributed ledger maintained by a plurality of participants comprising: one or more devices disposed in a process plant each performing a physical function to control an industrial process; and a computing device executing in the process plant including: one or more processors; a communication unit; and a non-transitory computer-readable medium coupled to the one or more processors and the communication unit and storing instructions thereon, that when executed by the one or more processors, cause the computing device to: detect, via the one or more devices, a triggering event related to quality control within a process plant; obtain event data from the triggering event including at least one of: a time of the triggering event, a duration of the triggering event, product parameter data related to the triggering event, or process parameter data related to the triggering event; generate a transaction including the event data, wherein the transaction is stored in the distributed ledger; and transmit the transaction to at least one other participant in a distributed ledger network of participants maintaining the distributed ledger for validating and recording the transaction in the distributed ledger.

76. The system according to aspect 75, wherein the triggering event is at least one of: an alarm, an error, a leak, a repair event, a process milestone, or a corrective action.

77. The system according to either one of aspect 75 or aspect 76, wherein the instructions further cause the computing device to: receive a request for event data from a particular triggering event; obtain the event data from the distributed ledger; and present the event data from the particular triggering event on a user interface.

78. The system according to any one of aspects 75-77, wherein the transaction includes a cryptographic hash value corresponding to at least some of the event data.

79. The system according to any one of aspects 75-78, wherein the instructions further cause the computing device to: store the event data in a database; and in response to a request to authenticate the event data, provide the cryptographic hash value corresponding to at least some of the event data from the distributed ledger along with the event data from the database to verify authenticity of the event data.

80. The system according to any one of aspects 75-79, wherein the triggering event is an opening in a relief valve, and the event data from the triggering event includes at least one of: a time at which the relief valve opened, a duration in which the relief valve opened, a pressure value when the relief valve opened, or an amount of fluid removed while the relief valve opened.

81. The system according to any one of aspects 75-80, wherein the distributed ledger is a private blockchain accessible by the process plant and a regulatory agency.

82. The system according to any one of aspects 75-81, wherein the distributed ledger is a public blockchain.

83. The system according to any one of aspects 75-82, wherein the transaction further includes a unique identifier for the triggering event.

84. The system according to any one of aspects 75-83, wherein the instructions further cause the computing device to: transmit an indication of the detected triggering event including the unique identifier for the triggering event to the one or more devices in the process plant for the one or more devices to generate transactions including additional event data related to the triggering event.

85. A validating network node in a process plant on a distributed ledger network comprising: a transceiver configured to communicate with one or more field devices each performing a physical function to control an industrial process in the process plant and to exchange distributed ledger data with peer network nodes, the distributed ledger data including transactions having event data from a triggering event; a storage media configured to store a copy of the distributed ledger; and a process data validator configured to apply a set of consensus rules to the distributed ledger data received from the peer network nodes, the process data validator being further configured to append the distributed ledger data received from the peer network nodes to the copy of the distributed ledger if the distributed ledger data satisfies the consensus rules.

86. The validating network node according to aspect 85, wherein the event data includes at least one of: a time of the triggering event, a duration of the triggering event, product parameter data related to the triggering event, or process parameter data related to the triggering event.

87. The validating network node according to either one of aspect 85 or aspect 86, wherein the triggering event is at least one of: an alarm, an error, a leak, a repair event, or a corrective action.

88. The validating network node according to any one of aspects 85-87, wherein the distributed ledger data received from the peer nodes includes a proof-of-identity of one of the one or more field devices generating a transaction having event data.

89. The validating network node according to any one of aspects 85-88, wherein to append distributed ledger data received from peer nodes, the transaction validator is configured to: solve a cryptographic puzzle based on a block of transactions; add the solution to the cryptographic puzzle to the block of transactions; append the block of transactions to the copy of the distributed ledger; and transmit the block of transactions to at least one of the peer network nodes in the distributed ledger network.

90. The validating network node according to any one of aspects 85-89, wherein the set of consensus rules include at least one of: formatting requirements for transactions or blocks of transactions; a mechanism to determine which of the peer network nodes will add a next transaction or block of transactions to the distributed ledger; or a cryptographic hashing algorithm for hashing the process control data included in each of the transactions.

91. The validating network node according to any one of aspects 85-90, wherein the distributed ledger is a private blockchain accessible by the process plant and a regulatory agency.

92. The validating network node according to any one of aspects 85-91, wherein the distributed ledger is a public blockchain.

93. The validating network node according to any one of aspects 85-92, wherein the transaction further includes a unique identifier for the triggering event.

94. A method for recording states of software or firmware in a process control system and connected instrumentation using a distributed ledger maintained by a plurality of participants, the method comprising: obtaining, by a computing device, a current state of software or firmware executing within a process plant having one or more field devices each performing a physical function to control an industrial process, the software or firmware executing within a network or process control device within the process plant; generating a transaction including the current state of the software or firmware executing within the process plant, wherein the transaction is stored in the distributed ledger; and transmitting the transaction to at least one other participant in a distributed ledger network of participants maintaining the distributed ledger.

95. The method according to aspect 94, wherein the current state of the software or firmware executing within the process plant is obtained from a computing device of a user who updated the current state, and generating the transaction further includes: obtaining identity data for the user; augmenting, at the one or more processors, the transaction with the identity data for the user; generating, at the one or more processors, a cryptographic signature based upon the transaction; and augmenting, at the one or more processors, the transaction with the cryptographic signature.

96. The method according to either one of aspect 94 or aspect 95, wherein generating a transaction including the current state of the software or firmware executing within the process plant includes generating the transaction including a cryptographic hash value corresponding to the current state of the software or firmware executing within the process plant.

97. The method according to any one of aspects 94-96, further comprising: obtaining, from the network or process control device executing the software or firmware, a state of the software or firmware executing within the process plant; and comparing the state of the software or firmware executing within the process plant to the cryptographic hash value from the distributed ledger to verify the software or firmware has not been tampered with.

98. The method according to any one of aspects 94-97, further comprising: in response to determining that the state of the software or firmware executing within the process plant does not match with the current state of the software or firmware stored in the distributed ledger according to the cryptographic hash value, preventing the software or firmware from being executed within the process plant.

99. The method according to any one of aspects 94-98, further comprising: causing the software or firmware to revert to a previous state.

100. The method according to any one of aspects 94-99, further comprising: in response to determining that the state of the software or firmware executing within the process plant does match with the current state of the software or firmware stored in the distributed ledger according to the cryptographic hash value, causing the network or process control device to execute the software or firmware.

101. The method according to any one of aspects 94-100, further comprising: adding the transaction to a block of transactions; solving a cryptographic puzzle based on the block of transactions; adding the solution to the cryptographic puzzle to the block of transactions; and transmitting the block of transactions to at least one other participant in the distributed ledger network.

102. The method according to any one of aspects 94-101, further comprising: comparing the identity data in the transaction to a plurality of sets of identity data corresponding to users authorized to update the state of the software or firmware executing within the process plant; and adding the transaction to the block of transactions when the identity data is included within the plurality of sets of identity data.

103. The method according to any one of aspects 94-102, wherein the distributed ledger is a permissioned blockchain.

104. A system for recording states of software or firmware in a process control system and connected instrumentation using a distributed ledger maintained by a plurality of participants comprising: one or more devices disposed in a process plant each performing a physical function to control an industrial process; and a computing device executing in the process plant including: one or more processors; a communication unit; and a non-transitory computer-readable medium coupled to the one or more processors and the communication unit and storing instructions thereon, that when executed by the one or more processors, cause the computing device to: obtain a current state of software or firmware executing within the process plant, the software or firmware executing within at least one of the one or more devices disposed in the process plant or a network device within the process plant; generate a transaction including the current state of the software or firmware executing within the process plant, wherein the transaction is stored in the distributed ledger; and transmit the transaction to at least one other participant in a distributed ledger network of participants maintaining the distributed ledger for validating and recording the transaction in the distributed ledger.

105. The system according to aspect 104, wherein the current state of the software or firmware executing within the process plant is obtained from a computing device of a user who updated the current state, and to generate the transaction the instructions cause the computing device to: obtain identity data for the user; augment the transaction with the identity data for the user; generate a cryptographic signature based upon the transaction; and augment the transaction with the cryptographic signature.

106. The system according to either one of aspect 104 or aspect 105, wherein the transaction is generated with a cryptographic hash value corresponding to the current state of the software or firmware executing within the process plant.

107. The system according to any one of aspects 104-106, further comprising: a server device including: one or more processors; a communication unit; and a non-transitory computer-readable medium coupled to the one or more processors and the communication unit and storing instructions thereon, that when executed by the one or more processors, cause the server device to: obtain, from the network or process control device executing the software or firmware, a state of the software or firmware executing within the process plant; and compare the state of the software or firmware executing within the process plant to the cryptographic hash value from the distributed ledger to verify the software or firmware has not been tampered with.

108. The system according to any one of aspects 104-107, wherein the instructions further cause the server device to: in response to determining that the state of the software or firmware executing within the process plant does not match with the current state of the software or firmware stored in the distributed ledger according to the cryptographic hash value, prevent the software or firmware from being executed within the process plant.

109. The system according to any one of aspects 104-108, wherein the instructions further cause the server device to: cause the software or firmware to revert to a previous state.
110. The system according to any one of aspects 104-109, wherein the instructions further cause the server device to: in response to determining that the state of the software or firmware executing within the process plant does match with the current state of the software or firmware stored in the distributed ledger according to the cryptographic hash value, cause the network or process control device to execute the software or firmware.
111. The system according to any one of aspects 104-110, wherein the instructions further cause the computing device to: add the transaction to a block of transactions; solve a cryptographic puzzle based on the block of transactions; add the solution to the cryptographic puzzle to the block of transactions; and transmit the block of transactions to at least one other participant in the distributed ledger network.
112. The system according to any one of aspects 104-111, wherein the instructions further cause the computing device to: compare the identity data in the transaction to a plurality of sets of identity data corresponding to users authorized to update the state of the software or firmware executing within the process plant; and add the transaction to the block of transactions when the identity data is included within the plurality of sets of identity data.
113. The system according to any one of aspects 104-112, wherein the distributed ledger is a permissioned blockchain.
114. A validating network node in a process plant on a distributed ledger network comprising: a transceiver configured to communicate with one or more field devices each performing a physical function to control an industrial process in the process plant and to exchange distributed ledger data with peer network nodes, the distributed ledger data including transactions having data indicative of the current state of the software or firmware executing within the process plant; a storage media configured to store a copy of the distributed ledger; and a process data validator configured to apply a set of consensus rules to the distributed ledger data received from the peer network nodes, the process data validator being further configured to append the distributed ledger data received from the peer network nodes to the copy of the distributed ledger if the distributed ledger data satisfies the consensus rules.
115. The validating network node according to aspect 114, wherein to append distributed ledger data received from peer nodes, the transaction validator is configured to: solve a cryptographic puzzle based on a block of transactions; add the solution to the cryptographic puzzle to the block of transactions; append the block of transactions to the copy of the distributed ledger; and transmit the block of transactions to at least one of the peer network nodes in the distributed ledger network.
116. The validating network node according to either one of aspect 114 or aspect 115, wherein the set of consensus rules include at least one of: formatting requirements for transactions or blocks of transactions; a mechanism to determine which of the peer network nodes will add a next transaction or block of transactions to the distributed ledger; or a cryptographic hashing algorithm for hashing software or firmware state data included in each of the transactions.
117. The validating network node according to any one of aspects 114-116, wherein the distributed ledger data received from the peer nodes includes a proof-of-identity of a user of a device generating a transaction having data indicative of the current state of the software or firmware executing within the process plant.
118. A method for creating smart contracts in a process control system using a distributed ledger maintained by a plurality of participants, the method comprising: generating, by one or more processors, a smart contract related to a process plant having one or more field devices each performing a physical function to control an industrial process; and deploying, by the one or more processors, the smart contract to an address stored on the distributed ledger maintained by the plurality of participants in a distributed ledger network.
119. The method according to aspect 118, wherein the smart contract receives or provides a token value in accordance with an event occurring within the process plant.
120. The method according to either one of aspect 118 or aspect 119, wherein generating a smart contract related to a process plant includes generating a smart contract that obtains a token value from a first process plant, determines that a product transferred from a second process plant to the first process plant, and provides the token value to the second process plant.
121. The method according to any one of aspects 118-120, wherein the smart contract determines that a product transferred from the second process plant to the first process plant by receiving a transaction from an evidence oracle indicating that the product was received at the first process plant.
122. The method according to any one of aspects 118-121, wherein generating a smart contract related to a process plant further includes generating a smart contract that determines that the product meets or exceeds one or more quality metrics, and provides the token value to the second process plant in response to determining that the product meets or exceeds the one or more quality metrics.
123. The method according to any one of aspects 118-122, wherein the smart contract determines that the product meets or exceeds one or more quality metrics by receiving one or more transactions from the evidence oracle each including a product parameter value or a process parameter value and comparing the product parameter value or the process parameter value to a product or process parameter threshold included in the one or more quality metrics.
124. The method according to any one of aspects 118-123, wherein generating a smart contract related to a process plant includes generating a smart contract that obtains device information for a device within the process plant that experiences a failure, and provides the device information to a device supplier in response to receiving a request to share the device information.
125. The method according to any one of aspects 118-124, wherein the smart contract obtains device information by receiving a transaction from an evidence oracle that includes the device information.
126. The method according to any one of aspects 118-125, wherein the smart contract receives a request to share the device information by receiving a transaction that includes the request along with identity data for a user that issued the request, and the smart contract compares the identity data in the transaction to a plurality of sets of identity data corresponding to users authorized to request that the distributed ledger network shares the device information, and provides the device information to the device supplier when the identity data is included within the plurality of sets of identity data.

127. The method according to any one of aspects 118-126, wherein generating a smart contract related to a process plant includes generating a smart contract that receives a parameter associated with a safety instrumented system (SIS) device, and writes the parameter to the SIS device in response to determining that an operator who provided the parameter is an authorized operator.

128. The method according to any one of aspects 118-127, wherein the smart contract receives a parameter associated with a SIS device by receiving a transaction that includes the parameter along with identity data for the operator that provided the transaction, and wherein determining that an operator who provided the parameter is an authorized operator includes comparing the identity data in the transaction to a plurality of sets of identity data corresponding to operators authorized to adjust parameters associated with the SIS device.

129. The method according to any one of aspects 118-128, wherein the parameter associated with the SIS device is a request to lock the SIS device.

130. A method for interacting with a smart contract in a process control system using a distributed ledger maintained by a plurality of participants, the method comprising: obtaining event data from an event occurring within a process plant having one or more field devices each performing a physical function to control an industrial process; in response to a smart contract being deployed to an address stored on the distributed ledger, generating, by a computing device, a transaction including the event data; and transmitting the transaction to the smart contract stored on the distributed ledger maintained by the plurality of participants in a distributed ledger network.

131. The method according to aspect 130, further comprising: obtaining identity data for the computing device; augmenting, at the one or more processors, the transaction with the identity data for the computing device; generating, at the one or more processors, a cryptographic signature based upon the transaction; and augmenting, at the one or more processors, the transaction with the cryptographic signature.

132. The method according to either one of aspect 130 or aspect 131, further comprising: adding the transaction to a block of transactions; solving a cryptographic puzzle based upon the block of transactions; adding the solution to the cryptographic puzzle to the block of transactions; and transmitting the block of transactions to at least one other participant in the distributed ledger network.

133. The method according to any one of aspects 130-132, wherein the smart contract obtains a token value from a first process plant, determines that a product transferred from a second process plant to the first process plant, and provides the token value to the second process plant, and wherein obtaining event data from an event occurring within a process plant includes: obtaining an indication that the product was received at the first process plant; and generating the transaction including the identification information for the first process plant, identification information for the product, and an indication that the product was received at the first process plant from the second process plant.

134. The method according to any one of aspects 130-133, wherein obtaining an indication that the product was received at the first process plant further includes: obtaining one or more product parameter values for the product or one or more process parameter values for process plant entities involved in manufacturing the product; and generating the transaction including the one or more product parameter values or one or more process parameter values.

135. The method according to any one of aspects 130-134, wherein the smart contract obtains device information for a device within the process plant that experiences a failure, and provides the device information to a device supplier in response to receiving a request to share the device information, and wherein obtaining event data from an event occurring within a process plant includes: obtaining device information for the device; and generating the transaction including identification information for the device and the device information.

136. The method according to any one of aspects 130-135, wherein the smart contract receives a parameter associated with a safety instrumented system (SIS) device, and writes the parameter to the SIS device in response to determining that an operator who provided the parameter is an authorized operator, and wherein obtaining event data from an event occurring within a process plant includes: obtaining a request to change a parameter associated with an SIS device; and generating the transaction including identification information for the SIS device, the changed parameter, and a new parameter value for the changed parameter.

137. A computing device for creating smart contracts in a process control system using a distributed ledger maintained by a plurality of participants comprising: one or more processors; a communication unit; and a non-transitory computer-readable medium coupled to the one or more processors and the communication unit and storing instructions thereon, that when executed by the one or more processors, cause the computing device to: generate a smart contract related to a process plant having one or more field devices each performing a physical function to control an industrial process; and deploy the smart contract to an address stored on the distributed ledger maintained by the plurality of participants in a distributed ledger network.

138. The computing device according to aspect 137, wherein the smart contract receives or provides a token value in accordance with an event occurring within the process plant.

139. The computing device according to either one of aspect 137 or aspect 138, wherein the smart contract obtains a token value from a first process plant, determines that a product transferred from a second process plant to the first process plant, and provides the token value to the second process plant.

140. The computing device according to any one of aspects 137-139, wherein the smart contract determines that a product transferred from the second process plant to the first process plant by receiving a transaction from an evidence oracle indicating that the product was received at the first process plant.

141. The computing device according to any one of aspects 137-140, wherein the smart contract determines that the product meets or exceeds one or more quality metrics, and provides the token value to the second process plant in response to determining that the product meets or exceeds the one or more quality metrics.
142. The computing device according to any one of aspects 137-141, wherein the smart contract determines that the product meets or exceeds one or more quality metrics by receiving one or more transactions from the evidence oracle each including a product parameter value or a process parameter value and comparing the product parameter value or the process parameter value to a product or process parameter threshold included in the one or more quality metrics.
143. The computing device according to any one of aspects 137-142, wherein the smart contract obtains device information for a device within the process plant that experiences a failure, and provides the device information to a device supplier in response to receiving a request to share the device information.
144. The computing device according to any one of aspects 137-143, wherein the smart contract obtains device information by receiving a transaction from an evidence oracle that includes the device information.
145. The computing device according to any one of aspects 137-144, wherein the smart contract receives a request to share the device information by receiving a transaction that includes the request along with identity data for a user that issued the request, and the smart contract compares the identity data in the transaction to a plurality of sets of identity data corresponding to users authorized to request that the distributed ledger network shares the device information, and provides the device information to the device supplier when the identity data is included within the plurality of sets of identity data.
146. The computing device according to any one of aspects 137-145, wherein the smart contract receives a parameter associated with a safety instrumented system (SIS) device, and writes the parameter to the SIS device in response to determining that an operator who provided the parameter is an authorized operator.
147. The computing device according to any one of aspects 137-146, wherein the smart contract receives a parameter associated with a SIS device by receiving a transaction that includes the parameter along with identity data for the operator that provided the transaction, and wherein determining that an operator who provided the parameter is an authorized operator includes comparing the identity data in the transaction to a plurality of sets of identity data corresponding to operators authorized to adjust parameters associated with the SIS device.
148. The computing device according to any one of aspects 137-147, wherein the parameter associated with the SIS device is a request to lock the SIS device.
149. A system for interacting with smart contracts in a process control system using a distributed ledger maintained by a plurality of participants comprising: one or more devices disposed in a process plant each performing a physical function to control an industrial process; and a computing device executing in the process plant including: one or more processors; a communication unit; and a non-transitory computer-readable medium coupled to the one or more processors and the communication unit and storing instructions thereon, that when executed by the one or more processors, cause the computing device to: obtain, via the one or more devices, event data from an event occurring within the process plant; in response to a smart contract being deployed to an address stored on the distributed ledger, generate a transaction including the event data; and transmit the transaction to the smart contract stored on the distributed ledger maintained by the plurality of participants in a distributed ledger network.
150. The system according to aspect 149, wherein the instructions further cause the computing device to: obtain identity data for the computing device; augment the transaction with the identity data for the computing device; generate a cryptographic signature based upon the transaction; and augment the transaction with the cryptographic signature.
151. The system according to either one of aspect 149 or aspect 150, wherein the instructions further cause the computing device to: add the transaction to a block of transactions; solve a cryptographic puzzle based upon the block of transactions; add the solution to the cryptographic puzzle to the block of transactions; and transmit the block of transactions to at least one other participant in the distributed ledger network.
152. The system according to any one of aspects 149-151, wherein the smart contract obtains a token value from a first process plant, determines that a product transferred from a second process plant to the first process plant, and provides the token value to the second process plant, and wherein to obtain event data from an event occurring within the process plant, the instructions cause the computing device to: obtain an indication that the product was received at the first process plant; and generate the transaction including the identification information for the first process plant, identification information for the product, and an indication that the product was received at the first process plant from the second process plant.
153. The system according to any one of aspects 149-152, wherein to obtain an indication that the product was received at the first process plant, the instructions cause the computing device to: obtain one or more product parameter values for the product or one or more process parameter values for process plant entities involved in manufacturing the product; and generate the transaction including the one or more product parameter values or one or more process parameter values.
154. The system according to any one of aspects 149-153, wherein the smart contract obtains device information for a device within the process plant that experiences a failure, and provides the device information to a device supplier in response to receiving a request to share the device information, and wherein to obtain event data from an event occurring within a process plant, the instructions cause the computing device to: obtain device information for the device; and generate the transaction including identification information for the device and the device information.
155. The system according to any one of aspects 149-154, wherein the smart contract receives a parameter associated with a safety instrumented system (SIS) device, and writes the parameter to the SIS device in response to determining that an operator who provided the parameter is an authorized operator, and wherein to obtain event data from an event occurring within a process plant, the instructions cause the computing device to: obtain a request to change a parameter associated with an SIS device; and generate the transaction including identification information for the SIS device, the changed parameter, and a new parameter value for the changed parameter.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed:

1. A computing device operating as a validating network node in a process plant on a distributed ledger network comprising:
   a transceiver configured to communicate with one or more field devices each performing a physical function to control an industrial process in the process plant and to exchange distributed ledger data with peer network nodes, the distributed ledger data including transactions having process plant data including at least one of: (i) product parameter data including characteristics of a product manufactured at the process plant, or (ii) process parameter data for a process plant entity that contains, transforms, generates, or transfers physical materials within the process plant, identity data for an entity generating the process plant data, and a cryptographic signature to provide proof-of-identity that the entity generated the process plant data;
   a storage media configured to store a copy of the distributed ledger; and
   a processor configured to apply a set of consensus rules to the distributed ledger data received from the peer network nodes, the processor being further configured to append the distributed ledger data received from the peer network nodes to the copy of the distributed ledger if the distributed ledger data satisfies the consensus rules;
   wherein a shelf-life of a product is predicted by assigning a quality score to each of a plurality of components of the product using the product parameter data or the process parameter data included in the distributed ledger for the product.

2. The computing device of claim 1, wherein the validating network node and the peer network nodes are devices within a plurality of process plants.

3. The computing device of claim 1, wherein to append distributed ledger data received from peer nodes, the transaction validator is configured to:
   solve a cryptographic puzzle based on a block of transactions;
   add a solution to the cryptographic puzzle to the block of transactions;
   append the block of transactions to the copy of the distributed ledger; and
   transmit the block of transactions to at least one of the peer network nodes in the distributed ledger network.

4. The computing device of claim 1, wherein the set of consensus rules include at least one of:
   formatting requirements for transactions or blocks of transactions;
   a mechanism to determine which of the peer network nodes will add a next transaction or block of transactions to the distributed ledger; or
   a cryptographic hashing algorithm for hashing the process plant data included in each of the transactions.

5. The computing device of claim 1, wherein the processor is further configured to execute code in smart contracts and update state databases for the smart contracts.

6. The computing device of claim 1, wherein the processor is further configured to disregard the distributed ledger data received from the peer network nodes if the distributed ledger data does not satisfy the consensus rules.

7. The computing device of claim 1, wherein the validating network node and the peer network nodes are devices within a same process plant.

8. A method for recording data in a process control system using a distributed ledger maintained by a plurality of participants, the method comprising:
   obtaining, by a computing device, process plant data related to a process control element within a process plant, the process plant data including at least one of: (i) product parameter data including characteristics of a product manufactured at the process plant, or (ii) process parameter data for a process plant entity that contains, transforms, generates, or transfers physical materials within the process plant;
   generating a transaction, wherein the transaction is stored in the distributed ledger;
   generating a cryptographic signature for an entity that generated the process plant data;
   augmenting the transaction with identity data for the entity and the cryptographic signature to provide a proof-of-identity that the entity generated the process plant data;
   augmenting the transaction with at least one of: (i) the product parameter data, or (ii) the process parameter data;
   transmitting the transaction to at least one other participant in a distributed ledger network of participants maintaining the distributed ledger;
   predicting a shelf-life by assigning a quality score to each of a plurality of components of the product using the product parameter data or the process parameter data included in the distributed ledger for the product.

9. The method of claim 8, wherein the distributed ledger network includes a plurality of layers, and further comprising:
   in a first instance, generating a transaction to be stored in a first layer of the distributed ledger; and
   in a second instance, generating a transaction to be stored in a second layer of the distributed ledger.

10. The method of claim 9, wherein the first layer of the distributed ledger is public and the second layer of the distributed layer is private.

11. The method of claim 8, wherein the distributed ledger is at least one of: a blockchain, a tangle, a block lattice, or other directed acyclic graph.

12. The method of claim 8, further comprising:
adding the transaction to a block of transactions;
solving a cryptographic puzzle based on the block of transactions;
adding a solution to the cryptographic puzzle to the block of transactions; and
transmitting the block of transactions to at least one other participant in the distributed ledger network.

13. The method of claim 8, wherein generating a transaction includes generating a transaction indicating a product has been transferred from a process plant to another entity.

14. The method of claim 8, wherein the product parameter data includes at least one of: a temperature of a product, a volume of the product, or a chemical composition of the product.

15. The method of claim 8, wherein generating a transaction includes generating a transaction including a cryptographic hash value corresponding to the process plant data.

16. A system for recording data in a process control system using a distributed ledger maintained by a plurality of participants comprising:
one or more devices disposed in a process plant each performing a physical function to control an industrial process; and
a computing device executing in the process plant including:
one or more processors;
a communication unit; and
a non-transitory computer-readable medium coupled to the one or more processors and the communication unit and storing instructions thereon, that when executed by the one or more processors, cause the computing device to:
obtain process plant data related to the one or more devices within the process plant, the process plant data including at least one of: (i) product parameter data including characteristics of a product manufactured at the process plant, or (ii) process parameter data for a process plant entity that contains, transforms, generates, or transfers physical materials within the process plant;
generate a transaction;
generate a cryptographic signature for an entity that generated the process plant data;
augment the transaction with identity data for the entity and the cryptographic signature to provide a proof-of-identity that the entity generated the process plant data;
augment the transaction with at least one of: (i) the product parameter data or (ii) the process parameter data; and
transmit the transaction to at least one other participant in a distributed ledger network of participants maintaining the distributed ledger for validating and recording the transaction in the distributed ledger,
wherein a shelf life of a product is predicted by assigning a quality score to each of a plurality of components of the product using the product parameter data or the process parameter data included in the distributed ledger for the product.

17. The system of claim 16, wherein the instructions further cause the computing device to:
add the transaction to a block of transactions;
solve a cryptographic puzzle based on the block of transactions;
add a solution to the cryptographic puzzle to the block of transactions; and
transmit the block of transactions to at least one other participant in the distributed ledger network.

18. The system of claim 16, wherein the distributed ledger network includes a plurality of layers, and the instructions further cause the computing device to:
in a first instance, generate a transaction to be stored in a first layer of the distributed ledger; and
in a second instance, generate a transaction to be stored in a second layer of the distributed ledger.

19. The system of claim 18, wherein the first layer of the distributed ledger is a public blockchain and the second layer of the distributed layer is a private blockchain.

20. The system of claim 16, wherein the distributed ledger is at least one of: a blockchain, a tangle, a block lattice, or other directed acyclic graph.

21. The system of claim 16, wherein generating a transaction includes generating a transaction including a cryptographic hash value corresponding to the process plant data.

22. A non-transitory computer-readable memory coupled to one or more processors and storing instructions thereon that, when executed by the one or more processors, cause the one or more processors to:
receive transactions that include process plant data generated by one or more field devices each performing a physical function to control an industrial process in a process plant, each received transaction including identity data for an entity generating the process plant data, and a cryptographic signature to provide proof-of-identity that the entity generated the process plant data, the process plant data including at least one of: (i) product parameter data including characteristics of a product manufactured at the process plant, or (ii) process parameter data for a process plant entity that contains, transforms, generates, or transfers physical materials within the process plant;
store a copy of a distributed ledger;
apply a set of consensus rules to the received transactions;
append one of the received transactions to the copy of the distributed ledger if the received transaction satisfies the consensus rules; and
transmit the appended transaction to at least one peer network node that stores a copy of the distributed ledger,
wherein a shelf-life of a product is predicted by assigning a quality score to each of a plurality of components of the product using the product parameter data or the process parameter data included in the distributed ledger for the product.

23. The computer-readable memory of claim 22, wherein to append one of the received transactions, the instructions cause the one or more processors to:
solve a cryptographic puzzle based on a block of transactions that includes the received transaction;
add a solution to the cryptographic puzzle to the block of transactions;
append the block of transactions to the copy of the distributed ledger; and
transmit the block of transactions to the peer network node.

24. The computer-readable memory of claim 22, wherein the set of consensus rules include at least one of:
formatting requirements for transactions or blocks of transactions;

a mechanism to determine which of the peer network nodes will add a next transaction or block of transactions to the distributed ledger; or a cryptographic hashing algorithm for hashing the process plant data included in each of the transactions.

25. The computer-readable memory of claim 22, wherein the instructions further cause the one or more processors to disregard the distributed ledger data received from the peer network nodes if the distributed ledger data does not satisfy the consensus rules.

26. The computer-readable memory of claim 22, wherein the peer network nodes are devices within a same process plant.

27. The computer-readable memory of claim 22, wherein the peer network nodes are devices within a plurality of process plants.

* * * * *

UNITED STATES PATENT AND TRADEMARK OFFICE
CERTIFICATE OF CORRECTION

PATENT NO. : 11,960,473 B2
APPLICATION NO. : 16/248323
DATED : April 16, 2024
INVENTOR(S) : Mark J. Nixon et al.

It is certified that error appears in the above-identified patent and that said Letters Patent is hereby corrected as shown below:

In the Specification

At Column 8, Line 16, "DeltaV" should be -- DeltaV™ --.

At Column 9, Line 22, "15-®" should be -- 15-18 --.

Signed and Sealed this
Twentieth Day of January, 2026

John A. Squires
*Director of the United States Patent and Trademark Office*